(12) United States Patent
Anderson et al.

(10) Patent No.: US 11,517,013 B2
(45) Date of Patent: Dec. 6, 2022

(54) MULTI-COMPONENT, SOIL-APPLIED, PESTICIDAL COMPOSITIONS

(71) Applicant: Vive Crop Protection Inc., Mississauga (CA)

(72) Inventors: Darren J. Anderson, Toronto (CA); Caleigh Buchanan Irwin, Mississauga (CA); Gary Tin-Kei Poon, Toronto (CA); Kelly Laura Skye Greig, Toronto (CA)

(73) Assignee: Vive Crop Protection Inc., Mississauga (CA)

(*) Notice: Subject to any disclaimer, the term of this patent is extended or adjusted under 35 U.S.C. 154(b) by 84 days.

(21) Appl. No.: 16/637,420

(22) PCT Filed: Aug. 15, 2018

(86) PCT No.: PCT/IB2018/056135
§ 371 (c)(1),
(2) Date: Feb. 7, 2020

(87) PCT Pub. No.: WO2019/038642
PCT Pub. Date: Feb. 28, 2019

(65) Prior Publication Data
US 2020/0178520 A1  Jun. 11, 2020

Related U.S. Application Data

(60) Provisional application No. 62/550,114, filed on Aug. 25, 2017.

(51) Int. Cl.
| | | |
|---|---|---|
| *A01N 25/04* | (2006.01) | |
| *A01N 25/10* | (2006.01) | |
| *A01N 37/46* | (2006.01) | |
| *A01N 43/50* | (2006.01) | |
| *A01N 43/54* | (2006.01) | |
| *A01N 43/90* | (2006.01) | |
| *A01N 53/00* | (2006.01) | |

(52) U.S. Cl.
CPC ............. *A01N 25/04* (2013.01); *A01N 25/10* (2013.01); *A01N 37/46* (2013.01); *A01N 43/50* (2013.01); *A01N 43/54* (2013.01); *A01N 43/90* (2013.01); *A01N 53/00* (2013.01)

(58) Field of Classification Search
None
See application file for complete search history.

(56) References Cited

U.S. PATENT DOCUMENTS

| | | |
|---|---|---|
| 4,512,969 A | 4/1985 | Chen |
| 5,292,828 A | 3/1994 | Jenkins et al. |
| 5,374,600 A | 12/1994 | Hozumi et al. |
| 5,952,232 A | 9/1999 | Rothman |
| 6,197,394 B1 | 3/2001 | Mild et al. |
| 6,262,152 B1 | 7/2001 | Fryd et al. |
| 6,383,500 B1 | 5/2002 | Wooley et al. |
| 6,383,984 B1 | 5/2002 | Aven |
| 6,436,421 B1 | 8/2002 | Schindler et al. |
| 6,572,672 B2 | 6/2003 | Yadav et al. |
| 6,596,292 B2 | 7/2003 | Nishi |
| 6,604,698 B2 | 8/2003 | Verhoff et al. |
| 6,610,772 B1 | 8/2003 | Clauberg et al. |
| 6,616,946 B1 | 9/2003 | Meier et al. |
| 6,638,994 B2 | 10/2003 | Crooks et al. |
| 6,683,129 B1 | 1/2004 | Eknoian |
| 6,897,253 B2 | 5/2005 | Schmucker-Castner et al. |
| 6,916,481 B1 | 7/2005 | Prud'Homme et al. |
| 7,063,895 B2 | 6/2006 | Rodrigues et al. |
| 7,070,795 B1 | 7/2006 | Botts et al. |
| 7,101,575 B2 | 9/2006 | Donath et al. |
| 7,166,306 B2 | 1/2007 | Chen et al. |
| 7,189,279 B2 | 3/2007 | Guillet |
| 7,217,457 B2 | 5/2007 | Elaissari et al. |
| 7,423,090 B2 | 9/2008 | Doane et al. |
| 7,501,180 B2 | 3/2009 | Anderson et al. |
| 7,534,490 B1 | 5/2009 | Goh et al. |
| 7,666,506 B2 | 2/2010 | Rieger et al. |
| 7,774,978 B2 | 8/2010 | Ding et al. |
| 7,939,601 B1 | 5/2011 | Bergeron et al. |
| 7,994,227 B2 | 8/2011 | Koltzenburg et al. |
| 8,029,827 B2 | 10/2011 | Martin |
| 8,034,888 B2 | 10/2011 | Nguyen-Kim et al. |
| 8,084,397 B2 | 12/2011 | Li et al. |
| 8,309,489 B2 | 11/2012 | Roldan Cuenya et al. |

(Continued)

FOREIGN PATENT DOCUMENTS

| | | |
|---|---|---|
| BR | PI0514086 A | 5/2008 |
| CA | 2203686 A1 | 11/1997 |

(Continued)

OTHER PUBLICATIONS

Cumbal et al., "Arsenic Removal Using Polymer-Supported Hydrates Iron(III) Oxide nanoparticles: Role of Donnan Membrane Effect," Environmental Science Technology, vol. 39, No. 17, pp. 6508-6515, 2005.
Henriet, M. and Baur, P., Evolution of deltamethrin formulations: liquid and solid lines and the fLUXX concept, Bayer CropScience Journal, 62:243-258 (2009).
International Preliminary Report on Patentability for PCT/1809/07870 dated Jul. 7, 2011.
International Search Report for International Application Serial No. IB2009/007870 dated Sep. 2, 2010.
International Search Report for PCT/IB10/02341 dated Apr. 5, 2011.

(Continued)

*Primary Examiner* — Alton N Pryor
(74) *Attorney, Agent, or Firm* — Choate, Hall & Stewart LLP; Charles E. Lyon

(57) ABSTRACT

The present disclosure describes compositions and methods for agricultural production. The formulations described herein enable to combine several active compounds, and are compatible with fertilizers, in particular, liquid fertilizers.

26 Claims, 14 Drawing Sheets

(56) References Cited

U.S. PATENT DOCUMENTS

| | | | |
|---|---|---|---|
| 8,372,418 B2 | 2/2013 | Dujardin et al. | |
| 8,592,412 B1* | 11/2013 | Urihara | A01N 47/18 514/229.2 |
| 8,741,808 B2 | 6/2014 | Li et al. | |
| 8,741,968 B2 | 6/2014 | Gottsche et al. | |
| 8,906,399 B2 | 12/2014 | Koltzenburg et al. | |
| 8,974,806 B2 | 3/2015 | Amrhein et al. | |
| 8,999,358 B2 | 4/2015 | Amrhein et al. | |
| 9,363,994 B2* | 6/2016 | Li | A01N 57/20 |
| 9,392,786 B2 | 7/2016 | Li et al. | |
| 9,648,871 B2 | 5/2017 | Li et al. | |
| 9,686,979 B2 | 6/2017 | Norton et al. | |
| 9,919,979 B2* | 3/2018 | Chen | A01N 47/24 |
| 9,961,900 B2 | 5/2018 | Anderson et al. | |
| 9,961,901 B2 | 5/2018 | Li et al. | |
| 10,070,650 B2 | 9/2018 | Li et al. | |
| 10,206,391 B2 | 2/2019 | Li et al. | |
| 10,455,830 B2 | 10/2019 | Norton et al. | |
| 10,966,422 B2 | 4/2021 | Norton et al. | |
| 2003/0069135 A1 | 4/2003 | Kober et al. | |
| 2003/0177868 A1 | 9/2003 | Guillet | |
| 2004/0048833 A1 | 3/2004 | Kohn | |
| 2004/0091546 A1 | 5/2004 | Johnson et al. | |
| 2004/0259736 A1 | 12/2004 | Dieing et al. | |
| 2004/0259763 A1 | 12/2004 | Koufaki et al. | |
| 2004/0266626 A1 | 12/2004 | Schrof et al. | |
| 2006/0223696 A1 | 10/2006 | Miyoshi et al. | |
| 2006/0283701 A1 | 12/2006 | Li et al. | |
| 2006/0293430 A1 | 12/2006 | Wang et al. | |
| 2007/0066481 A1 | 3/2007 | Ziemer et al. | |
| 2007/0116640 A1 | 5/2007 | Kim et al. | |
| 2007/0122436 A1 | 5/2007 | Koltzenburg et al. | |
| 2007/0154709 A1 | 7/2007 | Koch et al. | |
| 2007/0212321 A1 | 9/2007 | Braig et al. | |
| 2007/0218019 A1 | 9/2007 | Andre et al. | |
| 2007/0243145 A1 | 10/2007 | Andre et al. | |
| 2007/0290410 A1 | 12/2007 | Koo et al. | |
| 2008/0058229 A1 | 3/2008 | Berkland et al. | |
| 2008/0090886 A1 | 4/2008 | Gottsche et al. | |
| 2008/0138371 A1 | 6/2008 | Amrhein et al. | |
| 2008/0171658 A1 | 7/2008 | Dyllick-Brenzinger et al. | |
| 2008/0193766 A1 | 8/2008 | Anderson et al. | |
| 2008/0199700 A1 | 8/2008 | Anderson et al. | |
| 2008/0213326 A1 | 9/2008 | Amrhein et al. | |
| 2008/0213590 A1 | 9/2008 | Greiner et al. | |
| 2008/0227646 A1 | 9/2008 | Martin et al. | |
| 2008/0260851 A1 | 10/2008 | Somasundaran et al. | |
| 2009/0053272 A1 | 2/2009 | Wagenblast | |
| 2009/0123939 A1 | 5/2009 | Alocilja et al. | |
| 2009/0239749 A1 | 9/2009 | Duncalf et al. | |
| 2010/0015236 A1 | 1/2010 | Magdassi et al. | |
| 2010/0016443 A1 | 1/2010 | Toledano et al. | |
| 2010/0069247 A1 | 3/2010 | Yamaji et al. | |
| 2010/0119829 A1 | 5/2010 | Karpov et al. | |
| 2010/0179198 A1 | 7/2010 | Mertoglu et al. | |
| 2010/0210465 A1 | 8/2010 | Li et al. | |
| 2010/0227761 A1 | 9/2010 | Bruggemann et al. | |
| 2010/0273823 A1 | 10/2010 | Ma et al. | |
| 2011/0045975 A1 | 2/2011 | Ehr et al. | |
| 2011/0081555 A1 | 4/2011 | Liu et al. | |
| 2011/0166309 A1 | 7/2011 | Koltzenburg et al. | |
| 2011/0189294 A1 | 8/2011 | Keiper et al. | |
| 2011/0201504 A1 | 8/2011 | Merlet | |
| 2012/0035054 A1 | 2/2012 | Ehr et al. | |
| 2012/0065071 A1 | 3/2012 | Li et al. | |
| 2012/0184589 A1 | 7/2012 | Gewehr et al. | |
| 2012/0214857 A1 | 8/2012 | Reinhard et al. | |
| 2012/0264603 A1 | 10/2012 | Soane et al. | |
| 2012/0329648 A1 | 12/2012 | Fowler et al. | |
| 2013/0034650 A1 | 2/2013 | Li et al. | |
| 2013/0078297 A1 | 3/2013 | Schlotterbeck et al. | |
| 2013/0130904 A1 | 5/2013 | Li et al. | |
| 2013/0274110 A1 | 10/2013 | Westbye et al. | |
| 2013/0338223 A1 | 12/2013 | Reid et al. | |
| 2014/0080702 A1 | 3/2014 | Schnabel et al. | |
| 2014/0187424 A1 | 7/2014 | Norton et al. | |
| 2014/0234425 A1 | 8/2014 | Gottsche et al. | |
| 2014/0249031 A1 | 9/2014 | Mulqueen et al. | |
| 2014/0287010 A1 | 9/2014 | Li et al. | |
| 2014/0294968 A1 | 10/2014 | Hofmann et al. | |
| 2014/0364310 A1 | 12/2014 | Li et al. | |
| 2015/0141249 A1 | 5/2015 | Anderson et al. | |
| 2015/0359221 A1 | 12/2015 | Li et al. | |
| 2015/0366186 A1 | 12/2015 | Li et al. | |
| 2016/0255831 A1 | 9/2016 | Li et al. | |
| 2016/0286811 A1 | 10/2016 | Li et al. | |
| 2017/0008817 A1 | 1/2017 | Ryan et al. | |
| 2017/0202216 A1 | 7/2017 | Li et al. | |
| 2017/0202223 A1 | 7/2017 | Li et al. | |
| 2017/0360032 A1 | 12/2017 | Norton et al. | |
| 2018/0255779 A1 | 9/2018 | Li et al. | |
| 2018/0343869 A1 | 12/2018 | Li et al. | |
| 2019/0269127 A1 | 9/2019 | Li et al. | |
| 2019/0307129 A1 | 10/2019 | Li et al. | |
| 2020/0138018 A1 | 5/2020 | Norton et al. | |
| 2020/0245626 A1 | 8/2020 | Li et al. | |
| 2020/0260724 A1 | 8/2020 | Li et al. | |
| 2021/0321608 A1 | 10/2021 | Norton et al. | |

FOREIGN PATENT DOCUMENTS

| | | |
|---|---|---|
| CA | 2294332 A1 | 1/1999 |
| CA | 2391660 A1 | 5/2001 |
| CA | 2628836 A1 | 11/2001 |
| CA | 2574767 A1 | 2/2006 |
| CA | 2600285 A1 | 9/2006 |
| CA | 2625880 A1 | 4/2007 |
| CA | 2737452 A1 | 4/2010 |
| CA | 2793082 A1 | 9/2011 |
| CN | 1491541 A | 4/2004 |
| CN | 101731223 A | 6/2010 |
| CN | 102223790 A | 10/2011 |
| EP | 0183999 A1 | 6/1986 |
| JP | 10-287506 A | 10/1998 |
| JP | 11-222402 A | 8/1999 |
| JP | 2002-524536 A | 8/2002 |
| JP | 2003/514650 A | 4/2003 |
| JP | 2004-82803 A | 3/2004 |
| JP | 2004-331625 A | 11/2004 |
| JP | 2005-504103 A | 2/2005 |
| JP | 2005/507427 A | 3/2005 |
| JP | 2005-526868 A | 9/2005 |
| JP | 2007-509869 A | 4/2007 |
| JP | 2007-526198 A | 9/2007 |
| JP | 2007-534679 A | 11/2007 |
| JP | 2008-508344 A | 3/2008 |
| JP | 2008-532965 A | 8/2008 |
| JP | 4-145004 B2 | 9/2008 |
| JP | 2008-536840 A | 9/2008 |
| JP | 2009/512744 A | 3/2009 |
| JP | 4-500509 B2 | 7/2010 |
| JP | 56-65802 B2 | 2/2015 |
| WO | WO-89/12449 A1 | 12/1989 |
| WO | WO-99/00013 A2 | 1/1999 |
| WO | WO-0015263 A1 | 3/2000 |
| WO | WO-01/37803 A2 | 5/2001 |
| WO | WO-0137802 A1 | 5/2001 |
| WO | WO-01/90226 A1 | 11/2001 |
| WO | WO-03/028453 A1 | 4/2003 |
| WO | WO-03/039249 A2 | 5/2003 |
| WO | WO-03066712 A1 | 8/2003 |
| WO | WO-2005/030257 A2 | 4/2005 |
| WO | WO-2005/046328 A1 | 5/2005 |
| WO | WO-2005/059023 A1 | 6/2005 |
| WO | WO-2005/102044 A1 | 11/2005 |
| WO | WO-2006/015791 A2 | 2/2006 |
| WO | WO-2006/060551 A2 | 6/2006 |
| WO | WO-2006/094792 A1 | 9/2006 |
| WO | WO-2006/111327 A2 | 10/2006 |
| WO | WO-2006/128655 A2 | 12/2006 |
| WO | WO-2007/041862 A1 | 4/2007 |
| WO | WO-2007/082802 A1 | 7/2007 |
| WO | WO-2007104750 A2 | 9/2007 |
| WO | WO-2008032328 A2 | 3/2008 |

(56) References Cited

FOREIGN PATENT DOCUMENTS

| | | | |
|---|---|---|---|
| WO | WO-2008/076807 A2 | 6/2008 | |
| WO | WO-2008/099285 A2 | 8/2008 | |
| WO | WO-2009/009469 A1 | 1/2009 | |
| WO | WO-2010/035118 A1 | 4/2010 | |
| WO | WO-2010035118 A1 * | 4/2010 | ............... C08J 3/14 |
| WO | WO-2010/078852 A1 | 7/2010 | |
| WO | WO-2010/121323 A1 | 10/2010 | |
| WO | WO-2011/042495 A2 | 4/2011 | |
| WO | WO-2011/117719 A1 | 9/2011 | |
| WO | WO-2013/014127 A1 | 1/2013 | |
| WO | WO-2013/041975 A2 | 3/2013 | |
| WO | WO-2013/093578 A1 | 6/2013 | |
| WO | WO-2014/122598 A1 | 8/2014 | |
| WO | WO-2015/011704 A1 | 1/2015 | |
| WO | WO-2019/038642 A1 | 2/2019 | |

OTHER PUBLICATIONS

International Search Report for PCT/IB2009/06947, 4 pages (dated Feb. 2, 2010).
International Search Report for PCT/IB2011/000626, 4 pages (dated Aug. 3, 2011).
International Search Report for PCT/IB2012/002118, 4 pages (dated Feb. 6, 2013).
International Search Report for PCT/IB2012/002832, 3 pages (dated May 17, 2013).
International Search Report for PCT/IB2013/054760, 4 pages (dated Oct. 7, 2013).
International Search Report for PCT/IB2014/058719 (3 pages), dated Jun. 19, 2014.
International Search Report for PCT/IB2014/058816, 3 pages (dated May 28, 2014).
International Search Report for PCT/IB2018/056135 (Multi-Component, Soil-Applied, Pesticidal Compositions, filed Aug. 15, 2018), issued by ISA/CA, 6 pages (dated Dec. 3, 2018).
Kotov, et al. "Layer-by-Layer Self-Assembly of Polyelectrolyte-Semiconductor Nanoparticle Composite Films" J. Phys D Chem 1995, 99, pp. 13065-13069 (Aug. 1995).
Liu, H. et al., Chitosan nanoparticles for loading of toothpaste actives and adhesion on tooth analogs, Journal of Applied Polymer Science, 106(6):4248-56 (2007).
Liu, Y. et al., Stabilized Polymeric nanoparticles for controlled and efficient release of bifenthrin, Pest Management Science, 64(8):808-812 (2008).
McMullen, P., Grass Herbicide Efficacy as Influenced by Adjuvant, Spray Solution pH, and Ultraviolet Light, Weed Technology, 10(1):72-77 (1996).
Molnar, R.M. Preparation and characterization of poly (acrylic acid)-based nanoparticles, Colloid and Polymer Science, 287(6):739-744 (2009).
Ng, W. et al., Rheological properties of methacrylic acid/ethyl acrylate co-polymer: comparison between an unmodified and hydrophobically modified system, Polymer, 42:249-259 (2001).
Ng, W.K., et al., Rheological properties of methacrylic acid/ethyl acrylate co-polymer: comparison between an unmodified and hydrophobically modified system, Polymer, 42:249-259 (2001).
Pham, H. et al., Polymer nanoparticles as formulation agents, Nanotechnology, 1:869-871 (2010).
Won San Choi "Collective Behavior of Magnetic Nanoparticles in Polyelectrolyte Brushes" Advanced Materials 2008, D 20, 4504-4508 (Oct. 7, 2008).
Written Opinion for International Application Serial No. IB2009/007870 dated Sep. 1, 2010.
Written Opinion for PCT/IB10/02341 dated Apr. 5, 2011.
Written Opinion for PCT/IB2009/06947, 4 pages (dated Feb. 2, 2010).
Written Opinion for PCT/IB2011/000626, 6 pages (dated Aug. 3, 2011).
Written Opinion for PCT/IB2012/002118, 6 pages (dated Feb. 6, 2013).
Written Opinion for PCT/IB2012/002832, 8 pages (dated May 17, 2013).
Written Opinion for PCT/IB2013/054760, 6 pages (dated Oct. 7, 2013).
Written Opinion for PCT/IB2014/058719 (6 pages), dated Jun. 19, 2014.
Written Opinion for PCT/IB2014/058816, 4 pages (dated May 28, 2014).
Written Opinion for PCT/IB2018/056135 (Multi-Component, Soil-Applied, Pesticidal Compositions, filed Aug. 15, 2018), issued by ISA/CA, 7 pages (dated Dec. 3, 2018).
Yoksan, R. et al., Encapsulation ofascorbyl palmitate in chitosan nanoparticles by oil-in-water emulsion and ionic gelation processes, Colloids and Surfaces B: Biointerfaces, 76(1):292-7(2010).

* cited by examiner

After 2weeks- (left to right - same order as above – [Sample 56; Sample 72, Sample 83]).

100 X magnification

*After 1 minute of stirring – 100X magnification*

*After 15 minutes of stirring - 100X magnification*

*After sitting overnight- 100X magnification*

*After sitting for 1 week [8 days after mixing] - 100X magnification*

Five Component Mixture (Mesh and Mixture Photo)

MULTI-COMPONENT, SOIL-APPLIED, PESTICIDAL COMPOSITIONS

CROSS REFERENCE TO RELATED APPLICATIONS

This application is a U.S. National Stage Application filed under 35 U.S.C. 371 based on International Application No. PCT/IB2018/056135 filed Aug. 15, 2018, which claims priority to U.S. Provisional Application No. 62/550,114 filed Aug. 25, 2017, the entire contents of each of which are hereby incorporated by reference.

BACKGROUND

It is common practice in agricultural production to apply several different crop protection compounds to single crop over the course of a growing season. Even within particularly critical portions of a growing season (e.g., from planting to emergence), several crop protection compounds, in addition to a fertilizer may be applied to a particular crop. Each crop protection compound may target a specific pest, depending on the crop, geography, and local conditions. Furthermore, many farmers apply multiple compounds of a single category (e.g., multiple insecticides, or multiple fungicides) in order to combat resistance development among pests, or to target the broadest spectrum of pests possible.

Applying several different compounds commonly requires multiple trips for a user across a field, however early in the growing/planting season multiple trips over a field would harm seeds, seedlings or young plants and cause additional soil erosion. Often farmers must decide to apply a fertilizer or apply a pest control compound in the single early season trip over the fields. Some pesticidal compounds can be combined and applied in a single application, however, physical and chemical compatibility between active compounds is very difficult to predict.

One solution to the problems described above is the use of seed treatments or seed dressings. Seed treatments are chemicals applied to the exterior of a seed prior to planting. Generally, fungicides and anti-microbial compounds are applied, but occasionally insecticides are used as well. The seed treatments may also contain one or more of these crop protection compounds, including biological compounds (e.g., microbes, proteins) as well as an optional fertilizer. Though seed treatments can save farmers trips across fields, there are drawbacks to their use. First, seed treatments are prepared using specialized equipment typically by a retailer. Seed treatments are also prepared early in the season when pest pressure, nutritional needs, or other local conditions (e.g., weather) are not known, therefore selection of pesticides or fertilizer may not be optimized based on actual growing conditions. Seed treatments also tend to be dusty leading to drift, and user and beneficial insect exposure, especially when used in combination with pneumatically powered seed drills. Lastly, seed treatments may not be able to target the pests of a particular crop that appear after planting but before the crop is strong enough to resist the pest.

It would, therefore, be advantageous to provide active compound compositions (i.e., formulations) that combine several active compounds, and are compatible with fertilizers, in particular liquid fertilizers, and can be applied directly to the soil at planting or shortly after planting. Such formulations could be applied directly to the soil at the time of planting and provide pest control for early season pests of a particular crop, as well as providing fertilizer for the first stages of growth.

SUMMARY OF THE INVENTION

In various aspects, the present disclosure describes a liquid-applied pesticidal composition including a strobilurin fungicide, a pyrethroid insecticide, a neonicotinoid insecticide, a phenylamide fungicide, a dispersant, polymer nanoparticles, and water, wherein the composition has a viscosity of less than about 1500 cP at about 12 revolution per minute (RPM) of shear stress and a density is less than about 1.4 g/cm$^3$ at 60° F., for application directly to soil. In some embodiments, the average particle size of the pesticidal composition is less than about 0.5 μm.

In some embodiments, the strobilurin fungicide is azoxystrobin, the pyrethroid insecticide is bifenthrin, the neonicotinoid insecticide is imidacloprid, and the phenylamide fungicide is metalaxyl-M. In some embodiments, the dispersant is an alkyl-polyglucoside. In some embodiments, the strobilurin fungicide, the pyrethroid insecticide, and the neonicotinoid insecticide are associated with the polymer nanoparticles.

In some embodiments, the total weight percentage of the strobilurin fungicide, the pyrethroid insecticide, the neonicotinoid insecticide, and the phenylamide fungicide is between about 10% and about 40% of the pesticidal composition. In some embodiments, the weight percent of the strobilurin fungicide, the pyrethroid insecticide, the neonicotinoid insecticide, and phenylamide fungicide, are each individually between about 5 weight percent and 15 weight percent. In some embodiments, the composition does not include any organic thickeners.

In some embodiments, the pesticidal composition also includes a liquid fertilizer. In some embodiments, the average particle size of the pesticidal composition is less than about 150 microns after mixing with liquid fertilizer. In some embodiments, the density of the pesticidal composition is between about 1.01 g/cm$^3$ and about 1.4 g/cm$^3$ at 60° F. In some embodiments, the pesticidal composition includes a mectin compound. In some embodiments, the weight percent of the mectin compound is less than about 8 weight percent. In some embodiments, the weight percent of the mectin compound is less than about 2 weight percent.

In some embodiments, the weight percent of the strobilurin fungicide, the pyrethroid insecticide, the neonicotinoid insecticide, and the phenylamide fungicide, are each individually between about 100 ppm and about 1 weight percent. In some embodiments, the polymer nanoparticles are comprised of randomly arranged hydrophilic monomers and hydrophobic monomers. In some embodiments, the hydrophobic monomers are selected among alkyl acrylates. In some embodiments, the hydrophilic monomers are selected from carboxylic acid monomers. In some embodiments, the hydrophobic monomers comprise between about 5 weight percent and about 50 weight percent of the total weight of the copolymer. In some embodiments, the hydrophilic monomers comprise between about 95 weight percent and about 50 weight percent of the total weight of the copolymer.

In various aspects, the present disclosure describes a liquid-applied pesticidal composition comprising at least three of the five following active compounds: a strobilurin fungicide, a pyrethroid insecticide, a neonicotinoid insecticide, a phenylamide fungicide, and a mectin compound, and additionally comprising a dispersant, polymer nanoparticles, and water, wherein the composition has a viscosity of less than about 1500 cP at about 12 RPM of shear stress and a density is less than about 1.4 g/cm$^3$ at 60° F., for application directly to soil. In some embodiments, the average particle size of the pesticidal composition is less than about 0.5 µm.

In some embodiments of the pesticidal composition: the strobilurin fungicide is azoxystrobin, the pyrethroid insecticide is bifenthrin, the neonicotinoid insecticide is imidacloprid, and the phenylamide fungicide is metalaxyl-M, and the mectin compound is abamectin. In some embodiments, the dispersant is an alkyl-polyglucoside. In some embodiments, the strobilurin fungicide, the pyrethroid insecticide, and the neonicotinoid insecticide are associated with the polymer nanoparticles. In some embodiments, the total weight percentage of the strobilurin fungicide, the pyrethroid insecticide, the neonicotinoid insecticide, and the phenylamide fungicide is between about 10% and about 40% of the pesticidal composition.

In some embodiments, the weight percent of the strobilurin fungicide, the pyrethroid insecticide, the neonicotinoid insecticide, and the phenylamide fungicide, are each individually between about 5 weight percent and 15 weight percent. In some embodiments, the composition does not include any organic thickeners. In some embodiments, the pesticidal composition further includes a liquid fertilizer. In some embodiments, the average particle size of the pesticidal composition is less than about 150 microns after mixing with liquid fertilizer. In some embodiments, the density of the pesticidal composition is between about 1.01 g/cm$^3$ and about 1.4 g/cm$^3$ at 60° F.

In some embodiments, the polymer nanoparticles are comprised of randomly arranged hydrophilic monomers and hydrophobic monomers. In some embodiments, the hydrophobic monomers are selected among alkyl acrylates. In some embodiments, the hydrophilic monomers are selected from carboxylic acid monomers. In some embodiments, the hydrophobic monomers comprise between about 5 weight percent and about 50 weight percent of the total weight of the copolymer. In some embodiments, the hydrophilic monomers comprise between about 95 weight percent and about 50 weight percent of the total weight of the copolymer.

In various aspects, the present disclosure describes a method of protecting a plant, plant propagation material, seed from phytopathogenic fungi and/or insects or controlling phytopathogenic fungi or insects, including the step of applying a pesticidal composition of any of the preceding claims to the plant, soil adjacent to a plant, plant propagation material, and soil adjacent to plant propagation material. In some embodiments, the soil adjacent to the plant or soil adjacent to the plant propagation material to which the pesticidal composition is to be applied is an open furrow. In some embodiments, the method includes the step of closing the furrow. In some embodiments, the method includes the step of placing a plant, or plant propagation material in the furrow.

DESCRIPTION OF THE FIGURES

FIG. 4 at 100× magnification) of formulations mixed with liquid fertilizer, stirred for one minute, and imaged at the various, listed time points after mixing.

FIG. 6 at 100× magnification) of three different formulations imaged after mixing with liquid fertilizer, either 1 minute after mixing or 5 minutes after mixing.

FIG. 9 at 100× magnification) of formulations mixed with liquid fertilizer, stirred for a total of fifteen minutes, and imaged at the various, listed time points after mixing.

DESCRIPTION OF VARIOUS EMBODIMENTS OF THE INVENTION

Overview

Figure 1:
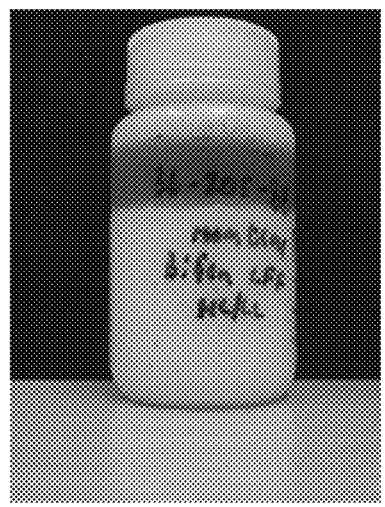
FIG. 1 is a photograph of a formulation demonstrating syneresis.
Figure 2:
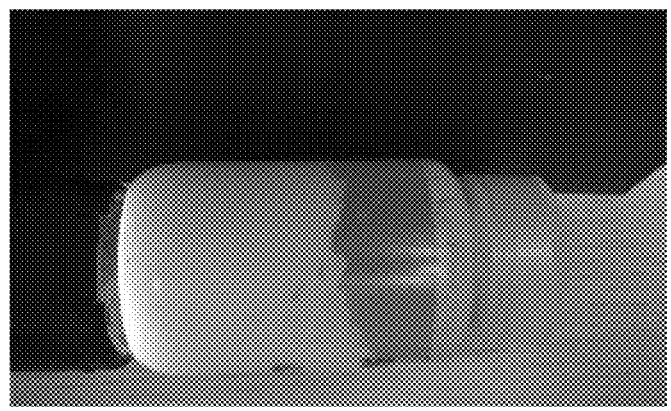
FIG. 2 is a photograph of the same formulation as FIG. 1.

The present invention relates to novel, water-based, liquid, active compound compositions comprising several actives each having different pesticidal (e.g., insecticidal, fungicidal, nematicidal, etc.) activities. The compositions are suitable for controlling phytopathogenic fungi and insects. For purposes of this disclosure, insects also refer to pestilent arachnids (e.g., mites, ticks, etc.) as well as, nematodes, and worms. Additionally, the compositions disclosed feature several surprising physical property characteristics which allow the compositions to be applied to plants, plant loci, or plant propagation material in combination with liquid fertilizers and other high ionic strength solutions. In particular, the compositions disclosed can be applied directly to the soil in conjunction with seed planting. The disclosed compositions can be applied in any location relative to the seeds and furrow, including in T-band application amongst other common soil application methods. Further, the compositions also exhibit enhanced stability (as either the concentrate, or as a tank-mix solution after having been diluted with, in particular, liquid fertilizer) evidenced by several formulation features. These features include low syneresis, long-term storage stability, without active decomposition or agglomeration, and low viscosity.

The active compound compositions of the instant disclosure are formulated at high active compound concentration. In context, "active compound(s)" refers to any of several insecticides or fungicides described in more detail below. Typically, technical grade active compounds with purity in excess of about 90% (typically, greater than about 95%) are formulated into concentrates (referred to herein as active compound compositions or formulations) with any of a multitude of adjuvants and formulants described in more detail below. The active compound compositions have a total active compound concentration that can range from about 10 percent by weight up to about 60 percent by weight, typically in the range of about 10 percent by weight to about 30 percent by weight. The active compound compositions can have an individual active compound concentration in the range between about 0.25 percent by weight to about 30 percent by weight.

In application, end-users would dilute the active compound compositions with liquid fertilizers ("LF") or water. The degree of dilution is to ensure that the active compound concentrations are appropriate for application to crops or to the fields in which the farmer will plant the crop. The diluted solution, when an additive or diluent in lieu of, or in addition to, water is used is referred to as the "tank-mix" or "tank-mix solution." In agriculture, generally, other components can be added to make up a tank-mix solution including additional surfactants, compatibilizers, other active compounds, and other additives. Selection of these tank-mix additives can depend on the application conditions, the active compounds being applied, soil conditions, and the crops to which the tank-mix solution is being applied.

Possible concentration ranges of the various active compounds, in both a pre-mix formulation or diluted to a tank-mix are described in Table 1 below.

TABLE 1

| | Pre-mix | | | | | |
|---|---|---|---|---|---|---|
| | Max. Conc. Range | | Typical Range | | Tank Mix | |
| | Min | Max | Min | Max | Min | Max |
| Strobilurin | 5% | 50% | 15% | 40% | 20 ppm | 3.5 wt % |
| Pyrethroid | 5% | 50% | 15% | 40% | 5 ppm | 4 wt % |
| Neonicotinoid | 5% | 50% | 10% | 40% | 25 ppm | 3 wt % |
| Metalaxyl | 5% | 50% | 10% | 45% | 50 ppm | 8 wt % |
| Mectin | 1% | 30% | 1% | 20% | 2 ppm | 0.5 wt % |

It is to be noted that the concentrations of the active compounds can vary individually anywhere within the ranges recited above. For example, in some embodiments, the strobilurin concentration may be about 35 weight percent and the pyrethroid concentration 10 weight percent, and in other embodiments, the strobilurin concentration may be about 10 weight percent and the pyrethroid concentration may be about 35 weight percent.

In some embodiments, the weight percent of the strobilurin active compound (specific compounds listed below) is between about 1 and about 50 weight % of the total formulation. In some embodiments, the weight percent of the strobilurin active compound is between about 1 and about 40 weight % of the total formulation. In some embodiments, the weight percent of the strobilurin active compound is between about 1 and about 30 weight % of the total formulation. In some embodiments, the weight percent of the strobilurin active compound is between about 1 and about 25 weight % of the total formulation. In some embodiments, the weight percent of the strobilurin active compound is between about 1 and about 15 weight % of the total formulation. In some embodiments, the weight percent of the strobilurin active compound is between about 1 and about 10 weight % of the total formulation. In some embodiments, the weight percent of the strobilurin active compound is between about 5 and about 15 weight % of the total formulation. In some embodiments, the weight percent of the strobilurin active compound is between about 5 and about 25 weight % of the total formulation. In some embodiments, the weight percent of the strobilurin active compound is between about 5 and about 30 weight % of the total formulation. In some embodiments, the weight percent of the strobilurin active compound is between about 5 and about 40 weight % of the total formulation. In some embodiments, the weight percent of the strobilurin active compound is between about 5 and about 50 weight % of the total formulation. In some embodiments, the weight percent of the strobilurin active compound is between about 10 and about 25 weight % of the total formulation. In some embodiments, the weight percent of the strobilurin active compound is between about 10 and about 30 weight % of the total formulation. In some embodiments, the weight percent of the strobilurin active compound is between about 15 and about 40 weight % of the total formulation. In some embodiments, the weight percent of the strobilurin active compound is between about 10 and about 50 weight % of the total formulation. In some embodiments, the weight percent of the strobilurin active compound is between about 20 and about 30 weight % of the total formulation. In some embodiments, the weight percent of the strobilurin active compound is between about 20 and about 40 weight % of the total formulation. In some embodiments, the weight percent of the strobilurin active compound is between about 20 and about 50 weight % of the total formulation.

In some embodiments, the weight percent of the pyrethroid active compound (specific compounds listed below) is between about 1 and about 50 weight % of the total formulation. In some embodiments, the weight percent of the pyrethroid active compound is between about 1 and about 40 weight % of the total formulation. In some embodiments, the weight percent of the pyrethroid active compound is between about 1 and about 30 weight % of the total formulation. In some embodiments, the weight percent of the pyrethroid active compound is between about 1 and about 25 weight % of the total formulation. In some embodiments, the weight percent of the pyrethroid active compound is between about 1 and about 15 weight % of the total formulation. In some embodiments, the weight percent of the pyrethroid active compound is between about 1 and about 10 weight % of the total formulation. In some embodiments, the weight percent of the pyrethroid active compound is between about 5 and about 15 weight % of the total formulation. In some embodiments, the weight percent of the pyrethroid active compound is between about 5 and about 25 weight % of the total formulation. In some embodiments, the weight percent of the pyrethroid active compound is between about 5 and about 30 weight % of the total formulation. In some embodiments, the weight percent of the pyrethroid active compound is between about 5 and about 40 weight % of the total formulation. In some embodiments, the weight percent of the pyrethroid active compound is between about 5 and about 50 weight % of the total formulation. In some embodiments, the weight percent of the pyrethroid active compound is between about 10 and about 25 weight % of the total formulation. In some embodiments, the weight percent of the pyrethroid active compound is between about 10 and about 30 weight % of the total formulation. In some embodiments, the weight percent of the pyrethroid active compound is between about 15 and about 40 weight % of the total formulation. In some embodiments, the weight percent of the pyrethroid active compound is between about 10 and about 50 weight % of the total formulation. In some embodiments, the weight percent of the pyrethroid active compound is between about 20 and about 30 weight % of the total formulation. In some embodiments, the weight percent of the pyrethroid active compound is between about 20 and about 40 weight % of the total formulation. In some embodiments, the weight percent of the pyrethroid active compound is between about 20 and about 50 weight % of the total formulation.

In some embodiments, the weight percent of the neonicotinoid active compound (specific compounds listed below) is between about 1 and about 50 weight % of the total formulation. In some embodiments, the weight percent of the neonicotinoid active compound is between about 1 and about 40 weight % of the total formulation. In some embodiments, the weight percent of the neonicotinoid active compound is between about 1 and about 30 weight % of the total formulation. In some embodiments, the weight percent of the neonicotinoid active compound is between about 1 and about 25 weight % of the total formulation. In some embodiments, the weight percent of the neonicotinoid active compound is between about 1 and about 15 weight % of the total formulation. In some embodiments, the weight percent of the neonicotinoid active compound is between about 1 and about 10 weight % of the total formulation. In some embodiments, the weight percent of the neonicotinoid active compound is between about 5 and about 15 weight % of the total formulation. In some embodiments, the weight percent of the neonicotinoid active compound is between about 5 and about 25 weight % of the total formulation. In some embodiments, the weight percent of the neonicotinoid active compound is between about 5 and about 30 weight % of the total formulation. In some embodiments, the weight percent of the neonicotinoid active compound is between about 5 and about 40 weight % of the total formulation. In some embodiments, the weight percent of the neonicotinoid active compound is between about 5 and about 50 weight % of the total formulation. In some embodiments, the weight percent of the neonicotinoid active compound is between about 10 and about 25 weight % of the total formulation. In some embodiments, the weight percent of the neonicotinoid active compound is between about 10 and about 30 weight % of the total formulation. In some embodiments, the weight percent of the neonicotinoid active compound is between about 15 and about 40 weight % of the total formulation. In some embodiments, the weight percent of the neonicotinoid active compound is between about 10 and about 50 weight % of the total formulation. In some embodiments, the weight percent of the neonicotinoid active compound is between about 20 and about 30 weight % of the total formulation. In some embodiments, weight percent of the neonicotinoid active compound is between about 20 and about 40 weight % of the total formulation. In some embodiments, the weight percent of the neonicotinoid active compound is between about 20 and about 50 weight % of the total formulation.

In some embodiments, the weight percent of the phenylamide active compound (specific compounds listed below) is between about 1 and about 50 weight % of the total formulation. In some embodiments, the weight percent of the phenylamide active compound is between about 1 and about 40 weight % of the total formulation. In some embodiments, the weight percent of the phenylamide active compound is between about 1 and about 30 weight % of the total formulation. In some embodiments, the weight percent of the phenylamide active compound is between about 1 and about 25 weight % of the total formulation. In some embodiments, the weight percent of the phenylamide active compound is between about 1 and about 15 weight % of the total formulation. In some embodiments, the weight percent of the phenylamide active compound is between about 1 and about 10 weight % of the total formulation. In some embodiments, the weight percent of the phenylamide active compound is between about 5 and about 15 weight % of the total formulation. In some embodiments, the weight percent of the phenylamide active compound is between about 5 and about 25 weight % of the total formulation. In some embodiments, the weight percent of the phenylamide active compound is between about 5 and about 30 weight % of the total formulation. In some embodiments, the weight percent of the phenylamide active compound is between about 5 and about 40 weight % of the total formulation. In some embodiments, the weight percent of the phenylamide active compound is between about 5 and about 50 weight % of the total formulation. In some embodiments, the weight percent of the phenylamide active compound is between about 10 and about 25 weight % of the total formulation. In some embodiments, the weight percent of the phenylamide active compound is between about 10 and about 30 weight % of the total formulation. In some embodiments, the weight percent of the phenylamide active compound is between about 15 and about 40 weight % of the total formulation. In some embodiments, the weight percent of the phenylamide active compound is between about 10 and about 50 weight % of the total formulation. In some embodiments, the weight percent of the phenylamide active compound is between about 20 and about 30 weight % of the total formulation. In some embodiments, the weight percent of the phenylamide active compound is between about 20 and about 40 weight % of the total formulation. In some embodiments, the weight percent of the phenylamide active compound is between about 20 and about 50 weight % of the total formulation.

As described in detail below, in some embodiment, a mectin active compound comprises part of the active compound composition. In some embodiments, the weight percent of the mectin active compound (specific compounds listed below) is between about 1 and about 30 weight % of the total formulation. In some embodiments, the weight percent of the mectin active compound is between about 1 and about 20 weight % of the total formulation. In some embodiments, the weight percent of the mectin active compound is between about 1 and about 15 weight % of the total formulation. In some embodiments, the weight percent of the mectin active compound is between about 1 and about 10 weight % of the total formulation. In some embodiments, the weight percent of the mectin active compound is between about 1 and about 8 weight % of the total formulation. In some embodiments, the weight percent of the mectin active compound is between about 1 and about 5 weight % of the total formulation. In some embodiments, the weight percent of the mectin active compound is between about 2 and about 30 weight % of the total formulation. In some embodiments, the weight percent of the mectin active compound is between about 2 and about 20 weight % of the total formulation. In some embodiments, the weight percent of the mectin active compound is between about 2 and about 15 weight % of the total formulation. In some embodiments, the weight percent of the mectin active compound is between about 2 and about 10 weight % of the total formulation. In some embodiments, the weight percent of the mectin active compound is between about 2 and about 8 weight % of the total formulation. In some embodiments, the weight percent of the mectin active compound is between about 2 and about 5 weight % of the total formulation. In some embodiments, the weight percent of the mectin active compound is between about 5 and about 30 weight % of the total formulation. In some embodiments, the weight percent of the mectin active compound is between about 5 and about 20 weight % of the total formulation. In some embodiments, the weight percent of the mectin active compound is between about 5 and about 15 weight % of the total formulation. In some embodiments, the weight percent of the mectin active compound is between about 5 and about 10 weight % of the total formulation. In some embodiments, the weight percent of the mectin active compound is between about 10 and about 30 weight % of the total formulation. In some embodiments, the weight percent of the mectin active compound is between about 10 and about 25 weight % of the total formulation. In some embodiments, the weight percent of the mectin active compound is between about 10 and about 20 weight % of the total formulation. In some embodiments, the weight percent of the mectin active compound is between about 10 and about 15 weight % of the total formulation. In some embodiments, the weight percent of the mectin active compound is between about 15 and about 30 weight % of the total formulation. In some embodiments, the weight percent of the mectin active compound is between about 15 and about 25 weight % of the total formulation. In some embodiments, the weight percent of the mectin active compound is between about 15 and about 20 weight % of the total formulation.

As described above, in some embodiments, the active compound compositions are diluted into or with water or liquid fertilizer, to prepare the "tank-mix solution." In the tank-mix solutions that the concentration of each of the individual active compounds can be between about 2 ppm to about 8 weight percent, as detailed in the chart above, depending on the particular active compound. As described above, the concentrations described below apply to any of the specific active compounds bellowing to the classes listed below.

In some embodiments, the concentration of the strobilurin active compound in the tank-mix solution is between about 20 ppm and about 3.5 weight percent (about 35,000 ppm). In some embodiments, the concentration of the strobilurin active compound in the tank-mix solution is between about 20 ppm and about 2.5 weight percent (about 25,000 ppm). In some embodiments, the concentration of the strobilurin active compound in the tank-mix solution is between about 20 ppm and about 1.5 weight percent (about 15,000 ppm). In some embodiments, the concentration of the strobilurin active compound in the tank-mix solution is between about 20 ppm and about 1 weight percent (about 10,000 ppm). In some embodiments, the concentration of the strobilurin active compound in the tank-mix solution is between about 20 ppm and about 5,000 ppm. In some embodiments, the concentration of the strobilurin active compound in the tank-mix solution is between about 500 ppm and about 3.5 weight percent (about 35,000 ppm). In some embodiments, the concentration of the strobilurin active compound in the tank-mix solution is between about 500 ppm and about 2.5 weight percent (about 25,000 ppm). In some embodiments, the concentration of the strobilurin active compound in the tank-mix solution is between about 500 ppm and about 1.5 weight percent (about 15,000 ppm). In some embodiments, the concentration of the strobilurin active compound in the tank-mix solution is between about 500 ppm and about 1 weight percent (about 10,000 ppm). In some embodiments, the concentration of the strobilurin active compound in the tank-mix solution is between about 500 ppm and about 5,000 ppm. In some embodiments, the concentration of the strobilurin active compound in the tank-mix solution is between about 1000 ppm and about 3.5 weight percent (about 35,000 ppm). In some embodiments, the concentration of the strobilurin active compound in the tank-mix solution is between about 1000 ppm and about 2.5 weight percent (about 25,000 ppm). In some embodiments, the concentration of the strobilurin active compound in the tank-mix solution is between about 1000 ppm and about 1.5 weight percent (about 15,000 ppm). In some embodiments, the concentration of the strobilurin active compound in the tank-mix solution is between about 1000 ppm and about 1 weight percent (about 10,000 ppm). In some embodiments, the concentration of the strobilurin active compound in the tank-mix solution is between about 1000 ppm and about 5,000 ppm. In some embodiments, the concentration of the strobilurin active compound in the tank-mix solution is between about 5000 ppm and about 3.5 weight percent (about 35,000 ppm). In some embodiments, the concentration of the strobilurin active compound in the tank-mix solution is between about 5000 ppm and about 2.5 weight percent (about 25,000 ppm). In some embodiments, the concentration of the strobilurin active compound in the tank-mix solution is between about 1 weight percent (about 10,000 ppm) and about 3.5 weight percent (about 35,000 ppm). In some embodiments, the concentration of the strobilurin active compound in the tank-mix solution is between about 1 weight percent (about 10,000 ppm) and about 2.5 weight percent (about 25,000 ppm).

In some embodiments, the concentration of the pyrethroid active compound in the tank-mix solution is between about 5 ppm and about 4 weight percent (about 40,000 ppm). In some embodiments, the concentration of the pyrethroid active compound in the tank-mix solution is between about 5 ppm and about 2.5 weight percent (about 25,000 ppm). In some embodiments, the concentration of the pyrethroid active compound in the tank-mix solution is between about 5 ppm and about 1.5 weight percent (about 15,000 ppm). In some embodiments, the concentration of the pyrethroid active compound in the tank-mix solution is between about 5 ppm and about 1 weight percent (about 10,000 ppm). In some embodiments, the concentration of the pyrethroid active compound in the tank-mix solution is between about 5 ppm and about 5,000 ppm. In some embodiments, the concentration of the pyrethroid active compound in the tank-mix solution is between about 5 ppm and about 2,000 ppm. In some embodiments, the concentration of the pyrethroid active compound in the tank-mix solution is between about 500 ppm and about 4 weight percent (about 40,000 ppm). In some embodiments, the concentration of the pyrethroid active compound in the tank-mix solution is between about 500 ppm and about 2.5 weight percent (about 25,000 ppm). In some embodiments, the concentration of the pyrethroid active compound in the tank-mix solution is between about 500 ppm and about 1.5 weight percent (about 15,000 ppm). In some embodiments, the concentration of the pyrethroid active compound in the tank-mix solution is between about 500 ppm and about 1 weight percent (about 10,000 ppm). In some embodiments, the concentration of the pyrethroid active compound in the tank-mix solution is between about 500 ppm and about 5,000 ppm. In some embodiments, the concentration of the pyrethroid active compound in the tank-mix solution is between about 500 ppm and about 2,000 ppm. In some embodiments, the concentration of the pyrethroid active compound in the tank-mix solution is between about 1000 ppm and about 4 weight percent (about 40,000 ppm). In some embodiments, the concentration of the pyrethroid active compound in the tank-mix solution is between about 1000 ppm and about 2.5 weight percent (about 25,000 ppm). In some embodiments, the concentration of the pyrethroid active compound in the tank-mix solution is between about 1000 ppm and about 1.5 weight percent (about 15,000 ppm). In some embodiments, the concentration of the pyrethroid active compound in the tank-mix solution is between about 1000 ppm and about 1 weight percent (about 10,000 ppm). In some embodiments, the concentration of the pyrethroid active compound in the tank-mix solution is between about 1000 ppm and about 5,000 ppm. In some embodiments, the concentration of the pyrethroid active compound in the tank-mix solution is between about 5000 ppm and about 4 weight percent (about 40,000 ppm). In some embodiments, the concentration of the pyrethroid active compound in the tank-mix solution is between about 5000 ppm and about 2.5 weight percent (about 25,000 ppm). In some embodiments, the concentration of the pyrethroid active compound in the tank-mix solution is between about 1 weight percent (about 10000 ppm) and about 4 weight percent (about 40,000 ppm). In some embodiments, the concentration of the pyrethroid active compound in the tank-mix solution is between about 1 weight percent (about 10,000 ppm) and about 2.5 weight percent (about 25,000 ppm).

In some embodiments, the concentration of the neonicotinoid active compound in the tank-mix solution is between about 25 ppm and about 3 weight percent (about 30,000 ppm). In some embodiments, the concentration of the neonicotinoid active compound in the tank-mix solution is between about 25 ppm and about 2.5 weight percent (about 25,000 ppm). In some embodiments, the concentration of the neonicotinoid active compound in the tank-mix solution is between about 25 ppm and about 1.5 weight percent (about 15,000 ppm). In some embodiments, the concentration of the neonicotinoid active compound in the tank-mix solution is between about 25 ppm and about 1 weight percent (about 10,000 ppm). In some embodiments, the concentration of the neonicotinoid active compound in the tank-mix solution is between about 25 ppm and about 5,000 ppm. In some embodiments, the concentration of the neonicotinoid active compound in the tank-mix solution is between about 25 ppm and about 2,000 ppm. In some embodiments, the concentration of the neonicotinoid active compound in the tank-mix solution is between about 500 ppm and about 3 weight percent (about 30,000 ppm). In some embodiments, the concentration of the neonicotinoid active compound in the tank-mix solution is between about 500 ppm and about 2.5 weight percent (about 25,000 ppm). In some embodiments, the concentration of the neonicotinoid active compound in the tank-mix solution is between about 500 ppm and about 1.5 weight percent (about 15,000 ppm). In some embodiments, the concentration of the neonicotinoid active compound in the tank-mix solution is between about 500 ppm and about 1 weight percent (about 10,000 ppm). In some embodiments, the concentration of the neonicotinoid active compound in the tank-mix solution is between about 500 ppm and about 5,000 ppm. In some embodiments, the concentration of the neonicotinoid active compound in the tank-mix solution is between about 500 ppm and about 2,000 ppm. In some embodiments, the concentration of the neonicotinoid active compound in the tank-mix solution is between about 1000 ppm and about 3 weight percent (about 30,000 ppm). In some embodiments, the concentration of the neonicotinoid active compound in the tank-mix solution is between about 1000 ppm and about 2.5 weight percent (about 25,000 ppm). In some embodiments, the concentration of the neonicotinoid active compound in the tank-mix solution is between about 1000 ppm and about 1.5 weight percent (about 15,000 ppm). In some embodiments, the concentration of the neonicotinoid active compound in the tank-mix solution is between about 1000 ppm and about 1 weight percent (about 10,000 ppm). In some embodiments, the concentration of the neonicotinoid active compound in the tank-mix solution is between about 1000 ppm and about 5,000 ppm. In some embodiments, the concentration of the neonicotinoid active compound in the tank-mix solution is between about 5000 ppm and about 3 weight percent (about 30,000 ppm). In some embodiments, the concentration of the neonicotinoid active compound in the tank-mix solution is between about 5000 ppm and about 2.5 weight percent (about 25,000 ppm). In some embodiments, the concentration of the neonicotinoid active compound in the tank-mix solution is between about 1 weight percent (about 10000 ppm) and about 3 weight percent (about 30,000 ppm). In some embodiments, the concentration of the neonicotinoid active compound in the tank-mix solution is between about 1 weight percent (about 10,000 ppm) and about 2.5 weight percent (about 25,000 ppm).

In some embodiments, the concentration of the phenylamide active compound in the tank-mix solution is between about 50 ppm and about 8 weight percent (about 80,000 ppm). In some embodiments, the concentration of the phenylamide active compound in the tank-mix solution is between about 50 ppm and about 5 weight percent (about 50,000 ppm). In some embodiments, the concentration of the phenylamide active compound in the tank-mix solution is between about 50 ppm and about 2.5 weight percent (about 25,000 ppm). In some embodiments, the concentration of the phenylamide active compound in the tank-mix solution is between about 50 ppm and about 1 weight percent (about 10,000 ppm). In some embodiments, the concentration of the phenylamide active compound in the tank-mix solution is between about 500 ppm and about 8 weight percent (about 80,000 ppm). In some embodiments, the concentration of the phenylamide active compound in the tank-mix solution is between about 500 ppm and about 5 weight percent (about 50,000 ppm). In some embodiments, the concentration of the phenylamide active compound in the tank-mix solution is between about 1000 ppm and about 2.5 weight percent (about 25,000 ppm). In some embodiments, the concentration of the phenylamide active compound in the tank-mix solution is between about 1000 ppm and about 1 weight percent (about 10,000 ppm). In some embodiments, the concentration of the phenylamide active compound in the tank-mix solution is between about 5000 ppm and about 8 weight percent (about 80,000 ppm). In some embodiments, the concentration of the phenylamide active compound in the tank-mix solution is between about 5000 ppm and about 5 weight percent (about 50,000 ppm). In some embodiments, the concentration of the phenylamide active compound in the tank-mix solution is between about 1 weight percent (about 10000 ppm) and about 8 weight percent (about 80,000 ppm). In some embodiments, the concentration of the phenylamide active compound in the tank-mix solution is between about 1 weight percent (about 10,000 ppm) and about 5 weight percent (about 50,000 ppm).

In some embodiments, the concentration of the mectin active compound in the tank-mix solution is between about 2 ppm and about 5,000 ppm. In some embodiments, the concentration of the mectin active compound in the tank-mix solution is between about 2 ppm and about 2,000 ppm. In some embodiments, the concentration of the mectin active compound in the tank-mix solution is between about 2 ppm and about 1,000 ppm. In some embodiments, the concentration of the mectin active compound in the tank-mix solution is between about 20 ppm and about 5,000 ppm. In some embodiments, the concentration of the mectin active compound in the tank-mix solution is between about 20 ppm and about 2,000 ppm. In some embodiments, the concentration of the mectin active compound in the tank-mix solution is between about 20 ppm and about 1,000 ppm.

In some embodiments, the concentration of the mectin active compound in the tank-mix solution is between about 200 ppm and about 5,000 ppm. In some embodiments, the concentration of the mectin active compound in the tank-mix solution is between about 200 ppm and about 2,000 ppm. In some embodiments, the concentration of the mectin active compound in the tank-mix solution is between about 200 ppm and about 1,000 ppm. In some embodiments, the concentration of the mectin active compound in the tank-mix solution is between about 500 ppm and about 5,000 ppm. In some embodiments, the concentration of the mectin active compound in the tank-mix solution is between about 500 ppm and about 2,000 ppm. In some embodiments, the concentration of the mectin active compound in the tank-mix solution is between about 500 ppm and about 1,000 ppm. In some embodiments, the concentration of the mectin active compound in the tank-mix solution is between about 1000 ppm and about 5,000 ppm. In some embodiments, the concentration of the mectin active compound in the tank-mix solution is between about 1000 ppm and about 2,000 ppm.

The physical characteristics of the instant active compound compositions are surprising for several reasons. The first is the fact that the compositions disclosed typically include at least four different active compounds, and in some embodiments up to five different active compounds, themselves featuring a variety of differing physical and chemical properties including by not limited to decomposition rates, decomposition mechanisms, salt stability, viscosity, rheological properties, and chemical compatibilities. Striking the proper balance between the several actives, the formulation compounds, and the desired end-product characteristics is profoundly difficult. Further, the active compound compositions are prepared as primarily a suspension concentrate ("SC") formulation. SCs, in concentrate form, are stable, aqueous suspensions of fine active compound particles, and when diluted (e.g., for application to a field and/or crop) they produce a stable suspension. SCs are a particularly difficult formulation for products that contain combinations of pesticidal compounds due to the variety of physical and chemical properties of the pesticidal compounds. For example, a surfactant package that may succeed in suspending a particular fungicide may not produce the same effect for an insecticide or second fungicide or it may be incompatible with the surfactants and adjuvants that can produce a suspension for the insecticide or second fungicide. The stability of SCs is also particularly sensitive to the properties of the raw materials involved, making SCs that contain multiple active compounds even more difficult to formulate. For example the differing water solubilities, differing stability in water, liquid fertilizers, or stability in ionic solutions of the various active compounds in the disclosed multi-component, formulations make formulating a stable SC difficult. Although an SC is the primary form of the formulation disclosed herein, it is possible, given the range of solubilities of active compounds that can be used in the disclosed compounds, that some of the active compounds would be in solution in the water that makes up the formulation, and therefore not in suspension. For example, metalaxyl is water soluble at standard conditions and may not be suspended.

It has now been found that the proper mix of active compounds, adjuvants, and polymer nanoparticles can yield stable formulations that are all mixing compatible with each other, compatible with liquid fertilizers and other solutions with high ionic strength (e.g., salt water, brackish water, hard waters). By being compatible with liquid fertilizers, the active compound formulation can be mixed directly (i.e., without any dilution in water) with liquid fertilizers to application appropriate concentrations. Additionally, these active compound compositions mix easily and quickly with water or LF in standard spray preparation equipment. The resulting tank-mix solution is ready to be applied to the field. The tank mix solution is generally homogeneous, though some very small particulate matter may develop. Specifically, the tank-mix solution does not separate, precipitate or gel under standard storage and use conditions in the agricultural field within a particular period of time (e.g., 1 day, 2 days, 3 days, 4 days, 5 days, 6 days, 1 week, 2 weeks, 3 weeks, etc.). Without a relatively homogeneous solution, errors in application, especially active compound dosage, could occur, resulting in inconsistent active compound application and possible damage to crops.

Further, these formulations can be applied directly to the soil, most commonly in anticipation of planting, at the time of planting, or shortly after planting crops, although embodiments of the instant invention can be applied anytime during the growing season. The disclosed formulations solve the problem of providing pesticidal active compounds to plants, plant loci, or plant propagation materials, with liquid fertilizers, in an all liquid form. The formulations can be applied at planting in the furrow, banded application, or after the furrow has been closed. When applied to the soil, the formulations can be applied in nearly any position relative to the seed or plant, above, below, adjacent to the seeds at the same elevation in the furrow.

Notably, the disclosed active compound compositions are not solid formulations (e.g., seed treatment/dressing formulations) and do not require the use of granular fertilizers. Typically, seed treatments are used when end-users seek to apply a mix of insecticides, fungicides and optionally fertilizers, early in a growing season. Also it is common that, when used, the fertilizers in this application are typically granular or dry fertilizers. As described above, the solid form products have several disadvantages over liquid formulations related to difficult handling, user exposure, drift, and environmental damage. Seed treatments are prepared, generally, in batches at the beginning of, or prior to, planting. Each batch being of sufficient quantity to plant several hundreds of acres, or the total area of fields designated for a particular crop by the farmer. Because of the volumes prepared and the timing, seed treatments do not allow for variation in the selection of crop protection compounds or fertilizers, the ratios or concentrations of the active compounds used in light of the farmer's local conditions (e.g., weather, soil conditions which can vary dramatically across a single field). Further, because seed treatments are prepared at the outset of a growing season, they cannot be adjusted for in response to specific pest pressure(s), nutritional requirements or local conditions. These factors may not be known, or accurately predicted, at the time of seed treatment preparation. Additionally, the same seed treatment (or treated seeds) mixture is applied across a large area due to the volume prepared.

The disclosed compositions instead are liquid formulations. They can be prepared (e.g., diluted with water or LF, tank-mixed) as needed for planting or early season treating. The disclosed compositions do not require specialized equipment, as they can be used with typical pesticide spraying equipment used to spray soil surfaces or into furrows. The disclosed compositions would be sprayed to the soil surface adjacent to, or upon which a seed will be planted. In this case, the disclosed compositions are applied in conjunction with seed planting. The disclosed composition could also be applied to the soil adjacent to a seed as it is planted before being covered with soil (i.e., before the planting furrow is closed, e.g., T-band application, in-furrow, etc.). By application in this manner, the active ingredients are directed to an area near a seed (i.e., a locus of the seed) where the active ingredients can have the most effect. The disclosed compositions may also be applied any time after a furrow is closed in a banded application, directly to the soil. This can be done at-plant over a closed seed furrow, post-plant over the row, or post-emergent often as a side-dress application. They may then be superficially soil incorporated with drag chains or tines.

Use of the disclosed compositions can save end-users time in that one trip across a crop field can plant a crop, treat it with both insecticides and fungicides and, optionally, fertilize the crop. The disclosed compositions also reduce the environmental impact of pesticide application, as compared to applying all of the components individually. The disclosed combinations also reduce worker exposure, because one trip through the crop fields results in the application of several pesticides and fertilizer, and also the application is direct to the soil as compared to foliar applications. Even among other soil directed applications, the disclosed compositions result in reduced user exposure because the disclosed compositions are liquid as compared to solid formulations, which are typically dusty.

The active compounds selected for the disclosed active compound compositions are each selected for specific control activity, generally useful in the earliest stages of crop growth. The first active compound is selected for its activity in controlling oomycetes, and any fungicide suitable for controlling oomycetes can be used. Exemplary fungicides with activity against oomycete include phenylamide type fungicides (Fungicide Resistance Action Committee, "FRAC" code 4) including, but not limited to, mefenoxam (metalaxyl-M), metalaxyl, benalxyl, benalaxyl-M, oxadixyl, and furalxyl.

The second active compound is selected for its activity in controlling seedling diseases, such as *Rhizoctonia* root and stalk rot. Any other fungicide with acceptable activity when targeting these diseases can also be used. Exemplary fungicides include strobilurin fungicides (Fungicide Resistance Action Committee, "FRAC" code 11), including, but not limited to azoxystrobin, picoxystrobin, metominostrobin, pyraclostrobin, fluoxastrobin, trifloxystrobin, famoxadone, fenamidone, and kresoxim-methyl. Strobilurins are also advantageous, for example, azoxystrobin, because they have demonstrated plant growth benefits. Other fungicides can also be used including SDHIs (Succinate dehydrogenase inhibitors, "FRAC" code 7) including phenyl-benzamides, phenyl-oxo-ethyl thiophene amides, pyridinyl-ethyl-benzamides, furan-carboxamides, thiazole-carboxamides, pyrazole-carboxamides, and pyridine-carboxamides.

The third active compound is selected because of its ability to control root/seed feeding insects such as seed maggots, grubs, rootworms, and wireworms. Neonicotinoids, (Insecticide Resistance Action Committee, "IRAC" code 4) are an exemplary class of insecticides with superior activity in controlling root and seed feeding insects. Neonicotinoids are additionally useful because they are systemic and thus are able to control early season pests, such as aphids, while the young plant grows. Exemplary neonicotinoid insecticides include, but are not limited to imidacloprid, clothianidin, acetamiprid, dinotefuran, thiacloprid, thiamethoxam, nitenpyram, imidaclothiz, and nithiazine. Neonicotinoids are also able to control surface feeding insects (e.g., cutworms). An alternative to neonicotinoids is also abamectin (Insecticide Resistance Action Committee, "IRAC" code 6), which has the additional advantage of controlling nematodes.

The fourth active compound is selected for its ability to control root and seed feeding insects (when applied to the soil, e.g., in a T-band application). For example, pyrethroid insecticides (Insecticide Resistance Action Committee, "IRAC" code 3A) can provide this sort of insect control. Exemplary pyrethroids include but not are limited to cyhalothrins (e.g., lambda-cyhalothrin, gamma-cyhalothrin), bifenthrin, cypermethrins (e.g., alpha-cypermethrin, beta-cypermethrin, theta-cypermethrin, zeta-cypermethrin) and others described in more detail below. Pyrethroids also have a period of residual activity that makes them advantageous, as compared to many other insecticides, and specific pyrethroid active compounds may be selected based on their comparative residual activity.

Although four active compounds are described above as comprising the active compound compositions, various active compound compositions using only three active compounds are possible and contemplated within this disclosure. The order of presentation of the active compounds is also not indicative of any particular preference or importance in these active compound compositions. The multiple active compounds in the active compound compositions also aid in preventing the development of pesticide resistance by employing multiple modes of action in controlling the target pests.

These four categories of active compounds are not the exclusive types of active compounds useful in the instant active compound compositions. Other substitutions can be used to the end-users advantage and depend on the crop to which they are applied, the timing of the application, the pests targeted, and the pest pressure. Alternatives, include but are not limited to, pyrrole (also referred to as phenylpyrrole) fungicides (e.g., fludioxonil, dimetachlone, fenpiconil, fluroimide); carbamate fungicides (e.g., thiophanate, thiophanate-methyl, and others described in more detail below), and triazole fungicides (e.g., difenoconazole, epoxiconazole, ipconazole, metconazole, myclobutanil, propiconazole, prothioconazole, tebuconazole, tetraconazole, and other described in more detail below). Alternative insecticides include mectins, milbemycins, and spinosyns (e.g., abamectin, emamectin, milbemectin, milbemycin oxime, spinetoram, and others described below).

The active compound compositions have advantageous curative, preventative and systemic fungicidal and insecticidal properties. Though typical application would be at planting, to either the soil for planting (e.g., in a T-band or in-furrow application) which would utilize the preventative and systemic functionalities of the active compound compositions, the active compound composition can be used in foliar applications, to post-emergent plants. The active compound compositions are highly active against diseases and pests in the soil, and therefore, the disclosed compositions are frequently used in the early stages of plant development. However, proper selection of active compounds results in useful formulations for foliar applications.

One of the advantages conferred by the novel active compound compositions is that lower application rates, and/or longer duration of efficacy (i.e., less frequent re-application rates) and/or higher crop yield and/or improved crop health.

Improved crop health can manifest itself in a number of different ways. For example, improved yield and/or vigor of the plant, or improved quality of the harvested product from the plant may be achieved. Such an improvement may not be directly or evidently connected to the control of diseases or pests, or can be the result of control of "hidden disease." Hidden disease refers to diseases of plants that, for one reason or another, are not perceptible, yet can adversely affect the health of a plant. The cause of the hidden disease can be because the quantity of the pest is too low to be observed in the field, amongst other reasons.

Improved crop yield relates to an increase in the yield of the product of the plant with the application of the active compound compositions by a measurable amount over the yield of the same product of the plant produced under the same conditions for the same period, but without the application of the active compound compositions. The threshold for improved yield is typically an increase in the product amount of at least about 0.5%. In some embodiments, the improvement is at least about 1%, at least about 2%, at least about 3% at least about 4% or at least about 5%. Yield can be calculated in weight or volumes based on time, growing area, the weight of plant produced, raw material used and/or other inputs.

Improved vigor relates to the increase or improvement of the vigor rating, or the stand (e.g., the number of crop per unit area), or the plant height, weight, diameter/circumference, extent of canopy, visual appearance (e.g., leaf color) or root quality/rating, emergence, nutrition content (e.g., protein, mineral, and/or vitamin content), rate of growth or germination, reduced fertilizer requirements. Other agronomic (plant health) benefits are familiar to those of skill in the art. The improvement is measurable over some period of time as compared to a plant produced under the same conditions for the same period, but without the application of the active compound compositions.

The ideal formulation demonstrates homogeneity, in that the components of the concentrated formulation (e.g., adjuvants, active ingredients, formulants) are evenly distributed throughout the formulation within a given container or formulation. Additionally, the physical characteristics of the concentrated formulation are consistent. For example, the formulation does not separate or exhibit syneresis. Additionally, the particle size of the formulation is consistent throughout the formulation. If a formulation does exhibit some sedimentation, separation, or syneresis, or is otherwise inconsistent throughout its volume, the formulation should return to a homogeneous state with a little mixing as possible (for example, less than about 5 minutes with a tank mixer, less than about 10 minutes with a tank mixer, less than about 15 minutes with a tank mixer, less than 5 about minutes with recirculation, jet agitation or bypass mixing, less than about 10 minutes with recirculation, jet agitation, bypass mixing, less than 15 minutes with recirculation, jet agitation, bypass mixing).

Formulation Properties

LF Compatibility

As noted above the instant active compound compositions are compatible with LF, and this is indeed one of the advantages of the instant active compound compositions. Compatibility of fertilizers with pesticides in tank-mixtures has proved a persistently troublesome problem. For example, neonicotinoid insecticides are known to be effective insecticides in agricultural and non-agricultural pest control, a known problem of this class of insecticides and other pesticides, in general, is the compatibility with fertilizers, particularly liquid fertilizer compositions. Despite the years of research, there is no general solution to the incompatibility problem, although earlier practitioners have provided several proposed solutions, as shown in, e.g., U.S. Pat. Nos. 4,464,193, 5,516,747, and 4,071,617.

A major challenge lies in the unpredictability and complex nature of the final tank-mixtures. There are two general types of incompatibility of pesticides and fertilizers: chemical and physical. For example, chemical incompatibility of a pesticide and fertilizer occurs when a pesticide is hydrolyzed or subjected to other unwanted chemical reactions. Physical incompatibility, the more common of the two problems, occurs when the tank mixture fails to properly mix or forms an agglomeration due to, e.g., coagulation, flocculation, gelling, or precipitation of solids. The mixtures may form hard packed agglomerates or oil globules. Physical incompatibility present difficulties since the malfunctioning tank-mixture plugs conventional spray filters and nozzles. The active compound compositions may remain heterogeneous from the LF solution, even with vigorous mixing, or the active compound compositions may adhere to tank wall surfaces and fail to incorporate with LF solutions. All of this can lead to inconsistent application to crops.

One surprising property of the compositions disclosed herein, is that the active compound compositions are compatible with liquid fertilizers. The term compatible, in this application, primarily refers to, among other characteristics described herein, the active compound composition's ability to mix with liquid fertilizers wherein the final mixture appears, substantially homogeneous, though small solid particles, color changes and other minor flaws are present in the final mixture.

LF compatibility is demonstrated by a stability of the formulation after mixing with LF. Stability, in this context, can be measured in a variety of different tests. In one test, the active compound composition is mixed with liquid fertilizer and any other adjuvants to a concentration and under conditions best approximating actual use. The mixture is evaluated over time for color, separation (e.g., syneresis, as described below, or creaming), active compound content, distribution, solids formation, settling, viscosity changes and other rheological changes. Many active compound compositions that are not compatible with LF will separate into separate layers, either through syneresis, agglomeration of solid particles or caking. In some evaluations, the active compound concentration is measured over time (e.g., over several hours or several days), and inconsistent concentration (e.g., changes over time) indicate an active compound composition that is not compatible with LF. Additionally, the concept of LF compatibility can be demonstrated by "resuspendability" in that a solution prepared with a pre-mix composition, diluted to a tank-mix solution in LF is not immediately used, and is stored overnight, or for one or several days (e.g., between about 12 hours, 1 day, 2 days, 3 days, 4 days, 5 days, 6 day, or about a week). After the storage period, the solution is easy to remix with the spray tank mixing system (e.g., recirculation pump, or small impeller mixer) and the active compound compositions are re-suspending and ready to be applied to the end-user's fields. The disclosed compositions demonstrate little if any permanent separation or settling of constituent components.

In another evaluation method, the tank-mix solution is placed in a column (e.g., titration burette) and samples are collected at various heights in the column. Each sample is evaluated, e.g., for active compound concentration, and inconsistent values indicate incompatibility with LF. This evaluation can take place as soon as the tank-mix solution is prepared, or it can be performed over a period of hours or days, with the tank-mix solution stored in the column to evaluate formulation properties over time. Stable formulations tend to demonstrate consistent active compound concentrations throughout the height of the column, or over a period of time. In some embodiments, the active compound concentration measured at various heights in the column varies by less than about 10 percent. In some embodiments, the active compound concentration measured at various heights in the column varies by less than about 20 percent. In some embodiments, the active compound concentration measured at various heights in the column varies by less than about 30 percent. In some embodiments, the active compound concentration changes by less than about 10 percent after remaining in the column for about 24 hours. In some embodiments, the active compound concentration changes by less than about 10 percent after remaining in the column for about 48 hours. In some embodiments, the active compound concentration changes by less than about 10 percent after remaining in the column for about 72 hours.

LF compatibility is also demonstrated by the quality of the bloom. In this context, bloom refers to how drops of the active compound composition interact when added to a bulk diluent (i.e., a liquid fertilizer solution). Some active compound compositions do not bloom, in that the drops of the composition will not interact with the LF all and settle to the bottom of the container or otherwise remain nearly entirely heterogeneous. Active compound compositions that are compatible with LF tend to spread over the surface of the LF when added dropwise to the LF. Some quiescent mixing may be evident at the edges of the active compound composition drops added to the LF.

LF compatibility is also demonstrated by maintaining a relatively constant dispersion over time. Once the active compound composition is mixed with the liquid fertilizer, the active compound composition does not quickly settle, agglomerate or otherwise coalesce. The active compound composition remains suspended in the solution, and the diluted mixture retains a consistent concentration of active compound throughout. Additionally, LF compatible formulations can be re-suspended if, after the initial mixing, the diluted mixture is allowed to settle or is otherwise undisturbed and unused. Many active compound formulations may initially produce an acceptable dispersion after initial mixing with LF, however, if the dispersion is not used, or not continually mixed, the active compound or other components may settle, and then not reform an acceptable dispersion even with vigorous mixing.

Another important measure indicating LF compatibility is the stability of the average particle size once the active compound formulation is mixed with LF. As indicated above, aggregation, agglomeration and coalescence are not favorable characteristics and are contra-indicative of LF compatibility. Microscopy, and various particle sizing techniques (e.g., Dynamic Light Scattering (DLS)) can be used to evaluate the average particle size of a formulation.

Mixing in LF

Another surprising feature of the disclosed formulations is the ease with which they mix and the robustness of their ability to be mixed with water or with LF and optionally with other formulations. Because application conditions of pesticidal formulations vary widely in the field, a formulation should be able to be mixed with a wide variety of mixing equipment, under a wide variety of conditions and allow for mistakes or modifications by the operator. Exemplary mixing equipment includes manual agitations (e.g., shaking a sealed container), mechanical agitation, agitation by a pump or water addition (e.g., sparging, recirculation, induction, jet agitation or bypass mixing), all of varying intensity. Mixing can take place in containers ranging in size for a gallon to several hundred gallons and can include "on-demand"/induction mixing. Other variations can include mixing the formulation into a solution undergoing agitation, or agitation starting after all of the mixture components are added to a tank. Aside from the equipment used in mixing, the methods can vary widely, including vigorous mixing, to agitation from driving across a field, without direct mixing. A preferred formulation would not be adversely affected (either efficacy or physical properties) by high or low shear mixing. Further, a formulation may be added to LF (or water) and left to stand, for any number of reason, before mixing commences. Ideally, a robust formulation would still be able to mix into the LF or water, after standing for a period of time.

The particle size can be measured with microscopy, DLS methods, and also by passing the solution through a screen with a specific pore size (e.g., 140 μm) and evaluating the amount of the solution that is retained on the screen or passed through. Alternative screen sizes could also be used, as appropriate for the formulation and potential applications. Other screen sizes include, but are not limited to, 10 μm, 30 μm, 70 μm, and 150 μm.

An ideal tank-mix solution will have consistent particle size over time, after the active compound composition is mixed with LF (or water, as the case may be). Generally, the particle size change is recorded as a percentage based on the average particle (or $d_{[0.5]}$, $d_{avg}$ or d[0.9], as the case may be) of the active compound compositions prior to dilution, where $d_{avg}$ is the average particle size, $d_{[0.5]}$ and $d_{[0.9]}$ are the diameters that 50% or 90% of the particles are smaller than, respectively. The change in particle size can be measured at various points in time after initial mixing with water or LF. In some embodiments, the average particle size increases by less than about 10% an hour after mixing with LF. In some embodiments, the average particle size increases by less than about 20% an hour after mixing with LF. In some embodiments, the average particle size increases by less than about 25% an hour after mixing with LF. In some embodiments, the average particle size increases by less than about 30% an hour after mixing with LF. In some embodiments, the average particle size increases by less than about 35% an hour after mixing with LF.

In some embodiments, the average particle size increases by less than about 10% two hours after mixing with LF. In some embodiments, the average particle size increases by less than about 20% two hours after mixing with LF. In some embodiments, the average particle size increases by less than about 25% two hours after mixing with LF. In some embodiments, the average particle size increases by less than about 30% two hours after mixing with LF. In some embodiments, the average particle size increases by less than about 35% two hours after mixing with LF.

In some embodiments, the average particle size increases by less than about 10% four hours after mixing with LF. In some embodiments, the average particle size increases by less than about 20% four hours after mixing with LF. In some embodiments, the average particle size increases by less than about 25% four hours after mixing with LF. In some embodiments, the average particle size increases by less than about 30% four hours after mixing with LF. In some embodiments, the average particle size increases by less than about 35% four hours after mixing with LF.

In some embodiments, the instant active compound compositions eliminate the need for crystallization inhibitors in the formulation. Many SC formulations of active compounds (especially, active compounds that are susceptible to crystallization, and/or are partially water soluble) include crystallization inhibitors as one of several adjuvants. Many of these crystallization inhibitors are incompatible with LF and lead to very poor dispersions.

Low Syneresis

Another surprising result of the compositions disclosed in this application is that they demonstrate low syneresis. In the context of the disclosure, syneresis is the extraction or expulsion of water from the bulk formulation. This phenomena generally manifests as a separation of the formulation, with a "water" (though it may not contain only water, but also other formulation components) layer on top of the bulk formulation layer. See, e.g., FIG. 1. Low syneresis in this context refers to a formulation in which the water layer comprises less than about 25% by volume of the total formulation. In some embodiments, the water layer comprises less than about 20% by volume of the total formulation. In some embodiments, the water layer comprises less than about 15% by volume of the total formulation. In some embodiments, the water layer comprises less than about 10% by volume of the total formulation. In some embodiments, the water layer comprises less than about 5% by volume of the total formulation. In some embodiments, the water layer comprises less than about 3% by volume of the total formulation. In some embodiments, the water layer comprises less than about 1% by volume of the total formulation.

Minimizing syneresis while maintaining other useful formulation characteristics is difficult. By way of example, thickeners and fillers are frequently used to address syneresis, however, these compounds can increase viscosity, decrease liquid fertilizer compatibility, and otherwise be detrimental to the physical characteristics of the formulation. In some embodiments, syneresis is minimized or eliminated by the use of hydrophobic silica. In some embodiments, syneresis is minimized or eliminated by the use of hydrophilic or fumed silica. In some embodiments, syneresis is minimized or eliminated by the use of lactose or inert fillers described below. In some embodiments, syneresis is minimized or eliminated by the use of aluminosilicate, or aluminosilicate clays. It is to be noted that some of the disclosed active compound compositions explicitly omit the use of clays and aluminosilicates. In some embodiments, these compounds have been found to be disadvantageous. Without being bound by any theory, it is thought that particular active compounds when formulated with aluminosilicates are incompatible with liquid fertilizer.

Sedimentation

Another surprising result of the composition disclosed in this application is that the compositions demonstrate low levels of sedimentation. Sedimentation, in the context of this disclosure, is the process in which material in the formulation carries to the bottom of the container. This may be partially (or wholly) the result of aggregation, coagulation or precipitation of materials and components of the formulation. Low sedimentation in this context refers to a formulation in which the sediment layer comprises less than about 25% by volume of the total formulation. In some embodiments, the sediment layer comprises less than about 20% by volume of the total formulation. In some embodiments, the sediment layer comprises less than about 15% by volume of the total formulation. In some embodiments, the sediment layer comprises less than about 10% by volume of the total formulation. In some embodiments, the sediment layer comprises less than about 5% by volume of the total formulation. In some embodiments, the sediment layer comprises less than about 3% by volume of the total formulation. In some embodiments, the sediment layer comprises less than about 1% by volume of the total formulation.

While the bulk formulation that remains above the sediment layer may retain many of the physical and chemical properties of the bulk formulation before a sediment layer forms, the sediment may have drastically different physical and chemical properties. For example, the sediment layer may be a clay-like layer, become tightly packed aggregates, or may exhibit dilatant properties. If sedimentation of a formulation does occur, ideally, the sediment re-suspends into the bulk formulation with some, but minimal mixing energy employed.

Attempting to minimize sedimentation when preparing a formulation presents many of the same challenges as reducing syneresis. Often thickeners and density modifiers are employed to minimize sedimentation, however, these compounds can increase viscosity, decrease liquid fertilizer compatibility, and otherwise be detrimental to the physical characteristics of the formulation.

Color

Although generally an ascetic concern, ideal formulations should have a consistent color as near white or water-white as is practical. Some formulations exhibit different colors among different phases upon separation, sedimentation or syneresis. Ideal formulations minimize color variations, or deviations from bulk formulation in the event of phase separation. Color can be evaluated using platinum cobalt tests, UV spectroscopic methods and other colorimetric methods.

Storage Stability

The disclosed formulation, and ideal agrochemical formulations, also demonstrate storage stability. The formulation can be stored for long periods of time, in varied environmental conditions and at the end of the storage period the formulation demonstrates minimal changes in chemical and physical traits. Exemplary measures include increase in particle size and a percentage of active ingredients that is still in suspension or present in the formulation. Some change in the various properties is expected and can be the result of the properties of the active ingredient (including its synthesis route), as well as the properties of adjuvants and formulation production methods.

In application, storage conditions vary widely and laboratory simulations of long-term storage utilize high temperatures to simulate years of normal storage conditions. For example, laboratory storage condition can include storage at room temperature (about 20 to 25° C.), 0° C., 35° C., 45° C., 54° C. and cycling between −10° C. and 45° C. Storage under these conditions can last from a few days (e.g., 2 to 3 days) to several years (e.g., 2 years). Common storage conditions include long-term storage (e.g., greater than 6 weeks) at room temperature; storage for 1 week, 2 weeks, 3 weeks, 4 weeks, 5 weeks, 6 weeks, 8 weeks, 12 weeks or 16 weeks at 54° C.; storage for 1 week, 2 weeks, 3 weeks, 4 weeks, 5 weeks, 6 weeks, 8 weeks, 12 weeks or 16 weeks at 45° C.; storage for 1 week, 2 weeks, 3 weeks, 4 weeks, 5 weeks, 6 weeks, 8 weeks, 12 weeks or 16 weeks at 35° C. After storage in these conditions, an ideal formulation retains a high percentage of the active ingredient in suspension. In some embodiments, more than 99% of the active ingredient remains in suspension after storage, more than about 99% of the active ingredient remains in suspension after storage, more than about 90% of the active ingredient remains in suspension after storage, more than about 85% of the active ingredient remains in suspension after storage, or more than about 80% of the active ingredient remains in suspension after storage. In some embodiments, the average particle size (e.g., $d_{[0.5]}$ or $d_{avg}$) increases by only about 10%. In some embodiments, the average particle size (e.g., $d_{[0.5]}$ or $d_{avg}$) increases by only about 15%. In some embodiments, the average particle size (e.g., $d_{[0.5]}$ or $d_{avg}$) increases by only about 20%. In some embodiments, the average particle size (e.g., $d_{[0.5]}$ or $d_{avg}$) increases by only about 25%. In some embodiments, the average particle size (e.g., $d_{[0.5]}$ or $d_{avg}$) increases by only about 30%.

Viscosity

The viscosity of the formulation is another physical trait related to the usability of a formulation product. In some embodiments, preferred formulations are thixotropic, and have a viscosity of less than about 1500 cP at about 12 RPM of shear stress. Viscosity naturally relates to the ability to pour the active compound formulation, and clean any containers both of which are important traits for end-users. Additionally, viscosity is a factor in transport (e.g., pumping, induction into a spray tank), initial mixing of an active compound composition with LF (or water), and high viscosity can lead to inferior dispersions in tank-mix solutions. In some embodiments, the viscosity is less than about 1200 cP, less than about 900 cP, or less than about 600 cP at about 12 RPM of shear stress. All viscosity measurements are taken via a Brookfield viscometer at 25° C.

It is also desirable that active compound formulations be thixotropic, (i.e., pseudoplastic, shear-thinning) in that the viscosity decreases with mixing and agitation. The viscosity of such formulations is highly dependent on the shear rate applied during measurement. Such qualities of the formulation can be characterized as such. Furthermore, such measurements are highly dependent on the instrument used for measurement.

It is desirable that the viscosity of the formulation be such that less than about 5% residue remains in a container after pouring the volume of the formulation out (e.g., less than about 4%, less than about 3%, less than about 2%, less than about 1%). Containers could be of any material, include plastics (LDPE, HDPE), or glass (e.g., beakers, or measuring vessels).

Density

Density is also an important trait of a formulation, especially in the context of LF compatible formulations. Density effects manifest themselves upon initial mixing of the active compound formulation with LF, at which point best results are achieved with the density of the two solutions are close. Disparate densities between the LF solution and the active compound solutions results in mixtures that may appear immiscible, or that do not mix easily when the active compound formulation is added to the LF, or the active compound formulation does not spread on the surface of LF when added to LF. The instant compositions spread evenly and mix with typical agitation methods available to end users (e.g., farmers with agitated mix tanks, induction mixing, recirculation mixing) within a reasonable amount of time (e.g., about 5 minutes, about 10 minutes, about 15 minutes etc.). These features are due, in part, to density matching, of the active compound compositions to LF into which the active compound composition is diluted.

In some embodiments, the density of the active compound formulation is between about 1 g/cm$^3$ and 1.5 g/cm$^3$ at 60° F. In some embodiments, the density of the active compound formulation is between about 1 g/cm$^3$ and 1.1 g/cm$^3$ at 60° F. In some embodiments, the density of the active compound formulation is between about 1 g/cm$^3$ and 1.2 g/cm$^3$ at 60° F. In some embodiments, the density of the active compound formulation is between about 1 g/cm$^3$ and 1.3 g/cm$^3$ at 60° F. In some embodiments, the density of the active compound formulation is between about 1 g/cm$^3$ and 1.4 g/cm$^3$ at 60° F. In some embodiments, the density of the active compound formulation is between about 1.2 g/cm$^3$ and 1.3 g/cm$^3$ at 60° F. In some embodiments, the density of the active compound formulation is between about 1.2 g/cm$^3$ and 1.4 g/cm$^3$ at 60° F. In some embodiments, the density of the active compound formulation is between about 1.2 g/cm$^3$ and 1.5 g/cm$^3$ at 60° F. In some embodiments, the density of the active compound formulation is between about 1.3 g/cm$^3$ and 1.4 g/cm$^3$ at 60° F. In some embodiments, the density of the active compound formulation is between about 1.3 g/cm$^3$ and 1.5 g/cm$^3$ at 60° F. In some embodiments, the density of the active compound formulation is between about 1.4 g/cm$^3$ and 1.5 g/cm$^3$ at 60° F. In some embodiments, the density of the active compound formulation is between about 1.2 g/cm$^3$ and 1.45 g/cm$^3$ at 60° F. In some embodiments, the density of the active compound formulation is between about 1.25 g/cm$^3$ and 1.45 g/cm$^3$ at 60° F. In some embodiments, the density of the active compound formulation is between about 1.25 g/cm$^3$ and 1.4 g/cm$^3$ at 60° F. In some embodiments, the density of the active compound formulation is between about 1.01 g/cm$^3$ and 1.4 g/cm$^3$ at 60° F.

In some embodiments, the density of the active compound formulation is within about 5% of the density of a particular liquid fertilizer. Exemplary liquid fertilizers and exemplary densities are listed in Table 2 below.

TABLE 2

| Fertilizer Type (N-P-K) | Typical Density (at 60° F.) | Density (g/cm$^3$) at 60° F. |
|---|---|---|
| 10-34-0 | 11.65 lb/gal | 1.40 |
| 28-0-0 | 10.67 lb/gal | 1.28 |
| 32-0-0 | 10.86 lb/gal | 1.31 |
| 12-0-0-26S (12% N; 16% S) | 11.04 lb/gal | 1.33 |
| 10-0-0-10Zn (10% N; 10% Zn) | 10.4 lb/gal | 1.25 |
| 7-21-7 | 11.2 lb/gal | 1.35 |
| 4-10-10 | 10.3 lb/gal | 1.24 |
| 8-21-4-3S-.5Zn | 11.3 lb/gal | 1.36 |
| 9-18-4-6S-.5Zn | 11.3 lb/gal | 1.36 |
| 9-20-2-7S-.5Zn | 11.4 lb/gal | 1.37 |
| 18-13-0-7S | 11.3 lb/gal | 1.36 |
| 10-20-0-3S | 11.7 lb/gal | 1.41 |

It is to be noted that the density of a particular liquid fertilizer can vary greatly depending on the raw materials used, impurities in the product and handling techniques. The density values above can vary by as much as 10% between products with the same N—P—K content, but made by different manufacturers. In some embodiments, the density of the active compound formulation is within about 5% of the density of 10-34-0 fertilizer. In some embodiments, the density of the active compound formulation is within about 5% of the density of 28-0-0 fertilizer. In some embodiments, the density of the active compound formulation is within about 5% of the density of 32-0-0 fertilizer.

Actives & Fertilizers

Actives

As described above, the disclosed active compound compositions, generally, include four active compounds, each with specific pesticide activity. The first activity is control of oomycetes, the second activity is control of early season diseases (e.g., *Rhizoctonia*), and the third activity is control of seed/root pests (grubs, wireworms). Exemplary fungicides that control oomycetes include phenylamide fungicides. Exemplary fungicides that control early season disease include strobilurins, triazoles, and SDHIs. Exemplary insecticides that control root and seed feeding pests include neonicotinoids and pyrethroids. Generally, two insecticides with the same activity but different modes of action or chemical classes are selected for inclusion in the active compound compositions.

Non-limiting examples of phenylamide fungicide include: mefenoxam (metalaxyl-M), metalaxyl, benalxyl, benalaxyl-M, oxadixyl, flutolanil, and furalxyl. Additional fungicides that could be used in lieu of phenylamide include fungicides categorized under FRAC code 4, fungicides that interfere with RNA polymerase in nucleic acid synthesis (MOA: A1). Additionally, other fungicides demonstrating superior control of oomycetes can be used in lieu of, or in addition to, metalaxyl or phenylamides generally.

Non-limiting examples of strobilurin compounds are: fluoxastrobin: (E)-{2-[6-(2-chlorophenoxy)-5-fluoropyrimidin-4-yloxy]phenyl}(5,6-dihydro-1,4,2-dioxazin-3-yl) methanone O-methyloxime; fenamidone: (S)-1-anilino-4-methyl-2-methylthio-4-phenylimidazolin-5-one; azoxystrobin: methyl (E)-2-{2-[6-(2-cyanophenoxy)pyrimidin-4-yloxy]phenyl}-3-methoxyacrylate; picoxystrobin: methyl (E)-3-methoxy-2-[2-(6-trifluoromethyl-2-pyridyloxymethyl)phenyl]acrylate; enestrobin: methyl 2-{2-[3-(4-chlorophenyl)-1-methylallylideneaminooxymethyl]phenyl}-3-methoxyacrylate; pyraclostrobin: methyl N-{2-[1-(4-chlorophenyl)pyrazol-3-yloxymethyl]phenyl}(N-methoxy) carbamate; famoxadone: 3-anilino-5-methyl-5-(4-phenoxyphenyl)-1,3-oxazolidine-2,4-dione; dimoxystrobin: (E)-2-(methoxyimino)-N-methyl-2-[α-(2,5-xylyloxy)-o-tolyl]acetamide; metominostrobin: (E)-2-methoxyimino-N-methyl-2-(2-phenoxyphenyl)acetamide; orysastrobin: 2[(E)-methoxyimino]-2-[(3E,6E)-2-{5-[(E)-methoxyimino]-4,6-dimethyl-2,8-dioxa-3,7-diazanona-3,6-dienyl}phenyl]-N-methylacetamide; kresoxim-methyl: methyl (E)-methoxyimino[2-(o-tolyloxymethyl)phenyl]acetate; and trifloxystrobin: methyl (E)-methoxyimino-{(E)-α-[1-(α,α,α-trifluoro-m-tolyl)ethylideneaminooxy]-o-tolyl}acetate. Additional fungicides that could be used in lieu of strobilurins include any fungicides categorized under FRAC code 11 (Mode of Action Class C3), Quinone outside inhibitors ("QoI inhibitors").

Non-limiting examples of neonicotinoid compounds include clothianidin: (E)-1-(2-chloro-1,3-thiazol-5-ylmethyl)-3-methyl-2-nitroguanidine; dinotefuran: (EZ)—(RS)-1-methyl-2-nitro-3-(tetrahydro-3-furylmethyl)guanidine; imidacloprid: (E)-1-(6-chloro-3-pyridylmethyl)-N-nitroimidazolidin-2-ylideneamine; imidaclothiz (EZ)-1-(2-chloro-1,3-thiazol-5-ylmethyl)-N-nitroimidazolidin-2-ylideneamine; thiamethoxam: (EZ)-3-(2-chloro-1,3-thiazol-5-ylmethyl)-5-methyl-1,3,5-oxadiazinan-4-ylidene(nitro)amine; nitenpyram: (E)-N-(6-chloro-3-pyridylmethyl)-N-ethyl-N'-methyl-2-nitrovinylidenediamine; nithiazine: (EZ)-2-nitromethylene-1,3-thiazinane; acetamiprid: (E)-N1-[(6-chloro-3-pyridyl)methyl]-N2-cyano-N1-methylacetamidine; and thiacloprid: (Z)-3-(6-chloro-3-pyridylmethyl)-1,3-thiazolidin-2-ylidenecyanamide. Additional fungicides that could be used in lieu of neonicotinoids include any insecticides categorized under Insecticide Resistance Action Committee ("IRAC") Mode of Action Classification 4 (Nicotinic Acetylcholine receptor agonists), in particular IRAC class 4A.

Exemplary pyrethroids, include but are not limited to acrinathrin, allethrin, bioallethrin, esdépalléthrine, barthrin, bifenthrin, bioethanomethrin, brofenvalerate, brofluthrinate, bromethrin, butethrin, chlorempenthrin, cyclethrin, cycloprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, d-fanshiluquebingjuzhi, fenfluthrin, fenpirithrin, fenpropathrin, fenvalerate, esfenvalerate, flucythrinate, fluvalinate, tau-fluvalinate, furamethrin, furethrin, heptafluthrin, imiprothrin, japothrins, kadethrin, meperfluthrin, methothrin, metofluthrin, momfluorothrin, pentmethrin, permethrin, biopermethrin, transpermethrin, phenothrin, prallethrin, profluthrin, proparthrin, pyresmethrin, resmethrin, bioresmethrin, cismethrin, tefluthrin, terallethrin, tetramethrin, tetramethylfluthrin, tralocythrin, tralomethrin, transfluthrin, valerate, etofenprox, flufenprox, halfenprox, protrifenbute, silafluofen, sulfoxime, and thiofluoximate. In some embodiments a pyrethroid compound can be a compound that falls under Insecticide Resistance Action Committee Mode of Action Classification Class 3A (sodium channel modulators; pyrethroids, pyrethrins).

As described above, other active compounds may be substituted for the above active compounds, or other general classes of active compounds. Alternatives, include but are not limited to, phenylpyrrole fungicides (e.g., fludioxonil, dimetachlone, fenpiconil, fluroimide) and other fungicides classified in FRAC code 12; carbamate fungicides (e.g., thiophanate, thiophanate-methyl, benthiavalicarb, furophanate, iodocarb, iprovalicarb, picarbutrazox, propamocarb, pyribencarb, tolprocarb, albendazle, benomyl, carbendzim, cypendazole, debacarb, mecarbinzid), and other fungicides classified in FRAC code 28; triazole fungicides (e.g., difenoconazole, azxconazole, bromuconazle, cyproconazole, diclobutrazol, diniconazole, epoxiconazole, etaconazole, fenbuconazole, fluquinconazole, flusilazole, flutriafol, furconazole, hexaconazole, chlorobenzyl, ipconazole, metconazole, myclobutanil, penconazole, propiconazole, prothioconazole, quinconazole, simeconazole, tebuconazole, tetraconazole, triadimenfon, triadimenol, triticonazole, uniconazole), and other fungicides classified in FRAC code 3; SDHI fungicides including but not limited to phenyl-benzamides (e.g., benodanil, flutolanil, mepronil), phenyl-oxoethyl thiophene amides (e.g., isofetamid), pyridinyl-ethyl-benzamides (e.g., fluopyram), furan-carboxamides (e.g., carboxin, oxycarboxin), thiaole-carboxamides (e.g., thifluzamide), pyrazole-carboximides (e.g., benzovindiflupyr, bixafen, fluxapyroxad, furametpyr, isopyrazam, penflufen, penthiopyrad, sedaxane), pyridine-carboxamides (e.g., boscalid) and other fungicides classified in FRAC code 7. Alternative insecticides include mectins, milbemycins and spinosyns (e.g., abamectin, doramectin, emamectin, eprinomectin, ivermectin, selamectin, lepimectin, milbemectin, milbemycin oxime, moxidectin, spinetoram, spinosad), and other insecticide classified in IRAC classes 5 or 6.

Fertilizers may include, but are not limited to, ammonium sulfate (AMS), ammonium phosphate, ammonium nitrate, ammonium thiosulfate, solutions of ammonium nitrate and urea which are commonly referred to in the art as 28% N or UAN (e.g., 28-0-0 or 32-0-0), forms of ammonia (e.g., aqua ammonia, anhydrous ammonia), forms of urea (e.g., sulfur coated urea, urea-formaldehydes, polymer coated urea), potassium nitrate, potassium phosphate, potassium chloride, potassium carbonate, potassium sulfate, potassium-magnesium sulfate, diammonium phosphate, mono-ammonium phosphate, concentrated superphosphate, sulfur fertilizers, calcium fertilizers, magnesium fertilizers, the like, and mixtures thereof. Though many of these listed fertilizers may naturally be in solid or gaseous form at standard temperature and pressure, many are dissolved, and/or diluted in water or other liquids for the application. Specifically, when used in combination with the instant active compound compositions, the fertilizers will be of a liquid form.

Micronutrients may include one or more nutrients essential to plant growth and health that are only needed in very small quantities and may contain, among other things, one or more inorganic cations such as, for example, the cations of boron, manganese, copper, iron, molybdenum, and zinc.

Target Fungi, Insects and Diseases

The novel active ingredient mixtures have very advantageous curative, preventive and systemic fungicidal properties for protecting cultivated plants. As has been mentioned, said active ingredient mixtures can be used to inhibit or destroy the pathogens that occur on plants or parts of plants (e.g., fruit, blossoms, leaves, stems, tubers, roots) of different crops or useful plants, while at the same time those parts of plants which grow later are also protected from attack by such pathogens. Active ingredient mixtures have the special advantage of being highly active against diseases in the soil that mostly occur in the early stages of plant development.

Each of the combination according to the present invention is effective against phytopathogenic fungi, including but not limited to seedborne fungi, and against the plant diseases they cause. The compositions of this invention control a broad spectrum of fungal plant pathogens belonging to the following classes: Ascomycetes (e.g., *Penicillium, Gaeumannomyces graminis*); Basidiomycetes (e.g., *Hemileia* spp., *Rhizoctonia* spp., *Phakopsora* spp., *Puccinia* spp.); Deuteromycetes (e.g., *Botrytis* spp., *Helminthosporium* spp., *Rhynchosporium secalis, Fusarium* spp., *Septoria* spp., *Cercospora* spp. (inc. *Cercosporidium personatum, Cercospora arachidicola, Cercospora beticola*, etc.), *Alternaria* spp., *Pyricularia* spp. and *Pseudocercosporella herpotrichoides*); Oomycetes (e.g., *Phytophthora* spp., *Peronospora* spp., *Bremia lactucae, Pythium* spp., *Plasmopara* spp., *Pseudoperonospora* spp., *Albugo* spp.); Zygomycetes (e.g., *Rhizopus* spp.); Anthracnose diseases (e.g., *Glomerella* spp. or *Colletotrichum* spp.); *Guignardia* diseases (e.g., *Guignardia bidwell*); *Gymnosporangium* (e.g., *Gymnosporangium sabinae*); *Rynchosporium* spp.; *Cladiosporum* diseases, caused for example by *Cladiosporium cucumerinum*; *Cycloconium* diseases, caused for example by *Cycloconium oleaginum*; *Gloeosporium* diseases, caused for example by *Gloeosporium laeticolor*; *Leptosphaeria* diseases, caused for example by *Leptosphaeria maculans*; *Leptosphaeria nodorum*; *Magnaporthe* diseases, caused for example by *Magnaporthe grisea*; *Ramularia* diseases, caused for example by *Ramularia collo-cygni*, or *Ramularia areola*; *Sarocladium* diseases caused for example by *Sarocladium oryzae*; *Tapesia* diseases, caused for example by *Tapesia acuformis*; *Aphanomyces* diseases, caused for example by *Aphanomyces euteiches* Ascochyta diseases, caused for example by *Ascochyta lentis*; *Macrophomina* diseases, caused for example by *Macrophomina phaseolina*; *Nectria* diseases, caused for example by *Nectria galligena*; *Exobasidium* diseases caused for example by *Exobasidium vexans Taphrina* diseases, caused for example by *Taphrina deformans*; *Esca* diseases, caused for example by *Phaemoniella clamydospora*; *Eutypa* dyeback, caused for example by *Eutypa lata*; *Ganoderma* diseases, caused for example by *Ganoderma boninense*; *Rigidoporus* diseases, caused for example by *Rigidoporus lignosus*; *Polymyxa* spp. *Pseudopezicula tracheiphila*; *Spongospora subterranean*; and *Synchytrium endobioticum*.

A combination is especially effective against *Alternaria* spp., *Aspergillus* spp., *Claviceps purpurea, Bipolaris* spp., *Cochliobolus* spp., *Colletotrichum* spp., *Corticium* spp, *Diplodia maydis, Didymella* spp., *Drechslera* spp., *Erysiphe* spp., *Blumeria graminis, Fusarium* spp. (such as *Fusarium culmorum, Fusarium oxysporum, Fusarium solani, Fusarium graminearum, Fusarium roseum*, and *Fusarium moniliforme*), *Gaeumannomyces graminis, Gibberella fujikuroi, Gibberella zeae, Helminthosporium graminearum, Magnaporthe* spp., *Monographella nivalis, Monilinia* spp., *Mycosphaerella* spp., *Podosphaera* spp., *Puccinia* spp., *Pyrenophora* spp. (such as *Pyrenophora graminea*), *Peronosclerospora* spp., *Peronospora* spp., *Phakopsora pachyrhizi, Pythium* spp., *Phoma* spp., *Phomopsis* spp., *Pyricularia* spp., *Rhizoctonia solani, Septoria* spp., *Sphaerotheca* spp., *Stagonospora* spp., *Pseudocercosporella* spp., *Sclerotinium* spp., *Thielaviopsis* spp., *Tilletia* spp., *Rhizopus* spp., *Typhula* spp., *Ustilago* spp., *Sphacelotheca* spp. (e.g., *Sphacelotheca reiliani*), *Thanatephorus cucumeris, Uncinula* spp., *Uromyces* spp., *Ustilago* spp., *Venturia* spp., and *Verticillium* spp.

Diseases caused by Bacterial Organisms such as *Xanthomonas* species for example *Xanthomonas campestris* pv. *oryzae*; *Pseudomonas* species for example *Pseudomonas syringae* pv. *lachrymans*; and *Erwinia* species for example *Erwinia amylovora*.

With the inclusion of insecticides (e.g., a neonicotinoid or pyrethroid insecticide) the pesticide spectrum of the combination includes control of pests selected from Nematoda, Insecta and Arachnida. In that instance, the combination can also be applied on the pest to control or prevent pest damage and protect the desired material (e.g., plant and parts of plant) from pest damage. Examples of pests include: from the order Lepidoptera, for example, *Acleris* spp., *Adoxophyes* spp., *Aegeria* spp., *Agrotis* spp., *Alabama argillaceae, Amylois* spp., *Anticarsia gemmatalis, Archips* spp., *Argyrotaenia* spp., *Autographa* spp., *Busseola fusca, Cadra cautella, Carposina nipponensis, Chilo* spp., *Choristoneura* spp., *Clysia ambiguella, Cnaphalocrocis* spp., *Cnephasia* spp., *Cochylis* spp., *Coleophora* spp., *Crocidolomia* spp., *Cryptophlebia leucotreta, Crysodeixis includens, Cydia* spp., *Diatraea* spp., *Diparopsis castanea, Earias* spp., *Elasmopalpus* spp., *Ephestia* spp., *Eucosma* spp., *Eupoecilia ambiguella, Euproctis* spp., *Euxoa* spp., *Grapholita* spp., *Hedya nubiferana, Heliothis* spp., *Hellula undalis, Hyphantria cunea, Keiferia lycopersicella, Leucoptera scitella, Lithocollethis* spp., *Lobesia botrana, Lymantria* spp., *Lyonetia* spp., *Malacosoma* spp., *Mamestra brassicae, Manduca sexta, Operophtera* spp., *Ostrinia nubilalis, Pammene* spp., *Pandemis* spp., *Panolis flammea, Pectinophora gossypiella, Phthorimaea operculella, Pieris rapae, Pieris* spp., *Plutella xylostella, Prays* spp., *Scirpophaga* spp., *Sesamia* spp., *Sparganothis* spp., *Spodoptera* spp., *Synanthedon* spp., *Thaumetopoea* spp., *Tortrix* spp., *Trichoplusia ni* and *Yponomeuta* spp.; from the order Coleoptera, for example, *Agriotes* spp., *Anthonomus* spp., *Atomaria linearis, Ceutorhynchus* spp., *Chaetocnema tibialis, Cosmopolites* spp., *Curculio* spp., *Dermestes* spp., *Diabrotica* spp., *Epilachna* spp., *Eremnus* spp., *Gonocephalum* spp., *Heteronychus* spp., *Leptinotarsa decemlineata, Lissorhoptrus* spp., *Melolontha* spp., *Orycaephilus* spp., *Otiorhynchus* spp., *Phlyctinus* spp., *Phyllotreta* spp., *Popillia* spp., *Protostrophus* spp., *Psylliodes* spp., *Rhizopertha* spp., *Scarabeidae, Sitophilus* spp., *Sitotroga* spp., *Tenebrio* spp., *Tribolium* spp. and *Trogoderma* spp.; from the order Orthoptera, for example, *Blatta* spp., *Blattella* spp., *Gryllotalpa* spp., *Leucophaea maderae, Locusta* spp., *Periplaneta* spp. and *Schistocerca* spp.; from the order Isoptera, for example, *Reticulitermes* spp.; from the order Psocoptera, for example, *Liposcelis* spp.; from the order Anoplura, for example, *Haematopinus* spp., *Linognathus* spp., *Pediculus* spp., *Pemphigus* spp. and *Phylloxera* spp.; from the order Mallophaga, for example, *Damalinea* spp. and *Trichodectes* spp.; from the order Thysanoptera, for example, *Frankliniella* spp., *Hercinothrips* spp., *Taenio-* thrips spp., *Thrips palmi*, *Thrips tabaci* and *Scirtothrips aurantii*; from the order Heteroptera, for example, *Dichelops melacanthus*, *Distantiella theobroma*, *Dysdercus* spp., *Euchistus* spp., *Eurygaster* spp., *Leptocorisa* spp., *Nezara* spp., *Piesma* spp., *Rhodnius* spp., *Sahlbergella singularis*, *Scotinophara* spp. and *Triatoma* spp.; from the order Homoptera, for example, *Aleurothrixus floccosus*, *Aleyrodes brassicae*, *Aonidiella* spp., *Aphididae*, *Aphis* spp., *Aspidiotus* spp., *Bemisia tabaci*, *Ceroplaster* spp., *Chrysomphalus aonidium*, *Chrysomphalus dictyospermi*, *Coccus hesperidum*, *Empoasca* spp., *Eriosoma larigerum*, *Erythroneura* spp., *Gascardia* spp., *Laodelphax* spp., *Lecanium corni*, *Lepidosaphes* spp., *Macrosiphus* spp., *Myzus* spp., *Nephotettix* spp., *Nilaparvata* spp., *Paratoria* spp., *Pemphigus* spp., *Planococcus* spp., *Pseudaulacaspis* spp., *Pseudococcus* spp., *Psylla* spp., *Pulvinaria aethiopica*, *Quadraspidiotus* spp., *Rhopalosiphum* spp., *Saissetia* spp., *Scaphoideus* spp., *Schizaphis* spp., *Sitobion* spp., *Trialeurodes vaporariorum*, *Trioza erytreae* and *Unaspis citri*; from the order Hymenoptera, for example, *Acromyrmex*, *Athalia rosae*, *Atta* spp., *Cephus* spp., *Diprion* spp., *Diprionidae*, *Gilpinia polytoma*, *Hoplocampa* spp., *Lasius* spp., *Monomorium pharaonis*, *Neodiprion* spp., *Solenopsis* spp. and *Vespa* spp.; from the order Diptera, for example, *Antherigona soccata*, *Bibio hortulanus*, *Ceratitis* spp., *Chrysomyia* spp., *Culex* spp., *Cuterebra* spp., *Dacus* spp., *Delia* spp., *Drosophila melanogaster*, *Liriomyza* spp., *Melanagromyza* spp., *Orseolia* spp., *Oscinella frit*, *Pegomyia hyoscyami*, *Phorbia* spp., *Rhagoletis pomonella*, *Sciara* spp.; from the order Acarina, for example, *Acarus siro*, *Aceria sheldoni*, *Aculus schlechtendali*, *Amblyomma* spp., *Argas* spp., *Brevipalpus* spp., *Bryobia praetiosa*, *Calipitrimerus* spp., *Chorioptes* spp., *Dermanyssus gallinae*, *Eotetranychus carpini*, *Eriophyes* spp., *Hyalomma* spp., *Olygonychus pratensis*, *Ornithodoros* spp., *Panonychus* spp., *Phyllocoptruta oleivora*, *Polyphagotarsonemus latus*, *Psoroptes* spp., *Rhipicephalus* spp., *Rhizoglyphus* spp., *Sarcoptes* spp., *Tarsonemus* spp. and *Tetranychus* spp.; and *from the class Nematoda, for example, the* species *of Meloidogyne* spp. (*for example, Meloidogyne incoginita* and *Meloidogyne javanica*), *Heterodera* spp. (*for example, Heterodera glycines*, *Heterodera schachtii*, *Heterodora avenae* and *Heterodora trifolii*), *Globodera* spp. (*for example, Globodera rostochiensis*), *Radopholus* spp. (*for example, Radopholus similes*), *Rotylenchulus* spp., *Pratylenchus* spp. (*for example, Pratylenchus neglectans* and *Pratylenchus penetrans*), *Aphelenchoides* spp., *Helicotylenchus* spp., *Hoplolaimus* spp., *Paratrichodorus* spp., *Longidorus* spp., *Nacobbus* spp., *Subanguina* spp. *Belonlaimus* spp., *Criconemella* spp., *Criconemoides* spp. *Ditylenchus* spp., *Dolichodorus* spp., *Hemicriconemoides* spp., *Hemicycliophora* spp., *Hirschmaniella* spp., *Hypsoperine* spp., *Macroposthonia* spp., *Melinius* spp., *Punctodera* spp., *Trichodorus* spp., *Quinisulcius* spp., *Scutellonema* spp., *Xiphinema* spp., and *Tylenchorhynchus* spp.

Polymer Nanoparticles

As used herein, the terms "polymer nanoparticles," or "active compound associated with polymer nanoparticles" refer to nanoparticles comprising one or more collapsed polymers that are associated with the active compound. In some embodiments the collapsed polymers are cross-linked. As discussed below, in some embodiments, our formulations may include aggregates of nanoparticles. Exemplary polymers and methods of preparing nanoparticles of polymer-associated active compound are described more fully below.

In some embodiments, the active compound is associated with preformed polymer nanoparticles. In some embodiments, the associating step may involve milling the active compound in the presence of pre-formed nanoparticles. It is surprising that if the active compound alone is milled under these conditions, the resulting particle size is significantly larger than if it is milled in the presence of pre-formed polymer nanoparticles. In general, size reduction processes such as milling do not enable the production of particle sizes that are produced via milling in the presence of nanoparticles of the current disclosure, without excessively long milling times. Without wishing to be bound by any theory, it is thought that interaction between the active compound and the nanoparticles during the milling process facilitates the production of smaller particles than would be formed via milling in the absence of the nanoparticles.

Non-limiting examples of milling methods that may be used for the association step can be found in U.S. Pat. No. 6,604,698 and include ball milling, bead milling, jet milling, media milling, and homogenization, as well as other milling methods known to those of skill in the art. Non-limiting examples of mills that can be for the association step include attritor mills, ball mills, colloid mills, high pressure homogenizers, horizontal mills, jet mills, swinging mills, and vibratory mills. In some embodiments, the associating step may involve milling the active compound in the presence of pre-formed polymer nanoparticles and an aqueous phase. In some embodiments, the associating step may involve wet or dry milling of the active compound in the presence of pre-formed nanoparticles. In some embodiments, the association step may involve milling the active compound and pre-formed polymer nanoparticles in the presence of one or more formulating agents.

In general, the active compound may be associated with regions of the polymer nanoparticle that elicit a chemical or physical interaction with the active compound. Chemical interactions can include hydrophobic interactions, affinity pair interactions, H-bonding, and van der Waals forces. Physical interactions can include entanglement in polymer chains or inclusion within the polymer nanoparticle structure. The active compound can be associated in the interior of the polymer nanoparticle, on the surface of the polymer nanoparticle, or both the surface and the interior of the polymer nanoparticle. Furthermore, the type of association interactions between the active compound and the polymer nanoparticle can be probed using spectroscopic techniques such as Nuclear Magnetic Resonance (NMR), Infra-Red (IR), Ultraviolet-Visible (UV-vis), and emission spectroscopies. For example, in cases where the active compound is normally crystalline when not associated with the polymer nanoparticles, the nanoparticles of polymer-associated active compounds typically do not show the endothermic melting peak or show a reduced endothermic melting peak of the pure crystalline active compound as seen in differential thermal analysis (DTA) or differential scanning calorimetry (DSC) measurements. In general, applicants have discovered that depending on the nature of the polymer nanoparticle that active compounds that are hydrophobic, water-insoluble, and/or have relatively high melting point (e.g., greater than about 60° C., or greater than about 70° C.) are best suited for association with the polymer nanoparticles described in this disclosure.

Nanoparticles of polymer-associated active compounds can be prepared with a range of average diameters, e.g., between about 1 nm and about 500 nm. The size of the nanoparticles can be adjusted in part by varying the size and number of polymers that are included in the nanoparticles. In some embodiments, the average diameter ranges from about 1 nm to about 10 nm, from about 1 nm to about 20 nm, from about 1 nm to about 30 nm, from about 1 nm to about 50 nm, from about 10 nm to about 50 nm, from about 10 nm to about 100 nm, from about 20 nm to about 100 nm, from about 20 nm to about 100 nm, from about 50 nm to about 200 nm, from about 50 nm to about 250 nm, from about 50 nm to about 300 nm, from about 100 nm to about 250 nm, from about 100 nm to about 300 nm, from about 200 nm to about 300 nm, from about 200 nm to about 500 nm, from about 250 nm to about 500 nm, or from about 300 nm to about 500 nm. These and other average diameters described herein are based on volume average particle sizes that were measured in solution by dynamic light scattering on a Malvern Zetasizer ZS in CIPAC D water, 0.1M NaCl, or in deionized water at 200 ppm active concentration. Various forms of microscopies can also be used to visualize the sizes of the nanoparticles such as atomic force microscopy (AFM), transmission electron microscopy (TEM), scanning electron microscopy (SEM) and optical microscopy.

As mentioned above, in some embodiments, the formulation may comprise aggregates of nanoparticles comprising polymer-associated active compounds. In some embodiments, these aggregates can be loose aggregates that can be separated into isolated nanoparticles by vigorous mixing, sonication, dilution, etc. In some embodiments, these aggregates are hard aggregates that cannot be separated using simple physical techniques. In some embodiments, the aggregates are aggregated due to interactions between active compounds exposed on the surface of the nanoparticles. In some embodiments, the aggregates have an average particle size between about 10 nm and about 5,000 nm when dispersed in water under suitable conditions. In some embodiments, the aggregates have an average particle size between about 10 nm and about 1,000 nm. In some embodiments, the aggregates have an average particle size between about 10 nm and about 500 nm. In some embodiments, the aggregates have an average particle size between about 10 nm and about 300 nm. In some embodiments, the aggregates have an average particle size between about 10 nm and about 200 nm. In some embodiments, the aggregates have an average particle size between about 50 nm and about 5,000 nm. In some embodiments, the aggregates have an average particle size between about 50 nm and about 1,000 nm. In some embodiments, the aggregates have an average particle size between about 50 nm and about 500 nm. In some embodiments, the aggregates have an average particle size between about 50 nm and about 300 nm. In some embodiments, the aggregates have an average particle size between about 50 nm and about 200 nm. In some embodiments, the aggregates have an average particle size between about 100 nm and about 5,000 nm. In some embodiments, the aggregates have an average particle size between about 100 nm and about 1,000 nm. In some embodiments, the aggregates have an average particle size between about 100 nm and about 500 nm. In some embodiments, the aggregates have an average particle size between about 100 nm and about 300 nm. In some embodiments, the aggregates have an average particle size between about 100 nm and about 200 nm. In some embodiments, the aggregates have an average particle size between about 500 nm and about 5000 nm. In some embodiments, the aggregates have an average particle size between about 500 nm and about 1000 nm. In some embodiments, the aggregates have an average particle size between about 1000 nm and about 5000 nm. Particle size can be measured by the techniques described above and generally the particle size of the aggregates is evidenced when the active compound composition or formulation is evaluated.

In some embodiments, the nanoparticles are prepared using a polymer that is a polyelectrolyte. Polyelectrolytes are polymers that contain monomer units of ionized or ionizable functional groups, they can be linear, branched, hyperbranched or dendrimeric, and they can be synthetic or naturally occurring. Ionizable functional groups are functional groups that can be rendered charged by adjusting solution conditions, while ionized functional group refers to chemical functional groups that are charged regardless of solution conditions. The ionized or ionizable functional group can be cationic or anionic, and can be continuous along the entire polymer chain (e.g., in a homopolymer), or can have different functional groups dispersed along the polymer chain, as in the case of a co-polymer (e.g., a random co-polymer). In some embodiments, the polymer can be made up of monomer units that contain functional groups that are either anionic, cationic, both anionic and cationic, and can also include other monomer units that impart a specific desirable property to the polymer.

In some embodiments, the polyelectrolyte is a homopolymer. Non limiting examples of homopolymer polyelectrolytes are: poly(acrylic acid), poly(methacrylic acid), poly (styrene sulfonate), poly(ethyleneimine), chitosan, poly (dimethylammonium chloride), poly(allylamine hydrochloride), and carboxymethyl cellulose.

In some embodiments, the polyelectrolyte is a co-polymer. In some embodiments, 2, 3, 4, or more different monomeric species can comprise the co-polymer. Generally, the monomer can be selected from any of the monomeric species described below, particularly include carboxylic acids, ethylene oxide acrylates, and other alpha-beta unsaturated monomers. In some embodiments, the co-polymer comprises at least on hydrophilic monomer species and at least on hydrophobic monomer species. In some embodiments, the polyelectrolyte co-polymer is poly(methacrylic acid-co-ethyl acrylate); poly(methacrylic acid-co-styrene); poly(methacrylic acid-co-butylmethacrylate); poly[acrylic acid-co-poly(ethylene glycol) methyl ether methacrylate]; or poly(n-butylmethacrylcate-co-methacrylic acid).

In some embodiments, the polyelectrolyte can be made from one or more monomer units to form homopolymers, copolymers or graft copolymers of: carboxylic acids including acrylic acid, methacrylic acid, itaconic acid, and maleic acid; polyoxyethylenes or polyethyleneoxide; and unsaturated ethylenic mono or dicarboxylic acids; lactic acids; amino acids; amines including dimethlyammonium chloride, allylamine hydrochloride; along with other monomers such including methacrylic acid; ethyleneimine; ethylene; ethylene glycol; alkyl acrylates including methyl acrylate, ethyl acrylate, propyl acrylate, n-butyl acrylate ("BA"), isobutyl acrylate, 2-ethyl acrylate, and t-butyl acrylate; methacrylates including ethyl methacrylate, n-butyl methacrylate, and isobutyl methacrylate; acrylonitriles; methacrylonitrile; vinyls including vinyl acetate and partially hydrolyzed poly(vinyl acetate), vinylversatate, vinylpropionate, vinylformamide, vinylacetamide, vinylpyridines, and vinyllimidazole; vinylnapthalene, vinylnaphthalene sulfonate, vinylpyrrolidone, vinyl alcohol; aminoalkyls including aminoalkylacrylates, aminoalkylsmethacrylates, and aminoalkyl(meth)acrylamides; styrenes including styrene sulfonate, 2-Acrylamido-2-methylpropane sulfonic acid; d-glucosamine; glucaronic acid-N-acetylglucosamine; N-isopropylacrylamide; or vinyl amine. In some embodiments, the polyelectrolyte polymer can include groups derived from polysaccharides such as dextran, gums, cellulose, or carboxymethyl cellulose.

In some embodiments presenting co-polymers with two species of monomers the mass ratio of the monomer species (e.g., methacrylic acid to ethyl acrylate in the poly(methacrylic acid co-ethyl acrylate)) polymer is between about 50:50 and about 95:5. It is to be understood that any of the previously described monomers can be used in any of the ratio described herein. In some embodiments, the mass ratio of methacrylic acid to ethyl acrylate in the poly(methacrylic acid co-ethyl acrylate) polymer is between about 70:30 and about 95:5. In some embodiments, the mass ratio of methacrylic acid to ethyl acrylate in the poly(methacrylic acid co-ethyl acrylate) polymer is between about 80:20 and about 95:5. In some embodiments, the mass ratio of methacrylic acid to ethyl acrylate in the poly(methacrylic acid co-ethyl acrylate) polymer is between about 85:15 and about 95:5.

In some embodiments, the mass ratio of methacrylic acid to styrene in the poly(methacrylic acid-co-styrene) polymer is between about 50:50 and about 95:5. In some embodiments, the mass ratio of methacrylic acid to styrene in the poly(methacrylic acid-co-styrene) polymer is between about 70:30 and about 95:5. In some embodiments, the mass ratio of methacrylic acid to styrene in the poly(methacrylic acid-co-styrene) polymer is between about 80:20 and about 95:5. In some embodiments, the mass ratio of methacrylic acid to styrene in the poly(methacrylic acid-co-styrene) polymer is between about 85:15 and about 95:5. Additionally, a third, fourth, or fifth monomer species may be present in any amount up to about 40 percent by weight.

In some embodiments, the polyelectrolyte polymer has a weight average molecular weight between about 10,000 and about 4,000,000 Daltons. In some embodiments, the polyelectrolyte polymer has a weight average molecular weight of between about 10,000 and about 20,000 Daltons. In some embodiments, the polyelectrolyte polymer has a weight average molecular weight of between about 10,000 and about 50,000 Daltons. In some embodiments, the polyelectrolyte polymer has a weight average molecular weight of between about 10,000 and about 75,000 Daltons. In some embodiments, the polyelectrolyte polymer has a weight average molecular weight of between about 10,000 and about 100,000 Daltons. In some embodiments, the polyelectrolyte polymer has a weight average molecular weight of between about 10,000 and about 150,000 Daltons. In some embodiments, the polyelectrolyte polymer has a weight average molecular weight of between about 10,000 and about 200,000 Daltons.

In some embodiments, the polyelectrolyte polymer has a weight average molecular weight of between about 20,000 and about 50,000 Daltons. In some embodiments, the polyelectrolyte polymer has a weight average molecular weight of between about 20,000 and about 75,000 Daltons. In some embodiments, the polyelectrolyte polymer has a weight average molecular weight of between about 20,000 and about 100,000 Daltons. In some embodiments, the polyelectrolyte polymer has a weight average molecular weight of between about 20,000 and about 150,000 Daltons. In some embodiments, the polyelectrolyte polymer has a weight average molecular weight of between about 20,000 and about 200,000 Daltons. In some embodiments, the polyelectrolyte polymer has a weight average molecular weight of between about 50,000 and about 100,000 Daltons. In some embodiments, the polyelectrolyte polymer has a weight average molecular weight of between about 50,000 and about 150,000 Daltons. In some embodiments, the polyelectrolyte polymer has a weight average molecular weight of between about 20,000 and about 200,000 Daltons.

In some embodiments, the polyelectrolyte polymer has a weight average molecular weight of between about 100,000 and about 2,000,000 Daltons. In some embodiments, the polyelectrolyte polymer has a weight average molecular weight of between about 100,000 and about 1,000,000 Daltons. In some embodiments, the polyelectrolyte polymer has a weight average molecular weight of between about 100,000 and about 750,000 Daltons. In some embodiments, the polyelectrolyte polymer has a weight average molecular weight of between about 100,000 and about 500,000 Daltons. In some embodiments, the polyelectrolyte polymer has a weight average molecular weight of between about 100,000 and about 200,000 Daltons. In some embodiments, the polyelectrolyte polymer has a weight average molecular weight of between about 200,000 and about 2,000,000 Daltons. In some embodiments, the polyelectrolyte polymer has a weight average molecular weight of between about 200,000 and about 1,000,000 Daltons. In some embodiments, the polyelectrolyte polymer has a weight average molecular weight of between about 200,000 and about 500,000 Daltons. In some embodiments, the polyelectrolyte polymer has a weight average molecular weight of between about 300,000 and about 2,000,000 Daltons. In some embodiments, the polyelectrolyte polymer has a weight average molecular weight of between about 300,000 and about 1,000,000 Daltons. In some embodiments, the polyelectrolyte polymer has a weight average molecular weight of between about 300,000 and about 500,000 Daltons.

In some embodiments, the apparent molecular weight of the polyelectrolyte polymer (e.g., the molecular weight determined via certain analytical measurements such as size exclusion chromatography including gel permeation chromatography or DLS) is lower than the actual molecular weight of a polymer due to crosslinking within the polymer. In some embodiments, a crosslinked polyelectrolyte polymer of the present disclosure might have a higher actual molecular weight than the experimentally determined apparent molecular weight. In some embodiments, a crosslinked polyelectrolyte polymer of the present disclosure might be a high molecular weight polymer despite having a low apparent molecular weight.

Nanoparticles of polymer-associated active compounds and/or aggregates of these nanoparticles can be part of a formulation in different amounts. The final amount will depend on many factors including the type of formulation (e.g., liquid or solid, granule or powder, concentrated or not, etc.). In some instances, the nanoparticles (including both the polymer and active compound components) make up between about 1 and about 98 weight % of the total formulation. In some embodiments, the nanoparticles make up between about 1 and about 90 weight % of the total formulation. In some embodiments, the nanoparticles make up between about 1 and about 75 weight % of the total formulation. In some embodiments, the nanoparticles make up between about 1 and about 50 weight % of the total formulation. In some embodiments, the nanoparticles make up between about 1 and about 30 weight % of the total formulation. In some embodiments, the nanoparticles make up between about 1 and about 25 weight % of the total formulation. In some embodiments, the nanoparticles make up between about 1 and about 10 weight % of the total formulation. In some embodiments, the nanoparticles make up between about 10 and about 25 weight % of the total formulation. In some embodiments, the nanoparticles make up between about 10 and about 30 weight % of the total formulation. In some embodiments, the nanoparticles make up between about 10 and about 50 weight % of the total formulation. In some embodiments, the nanoparticles make up between about 10 and about 75 weight % of the total formulation. In some embodiments, the nanoparticles make up between about 10 and about 90 weight % of the total formulation. In some embodiments, the nanoparticles make up between about 10 and about 98 weight % of the total formulation. In some embodiments, the nanoparticles make up between about 25 and about 50 weight % of the total formulation. In some embodiments, the nanoparticles make up between about 25 and about 75 weight % of the total formulation. In some embodiments, the nanoparticles make up between about 25 and about 90 weight % of the total formulation. In some embodiments, the nanoparticles make up between about 30 and about 98 weight % of the total formulation. In some embodiments, the nanoparticles make up between about 50 and about 90 weight % of the total formulation. In some embodiments, the nanoparticles make up between about 50 and about 98 weight % of the total formulation. In some embodiments, the nanoparticles make up between about 75 and about 90 weight % of the total formulation. In some embodiments, the nanoparticles make up between about 75 and about 98 weight % of the total formulation.

It is to be noted that not all of the active compounds may be associated with polymer nanoparticles. In particular, phenylamide fungicides may not be associated with polymer nanoparticles. In some embodiments, the phenylamide fungicide is added to the active compound composition or formulation, and mixed or milled with the other components. In some embodiments, the phenylamide fungicide may comprise between about 1 and about 25 weight % of the total formulation. In some embodiments, the phenylamide fungicide may comprise between about 1 and about 5 weight % of the total formulation. In some embodiments, the phenylamide fungicide may comprise between about 1 and about 10 weight % of the total formulation. In some embodiments, the phenylamide fungicide may comprise between about 1 and about 15 weight % of the total formulation. In some embodiments, the phenylamide fungicide may comprise between about 1 and about 20 weight % of the total formulation. In some embodiments, the phenylamide fungicide may comprise between about 5 and about 10 weight % of the total formulation. In some embodiments, the phenylamide fungicide may comprise between about 5 and about 15 weight % of the total formulation. In some embodiments, the phenylamide fungicide may comprise between about 5 and about 20 weight % of the total formulation. In some embodiments, the phenylamide fungicide may comprise between about 5 and about 25 weight % of the total formulation.

In some embodiments, the nanoparticles of polymer-associated active compounds are prepared according to a method disclosed in U.S. Patent Application Publication No. 20100210465, the entire contents of which are incorporated herein by reference. In some embodiments, polymer nanoparticles without active compounds are made by collapse of a polyelectrolyte with a collapsing agent and then rendering the collapsed conformation permanent by intra-particle cross-linking. The active compound is then associated with this preformed polymer nanoparticle. In some embodiments, the formulation contains the same amount (by weight) of active compound and polymer, while in other embodiments the ratio of active compound to polymer (by weight) can be between about 1:10 and about 10:1, between about 1:10 and about 1:5, between about 1:5 and about 1:4, between about 1:4 and about 1:3, between about 1:3 and about 1:2, between about 1:2 and about 1:1, between about 1:5 and about 1:1, between about 5:1 and about 1:1, between about 2:1 and about 1:1, between about 3:1 and about 2:1, between about 4:1 and about 3:1, between about 5:1 and about 4:1, between about 10:1 and about 5:1, between about 1:3 and about 3:1, between about 5:1 and about 1:1, between about 1:5 and about 5:1, or between about 1:2 and about 2:1.

Adjuvants

Co-formulation ingredients include those products or ingredients that contain inorganic cations and may be selected from one or more of adjuvants, antifoam agents, antimicrobial agents, buffering agents, corrosion inhibitors, defoaming agents, deposition agents, dispersants, drift control agents, dyes, freezing point depressants, neutralizing agents, penetration aids, sequestering agents, spreading agents, stabilizers, sticking agents, suspension aids, viscosity-modifying additives, wetting agents and the like.

In some embodiments, a formulation may include a dispersant or wetting agent or both. In some embodiments, the same compound may act as both a dispersant and a wetting agent. A dispersant is a compound that helps the nanoparticles (or aggregates of nanoparticles) disperse in water. Without wishing to be bound by any theory, dispersants are thought to achieve this result by absorbing on to the surface of the nanoparticles and thereby limiting re-aggregation. Wetting agents increase the spreading or penetration power of a liquid when placed onto the substrate (e.g., leaf). Without wishing to be bound by any theory, wetting agents are thought to achieve this result by reducing the interfacial tension between the liquid and the substrate surface.

In a similar manner, some formulating agents may demonstrate multiple functionality. The categories and listings of specific agents below are not mutually exclusive. For example, fumed silica, described below in the thickener/anti-settling agent and anti-caking agent sections, is typically used for these functions. In some embodiments, however, fumed or hydrophilic silica demonstrates the functionality of a wetting agent and/or dispersant. Specific formulating agents listed below are categorized based on their primary functionality, however, it is to be understood that particular formulating agents may exhibit multiple functions. Certain formulation ingredients display multiple functionalities and synergies with other formulating agents and may demonstrate superior properties in a particular formulation but not in another formulation.

In some embodiments, a dispersant or wetting agent is selected from organosilicones (e.g., Sylgard 309 from Dow Corning Corporation or Silwet L77 from Union Carbide Corporation) including polyalkylene oxide modified polydimethylsiloxane (Silwet L7607 from Union Carbide Corporation), methylated seed oil, and ethylated seed oil (e.g., Scoil from Agsco or Hasten from Wilfarm), alkylpolyoxyethylene ethers (e.g., Activator 90), alkylarylalolates (e.g., APSA 20), alkylphenol ethoxylate and alcohol alkoxylate surfactants (e.g., products sold by Huntsman), fatty acid, fatty ester and fatty amine ethoxylates (e.g., products sold by Huntsman), products sold by Cognis such as sorbitan and ethoxylated sorbitan esters, ethoxylated vegetable oils, alkyl, glycol and glycerol esters and glycol ethers, tristyrylphenol ethoxylates, anionic surfactants such as sulfonates and sulfosuccinates, alkylaryl sulphonates, alkyl napthalene sulfonates (e.g., products sold by Adjuvants Unlimited), calcium alkyl benzene sulphonates, phosphate esters (e.g., products sold by Huntsman Chemical or BASF), as salts of sodium, potassium, ammonium, magnesium, triethanolamine (TEA), etc.

Other specific examples of the above sulfates include ammonium lauryl sulfate, magnesium lauryl sulfate, sodium 2-ethyl-hexyl sulfate, sodium actyl sulfate, sodium oleyl sulfate, sodium tridecyl sulfate, triethanolamine lauryl sulfate, ammonium linear alcohol, ether sulfate ammonium nonylphenol ether sulfate, and ammonium monoxynol-4- sulfate. Other examples of dispersants and wetting agents include, sulfo succinamates, disodium N-octadecylsulfosuccinamate; tetrasodium N-(1,2-dicarboxyethyl)-N-octadecylsulfo-succinamate; diamyl ester of sodium sulfosuccinic acid; dihexyl ester of sodium sulfosuccinic acid; and dioctyl esters of sodium sulfosuccinic acid; dihexyl ester of sodium sulfosuccinic acid; and dioctyl esters of sodium sulfosuccinic acid; castor oil and fatty amine ethoxylates, including sodium, potassium, magnesium or ammonium salts thereof. Dispersants and wetting agents also include natural emulsifiers, such as lecithin, fatty acids (including sodium, potassium or ammonium salts thereof) and ethanolamides and glycerides of fatty acids, such as coconut diethanolamide and coconut mono- and diglycerides. Dispersants and wetting agents also include sodium polycarboxylate (commercially available as Geropon TA/72); sodium salt of naphthalene sulfonate condensate (commercially available as Morwet (D425, D809, D390, EFW); calcium naphthalene sulfonates (commercially available as DAXAD 19LCAD); sodium lignosulfonates and modified sodium lignosulfonates; aliphatic alcohol ethoxylates; ethoxylated tridecyl alcohols (commercially available as Rhodasurf (BC420, BC610, BC720, BC 840); Ethoxylated tristeryl phenols (commercially available as Soprophor BSU); sodium methyl oleyl taurate (commercially available as Geropon T-77); tristyrylphenol ethoxylates and esters; ethylene oxide-propylene oxide block copolymers; non-ionic copolymers (e.g., commercially available Atlox 4913); and non-ionic block copolymers (commercially available as Atlox 4912). Examples of dispersants and wetting agents include, but are not limited to, sodium dodecylbenzene sulfonate; N-oleyl N-methyl taurate; 1,4-dioctoxy-1,4-di-oxo-butane-2-sulfonic acid; sodium lauryl sulphate; sodium dioctyl sulphosuccinate; aliphatic alcohol ethoxylates; and nonylphenol ethoxylates. Dispersants and wetting agents also include sodium taurates; sodium or ammonium salts of maleic anhydride copolymers, and lignosulfonic acid formulations; condensed sulfonate sodium, potassium, magnesium or ammonium salts; polyvinylpyrrolidone (available commercially as Polyplasdone XL-10 from International Specialty Products or as Kollidon C1 M-10 from BASF Corporation); polyvinyl alcohols; modified or unmodified starches, methylcellulose, hydroxyethyl or hydroxypropyl methylcellulose, and carboxymethyl methylcellulose; and combinations, such as a mixture of either lignosulfonic acid formulations or condensed sulfonate sodium, potassium, magnesium or ammonium salts with polyvinylpyrrolidone (PVP).

In some embodiments, the dispersants and wetting agents can combine to make up between about 0.5 and about 30 weight % of the formulation. For example, dispersants and wetting agents can make up between about 0.5 and about 20 weight %, about 0.5 and about 10 weight %, between about 0.5 and about 5 weight %, between about 0.5 and about 3 weight %, between about 1 and about 30 weight %, between about 1 and about 20 weight %, between about 1 and about 10 weight %, between about 1 and about 5 weight %, between about 2 and about 30 weight %, between about 2 and about 20 weight %, between about 2 and about 10 weight %, between about 2 and about 5 weight %, between about 3 and about 30 weight %, between about 3 and about 20 weight %, between about 3 and about 10 weight %, between about 3 and about 5 weight %, between about 5 and about 30 weight %, between about 5 and about 20 weight %, between about 5 and about 10 weight % of the formulation. In some embodiments, dispersants or wetting agents can make up between about 0.1 and 1 weight % of the formulation, between about 0.1 and 2 weight % of the formulation between about 0.1 and 3 weight % of the formulation between about 0.1 and 5 weight % of the formulation, between about 0.1 and 10 weight % of the formulation.

In some embodiments, a formulation may include an inert filler. For example, an inert filler may be included to produce or promote cohesion in forming a wettable granule formulation. An inert filler may also be included to give the formulation a certain active loading, density, or other similar physical properties. Nonlimiting examples of inert fillers that may be used in a formulation include bentonite clay, carbohydrates, proteins, lipids synthetic polymers, glycolipids, glycoproteins, lipoproteins, lignin, lignin derivatives, and combinations thereof. In a preferred embodiment, the inert filler is a lignin derivative and is optionally calcium lignosulfonate. In some embodiments, the inert filler is selected from the group consisting of: monosaccharides, disaccharides, oligosaccharides, polysaccharides and combinations thereof. Specific carbohydrate inert fillers illustratively include glucose, mannose, fructose, galactose, sucrose, lactose, maltose, xylose, arabinose, trehalose and mixtures thereof such as corn syrup; sugar alcohols including: sorbitol, xylitol, ribitol, mannitol, galactitol, fucitol, iditol, inositol, volemitol, isomalt, maltitol, lactitol, polyglycitol; celluloses such as carboxymethylcellulose, ethylcellulose, hydroxyethylcellulose, hydroxy-methylethylcellulose, hydroxyethylpropylcellulose, methylhydroxyethylcellulose, methylcellulose; starches such as amylose, seagel, starch acetates, starch hydroxyethyl ethers, ionic starches, long-chain alkyl starches, dextrins, amine starches, phosphates starches, and dialdehyde starches; plant starches such as corn starch and potato starch; other carbohydrates such as pectin, amylopectin, xylan, glycogen, agar, alginic acid, phycocolloids, chitin, gum arabic, guar gum, gum karaya, gum tragacanth and locust bean gum; vegetable oils such as corn, soybean, peanut, canola, olive and cotton seed; complex organic substances such as lignin and nitrolignin; derivatives of lignin such as lignosulfonate salts illustratively including calcium lignosulfonate and sodium lignosulfonate; and complex carbohydrate-based formulations containing organic and inorganic ingredients such as molasses. Suitable protein inert fillers illustratively include soy extract, zein, protamine, collagen, and casein. Inert fillers operative herein also include synthetic organic polymers capable of promoting or producing cohesion of particle components and such inert fillers illustratively include ethylene oxide polymers, polyacrylamides, polyacrylates, polyvinyl pyrrolidone, polyethylene glycol, polyvinyl alcohol, polyvinylmethyl ether, polyvinyl acrylates, polylactic acid, and latex.

In some embodiments, a formulation contains between about 1 and about 90 weight % inert filler, e.g., between about 1 and about 80 weight %, between about 1 and about 60 weight %, between about 1 and about 40 weight %, between about 1 and about 25 weight %, between about 1 and about 10 weight %, between about 10 and about 90 weight %, between about 10 and about 80 weight %, between about 10 and about 60 weight %, between about 10 and about 40 weight %, between about 10 and about 25 weight %, between about 25 and about 90 weight %, between about 25 and about 80 weight %, between about 25 and about 60 weight %, between about 25 and about 40 weight %, between about 40 and about 90 weight %, between about 40 and about 80 weight %, or between about 60 and about 90 weight %.

In some embodiments, a formulation may include a solvent or a mixture of solvents that can be used to assist in controlling the solubility of the active ingredient itself, the nanoparticles of polymer-associated active ingredients, or other components of the formulation. For example, the solvent can be chosen from water, alcohols, alkenes, alkanes, alkynes, phenols, hydrocarbons, chlorinated hydrocarbons, ketones, ethers, and mixtures thereof. In some embodiments, the formulation contains a solvent or a mixture of solvents that makes up about 0.1 to about 90 weight % of the formulation. In some embodiments, a formulation contains between about 0.1 and about 90 weight % solvent, e.g., between about 1 and about 80 weight %, between about 1 and about 60 weight %, between about 1 and about 40 weight %, between about 1 and about 25 weight %, between about 1 and about 10 weight %, between about 10 and about 90 weight %, between about 10 and about 80 weight %, between about 10 and about 60 weight %, between about 10 and about 40 weight %, between about 10 and about 25 weight %, between about 25 and about 90 weight %, between about 25 and about 80 weight %, between about 25 and about 60 weight %, between about 25 and about 40 weight %, between about 40 and about 90 weight %, between about 40 and about 80 weight %, between about 60 and about 90 weight %, between about 0.1 and about 10 weight %, between about 0.1 and about 5 weight %, between about 0.1 and about 3 weight %, between about 0.1 and about 1 weight %, between about 0.5 and about 20 weight %, between about 0.5 and about 10 weight %, between about 0.5 and about 5 weight %, between about 0.5 and about 3 weight %, between about 0.5 and about 1 weight %, between about 1 and about 20 weight %, between about 1 and about 10 weight %, between about 1 and about 5 weight %, between about 1 and about 3 weight %, between about 5 and about 20 weight %, between about 5 and about 10 weight %, or between about 10 or about 20 weight %.

In some embodiments, a formulation may include a surfactant. When included in formulations, surfactants can function as wetting agents, dispersants, emulsifying agents, solubilizing agents and bioenhancing agents. Without limitation, particular surfactants may be anionic surfactants, cationic surfactants, nonionic surfactants, amphoteric surfactants, silicone surfactants (e.g., Silwet L77), and fluorosurfactants. Exemplary anionic surfactants include alkylbenzene sulfonates, olefinic sulfonate salts, alkyl sulfonates and ethoxylates, sulfosuccinates, phosphate esters, taurates, alkylnaphthalene sulfonates and polymers lignosulfonates. Exemplary nonionic surfactants include alkylphenol ethoxylates, aliphatic alcohol ethoxylates, aliphatic alkylamine ethoxylates, amine alkoxylates, sorbitan esters and their ethoxylates, castor oil ethoxylates, ethylene oxide/propylene oxide copolymers and polymeric surfactants, non-ionic copolymers (e.g., commercially available Atlox 4913), anionic copolymers (e.g., Atlox Metasperse 100L, 500L, 550S), and non-ionic block copolymers (commercially available as Atlox 4912). In some embodiments, surfactants can make up between about 0.1 and about 20 weight % of the formulation, e.g., between about 0.1 and about 15 weight %, between about 0.1 and about 10 weight %, between about 0.1 and about 8 weight %, between about 0.1 and about 6 weight %, between about 0.1 and about 4 weight %, between about 1-15 weight %, between about 1 and about 10 weight %, between about 1 and about 8 weight %, between about 1 and about 6 weight %, between about 1 and about 4 weight %, between about 3 and about 20 weight %, between about 3 and about 15 weight %, between about 3 and about 10 weight %, between about 3 and about 8 weight %, between about 3 and about 6 weight %, between about 5 and about 15 weight %, between about 5 and about 10 weight %, between about 5 and about 8 weight %, or between about 10 and about 15 weight %. In some embodiments, a surfactant (e.g., a non-ionic surfactant) may be added to a formulation by the end user, e.g., in a spray tank. Indeed, when a formulation is added to the spray tank it becomes diluted and, in some embodiments, it may be advantageous to add additional surfactant in order to maintain the nanoparticles in dispersed form.

Suitable non-ionic surfactants also include alkyl polyglucosides (APGs). Alkyl polyglucosides which can be used in the adjuvant composition herein include those corresponding to the formula: $R4O(R5O)_b(Z3)_a$ wherein R4 is a monovalent organic radical of from 6 to 30 carbon atoms; R5 is a divalent alkylene radical of from 2 to 4 carbon atoms; Z3 is a saccharide residue of 5 or 6 carbon atoms; a is a number ranging from 1 to 6; and, b is a number ranging from 0 to 12. More specifically R4 is a linear C6 to C12 group, b is 0, Z3 is a glucose residue, and a is 2. Some non-limiting examples of commercially available alkyl polyglucosides include, e.g., APG™, AGNIQUE™, and AGRIMUL™ surfactants from Cognis Corporation (now owned by BASF), and AG™ series surfactants from Akzo Nobel Surface Chemistry, LLC.

In some embodiments, a formulation may include an anti-settling agent or thickener that can help provide stability to a liquid formulation or modify the rheology of the formulation. Examples of anti-settling agents or thickeners include, but are not limited to, guar gum; locust bean gum; xanthan gum; carrageenan; alginates; methyl cellulose; sodium carboxymethyl cellulose; hydroxyethyl cellulose; modified starches; polysaccharides and other modified polysaccharides; polyvinyl alcohol; glycerol alkyd resins such as Latron B-1956 from Rohm & Haas Co., plant oil based materials (e.g., cocodithalymide) with emulsifiers; polymeric terpenes; microcrystalline cellulose; methacrylates; poly(vinylpyrrolidone), syrups, polyethylene oxide, hydrophobic silica, hydrated silica and fumed or hydrophilic silica (e.g., AEROSIL™ 380). One of the advantages of the disclosed invention is the potential elimination of some organic thickeners from the active compound compositions. In some embodiments, xanthan gum, guar gum, carrageen and other organic thickeners are entirely absent, although inorganic thickeners may still be a part of those active compound compositions and formulations. In some embodiments, anti-settling agents or thickeners can make up between about 0.05 and about 10 weight % of the formulation, e.g., about 0.05 to about 5 weight %, about 0.05 to about 3 weight %, about 0.05 to about 1 weight %, about 0.05 to about 0.5 weight %, about 0.05 to about 0.1 weight %, about 0.1 to about 5 weight %, about 0.1 to about 3 weight %, about 0.1 to about 2 weight %, about 0.1 to about 1 weight %, about 0.1 to about 0.5 weight %, about 0.5 to about 5 weight %, about 0.5 to about 3 weight %, about 0.5 to about 1 weight %, about 1 to about 10 weight %, about 1 to about 5 weight %, or about 1 to about 3 weight %. In some embodiments, it is explicitly contemplated that a formulation of the present disclosure does not include a compound whose primary function is to act as an anti-settling or thickener. In some embodiments, compounds included in a formulation may have some anti-settling or thickening functionality, in addition to other, primary functionality, so anti-settling or thickening functionality is not a necessary condition for exclusion, however, formulation agents used primarily or exclusively as anti-settling agents or thickeners may be expressly omitted from the formulations.

In some embodiments, a formulation may include one or more preservatives that prevent microbial or fungal degradation of the product during storage. Examples of preservatives include but are not limited to, tocopherol, ascorbyl palmitate, propyl gallate, butylated hydroxyanisole (BHA), butylated hydroxytoluene (BHT), propionic acid and its sodium salt; sorbic acid and its sodium or potassium salts; benzoic acid and its sodium salt; p-hydroxy benzoic acid sodium salt; methyl p-hydroxy benzoate; 1,2-benzisothiazalin-3-one, and combinations thereof. In some embodiments, preservatives can make up about 0.01 to about 0.2 weight % of the formulation, e.g., between about 0.01 and about 0.1 weight %, between about 0.01 and about 0.05 weight %, between about 0.01 and about 0.02 weight %, between about 0.02 and about 0.2 weight %, between about 0.02 and about 0.1 weight %, between about 0.02 and about 0.05 weight %, between about 0.05 and about 0.2 weight %, between about 0.05 and about 0.1 weight %, or between about 0.1 and about 0.2 weight %.

In some embodiments, a formulation may include anti-freezing agents, anti-foaming agents, and/or anti-caking agents that help stabilize the formulation against freezing during storage, foaming during use, or caking during storage. Examples of anti-freezing agents include, but are not limited to, ethylene glycol, propylene glycol, and urea. In certain embodiment a formulation may include between about 0.5 and about 10 weight % anti-freezing agents, e.g., between about 0.5 and about 5 weight %, between about 0.5 and about 3 weight %, between about 0.5 and about 2 weight %, between about 0.5 and about 1 weight %, between about 1 and about 10 weight %, between about 1 and about 5 weight %, between about 1 and about 3 weight %, between about 1 and about 2 weight %, between about 2 and about 10 weight %, between about 3 and about 10 weight %, or between about 5 and about 10 weight %.

Examples of anti-foaming agents include, but are not limited to, silicone based anti-foaming agents (e.g., aqueous emulsions of dimethyl polysiloxane, FG-10 from DOW-CORNING®, Trans 10A from Trans-Chemo Inc.), and non-silicone based anti-foaming agents such as octanol, nonanol, and silica. In some embodiments, a formulation may include between about 0.05 and about 5 weight % of anti-foaming agents, e.g., between about 0.05 and about 0.5 weight %, between about 0.05 and about 1 weight %, between about 0.05 and about 0.2 weight %, between about 0.1 and about 0.2 weight %, between about 0.1 and about 0.5 weight %, between about 0.1 and about 1 weight %, or between about 0.2 and about 1 weight %.

Examples of anti-caking agents include sodium or ammonium phosphates, sodium carbonate or bicarbonate, sodium acetate, sodium metasilicate, magnesium or zinc sulfates, magnesium hydroxide (all optionally as hydrates), sodium alkylsulfosuccinates, silicious compounds, magnesium compounds, C10-C22 fatty acid polyvalent metal salt compounds, and the like. Illustrative of anti-caking ingredients are attapulgite clay, kieselguhr, silica aerogel, silica xerogel, perlite, talc, vermiculite, sodium aluminosilicate, aluminosilicate clays (e.g., Montmorillonite, Attapulgite, etc.) zirconium oxychloride, starch, sodium or potassium phthalate, calcium silicate, calcium phosphate, calcium nitride, aluminum nitride, copper oxide, magnesium aluminum silicate, magnesium carbonate, magnesium silicate, magnesium nitride, magnesium phosphate, magnesium oxide, magnesium nitrate, magnesium sulfate, magnesium chloride, and the magnesium and aluminum salts of C10-C22 fatty acids such as palmitic acid, stearic acid and oleic acid. Anti-caking agents also include refined kaolin clay, amorphous precipitated silica dioxide, such as Hi Sil 233 available from PPG Industries, refined clay, such as Hubersil available from Huber Chemical Company, or fumed or hydrophilic silica (e.g., AEROSIL™ 380). In some embodiments, a formulation may include between about 0.05 and about 10 weight % anti-caking agents, e.g., between about 0.05 to 5 weight %, between about 0.05 and about 3 weight %, between about 0.05 and about 2 weight %, between about 0.05 and about 1 weight %, between about 0.05 and about 0.5 weight %, between about 0.05 and about 0.1 weight %, between about 0.1 and about 5 weight %, between about 0.1 and about 3 weight %, between about 0.1 and about 2 weight %, between about 0.1 and about 1 weight %, between about 0.1 and about 0.5 weight %, between about 0.5 and about 5 weight %, between about 0.5 and about 3 weight %, between about 0.5 and about 2 weight %, between about 0.5 and about 1 weight %, between about 1 to 3 weight %, between about 1 to 10 weight %, and between about 1 and about 5 weight %.

In some embodiments, a formulation may include a UV-blocking compound that can help protect the active ingredient from degradation due to UV irradiation. Examples of UV-blocking compounds include ingredients commonly found in sunscreens such as benzophenones, benzotriazoles, homosalates, alkyl cinnamates, salicylates such as octyl salicylate, dibenzoylmethanes, anthranilates, methylbenzylidenes, octyl triazones, 2-phenylbenzimidazole-5-sulfonic acid, octocrylene, triazines, cinnamates, cyanoacrylates, dicyano ethylenes, etocrilene, drometrizole trisiloxane, bisethylhexyloxyphenol methoxyphenol triazine, drometrizole, dioctyl butamido triazone, terephthalylidene dicamphor sulfonic acid and para-aminobenzoates as well as ester derivatives thereof, UV-absorbing metal oxides such as titanium dioxide, zinc oxide, and cerium oxide, and nickel organic compounds such as nickel bis (octylphenol) sulfide, etc. Additional examples of each of these classes of UV-blockers may be found in Kirk-Othmer, Encyclopedia of Chemical Technology. In some embodiments, a formulation may include between about 0.01 and about 2 weight % UV-blockers, e.g., between about 0.01 and about 1 weight %, between about 0.01 and about 0.5 weight %, between about 0.01 and about 0.2 weight %, between about 0.01 and about 0.1 weight %, between about 0.01 and about 0.05 weight %, between about 0.05 weight % and about 1 weight %, between about 0.05 and about 0.5 weight %, between about 0.05 and about 0.2 weight %, between about 0.05 and about 0.1 weight %, between about 0.1 and about 1 weight %, between about 0.1 and about 0.5 weight %, between about 0.1 and about 0.2 weight %, between about 0.2 and about 1 weight %, between about 0.2 and about 0.5 weight %, and between about 0.5 and about 1 weight %. In some embodiments, it is explicitly contemplated that a formulation of the present disclosure does not include a compound whose primary function is to act as a UV-blocker. In some embodiments, compounds included in a formulation may have some UV-blocking functionality, in addition to other, primary functionality, so UV-blocking is not a necessary condition for exclusion, however, formulation agents used primarily or exclusively as UV-blockers may be expressly omitted from the formulations.

In some embodiments, a formulation may include a disintegrant that can help a solid formulation break apart when added to water. Examples of suitable disintegrants include cross-linked polyvinyl pyrrolidone, modified cellulose gum, pregelatinized starch, cornstarch, modified corn starch (e.g., Starch 1500) and sodium carboxymethyl starch (e.g., Explotab or Primojel), microcrystalline cellulose, sodium starch glycolate, sodium carboxymethyl cellulose, carmellose, carmellose calcium, carmellose sodium, croscarmellose sodium, carmellose calcium, carboxymethylstarch sodium, low-substituted hydroxypropyl cellulose, hydroxypropyl methylcellulose, hydroxypropyl cellulose, soy polysaccharides (e.g., EMCOSOY), alkylcelullose, hydroxyalkylcellulose, alginates (e.g., Satialgine), dextrans and poly(alkylene oxide) and an effervescent couple (e.g., citric or ascorbic acid plus bicarbonate), lactose, anhydrous dibasic calcium phosphate, dibasic calcium phosphate, magnesium aluminometasilicate, synthesized hydrotalcite, silicic anhydride and synthesized aluminum silicate. In some embodiments, disintegrants can make up between about 1 and about 20 weight % of the formulation, e.g., between about 1 and about 15 weight %, between about 1 and about 10 weight %, between about 1 and about 8 weight %, between about 1 and about 6 weight %, between about 1 and about 4 weight %, between about 3 and about 20 weight %, between about 3 and about 15 weight %, between about 3 and about 10 weight %, between about 3 and about 8 weight %, between about 3 and about 6 weight %, between about 5 and about 15 weight %, between about 5 and about 10 weight %, between about 5 and about 8 weight %, or between about 10 and about 15 weight %.

The active compound compositions of the invention can be applied directly to the soil to control soil-borne or soil-welling pests. Methods of application to the soil can be any suitable method which insures that the active compound compositions penetrate the soil and are near the plants, plant propagation material, or expected loci of plants and plant propagation materials. Application methods include, but are not limited to in furrow application, T-band (or other band) application, soil injection, soil drench, drip irrigation, application through sprinklers or central pivot, and incorporation to the soil (e.g., broadcast).

The active compound compositions of the invention can be diluted so that any one of the active compound concentrations is less than about 1%, prior to application. In some embodiments, the concentration of any one active compound is less than about 0.5%, less than about 0.25%, less than about 1.5%, less than about 2% or less than about 2.5%. These dilutions, the tank-mix of the active compound compositions, is then applied to the plant to be treated, its locus, or the soil to which a plant or plant propagation material will be planted. In preparing tank-mix dilutions, the active compound compositions can be mixed with water, liquid fertilizer or any other diluent suitable for agricultural applications. Additionally, surfactants (e.g., non-ionic, anionic) can also be added to tank-mixes, as well as micronutrient additives, or any other suitable additive known in the art.

The term "plant propagation material" is understood to denote all the generative parts of the plant, such as seeds, which can be used for multiplication of the latter and vegetative plant material such as cutting and tubers. Plant propagation material also includes roots, fruits, tubers, bulbs, rhizomes and parts of plants. Germinated plants and young plants, which are to be transplanted after germination or after emergence from the soil may also be included in this term. These young plants may be protected before transplantation by a total or partial treatment with the active compound compositions of the invention by any application method (e.g., immersion, drench, drip irrigation).

EXAMPLES

Example 1: Microscopy 1193.81 grams of bifenthrin active (97% purity, 1158 g active compound), 166.2 grams Morwet D425, 28.2 grams of Stepwet DF-90, 60 grams AEROSIL™ 380 were weighed and wetted with water and added to a homogenizer. 366.67 grams of propylene glycol (99% purity), 24 grams of Trans 10A solution (0.12% solution in water), 12.44 grams of PROXEL™ BD-20 biocide solution (0.04% solution), and about 900 grams of nanoparticle solution (90:10 MMA-EA copolymer at 4.16% concentration) were added to the homogenizer. The homogenizer was started and ramped to a speed of 7427 rpm. After 60 minutes, the speed is reduced to 500 rpm, 36 grams of the Trans 10A solution are added, with 3 mL of Surfynol 104 (50% solution in water), 242.45 grams of AGNIQUE™ 9116 (50% solution in water) and about 1020 grams of nanoparticle solutions (90:10 MMA-EA copolymer at 4.16% concentration in water). The homogenizer speed was increased to 7247 rpm and maintained for 75 more minutes. The speed is then reduced and the solution allowed to defoam for 2 hours. After which 36 grams of the Trans 10A solution are added, with 1.2 mL of Surfynol 104 (50% solution in water). The mixture was transferred to a Dynomill and milled for 2.5 hours until the particle size was 500 nm on average via Mastersizer. After milling, 12 grams of Surfynol solution and 72 grams of Trans 10A solution were added after the solution was mixed for 30 minutes and mixed for an addition 1 hour at 75 rpm with a U-shaped stirrer.

Figure 3:
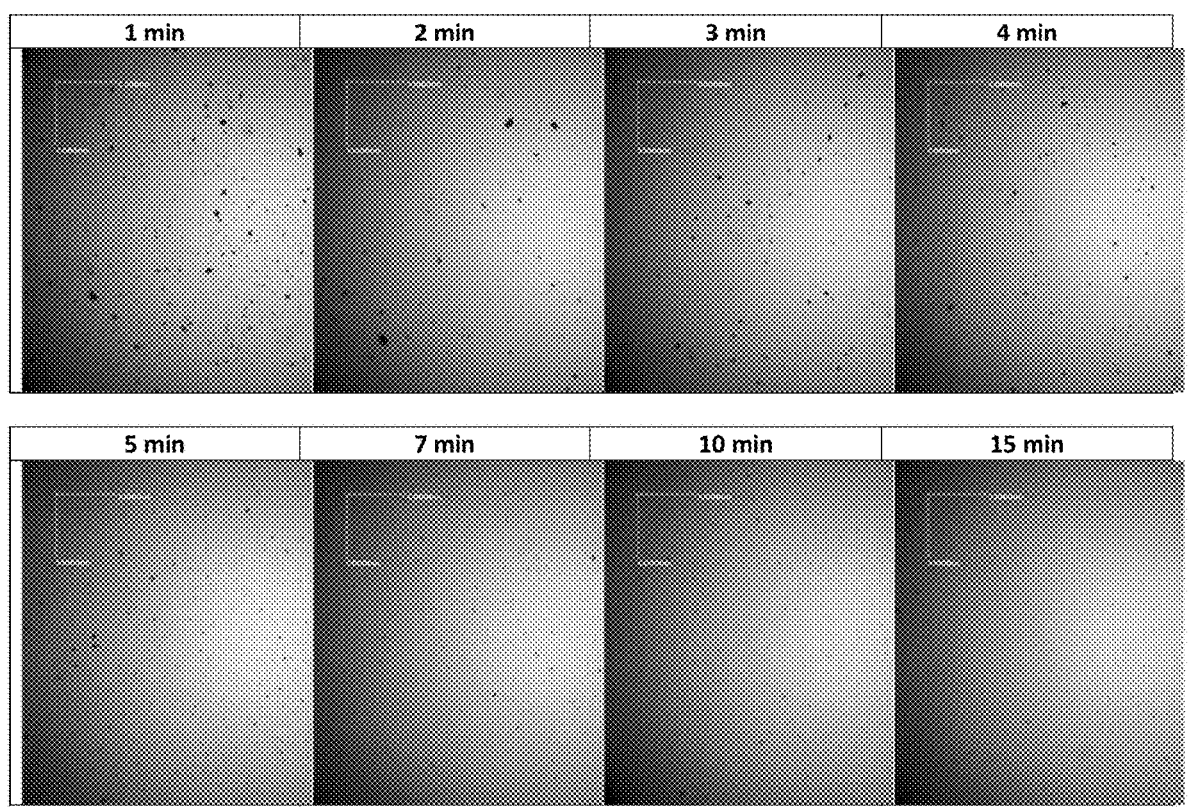
FIGS. 3 and 4 are a series of microscope images (FIG. 3 at 40× magnification.
Figure 4:
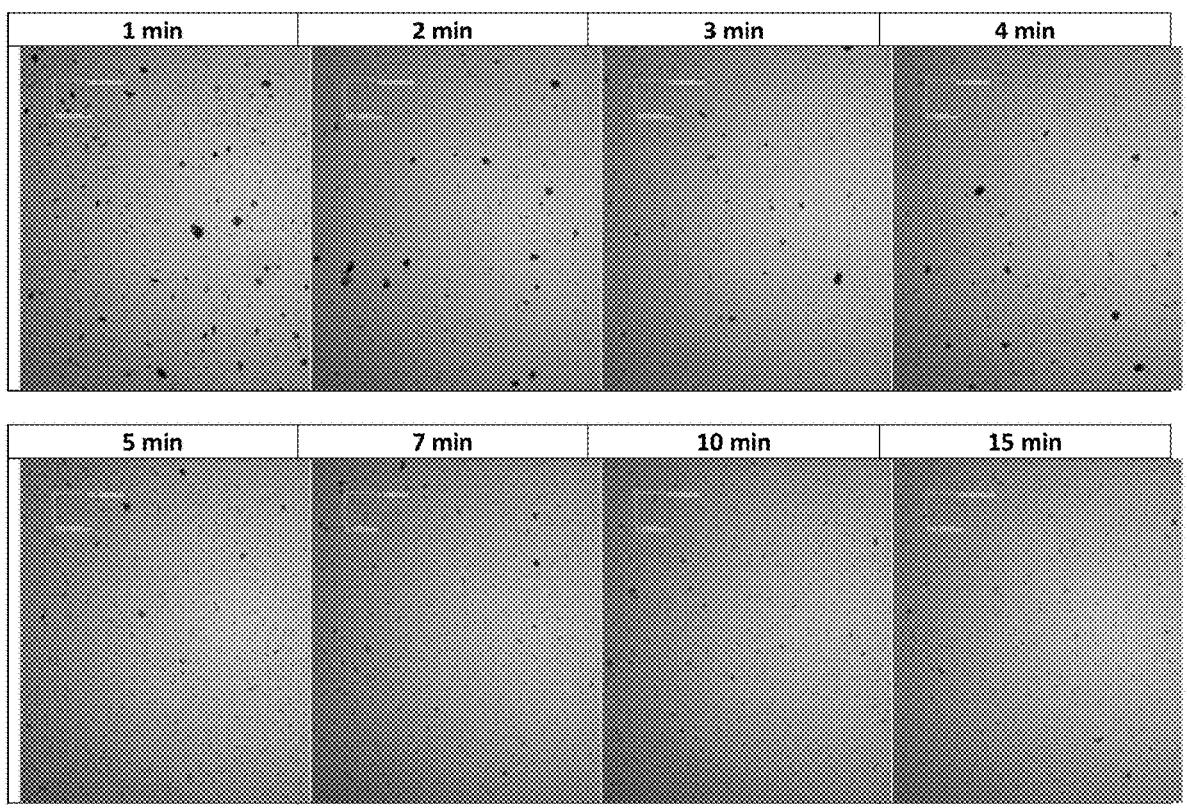

The formulation prepared above was mixed with 10-34-0 liquid fertilizer (Alpine) and microscope images taken at various times after mixing. Approximately 10 mL of liquid fertilizer was added to a 20 mL glass vial. A stir bar was added, and the liquid fertilizer was stirred at 650 rpm. 3 drops (approx. 1 mL each) of the formulation were added, dropwise, to the surface of the liquid fertilizer. The mixture was stirred for 1 minute, and then imaged on an Omax microscope. Further images were taken after 2, 3, 4, 5, 7, 10 and 15 minutes of stirring. See FIGS. 3 and 4.

Example 2: Post Mixing Xanthan Gum (Thickener Added to Reduce Syneresis)

304.5 grams of bifenthrin active (98.5% purity, 300 g active compound), 45 grams Morwet D425, 7.5 grams of Stepwet DF-90, 15 grams AEROSIL™ 380 were weighed and wetted with water and added to a homogenizer. 98.5 grams of propylene glycol (1009% purity), 5 grams of Trans 10A solution (0.12% solution in water), 4.21 grams of PROXEL™ BD-20 biocide solution (0.04% solution), and about 594 grams of nanoparticle solution (90:10 MMA-EA copolymer at 4.16% concentration) were added to the homogenizer. The homogenizer was started and ramped to a speed of 5500 rpm. After 12 minutes the speed is reduced to 500 rpm, 10 grams of the Trans 10A solution are added. The homogenizer speed was increased to 5500 rpm, but was reduced after 10 minutes to allow foaming to subside. This cycle was repeated twice for a total homogenization time of 30 minutes after the addition of the 10 grams of Trans 10A.

The mixture was transferred to a Dynomill and milled for 1 hour until the particle size was 500 nm on average via Mastersizer. 240 grams of the formulation was mixed with 10.2987 of AGNIQUE™ PG9116 with a Cole-Parmer Lab-GEN7 homogenizer, then stirred overnight at 1250 rpm. This mixture was then diluted with 2.02 g of water to an active content of 17.81%.

The formulation prepared demonstrated an above acceptable level of syneresis. Three different variations of the formulation were prepared. The first, Sample 56, included the addition of an alkyl polyglucoside surfactant to the finished formulation (AGNIQUE™ 9116) to a concentration of 4.11% of the total weight of the formulation. The second variation, Sample 72, included the addition of an alkyl polyglucoside (AGNIQUE™ 9116) and the further addition of water of 10.1% of the total formulation. The last, Sample 83, included the addition of an alkyl polyglucoside surfactant (AGNIQUE™ 9116) to 4.11% by weight of the total formulation and 10.2% by weight of a 1% Xanthan gum solution (Satiaxane CX 100) to the formulation.

Figure 5:
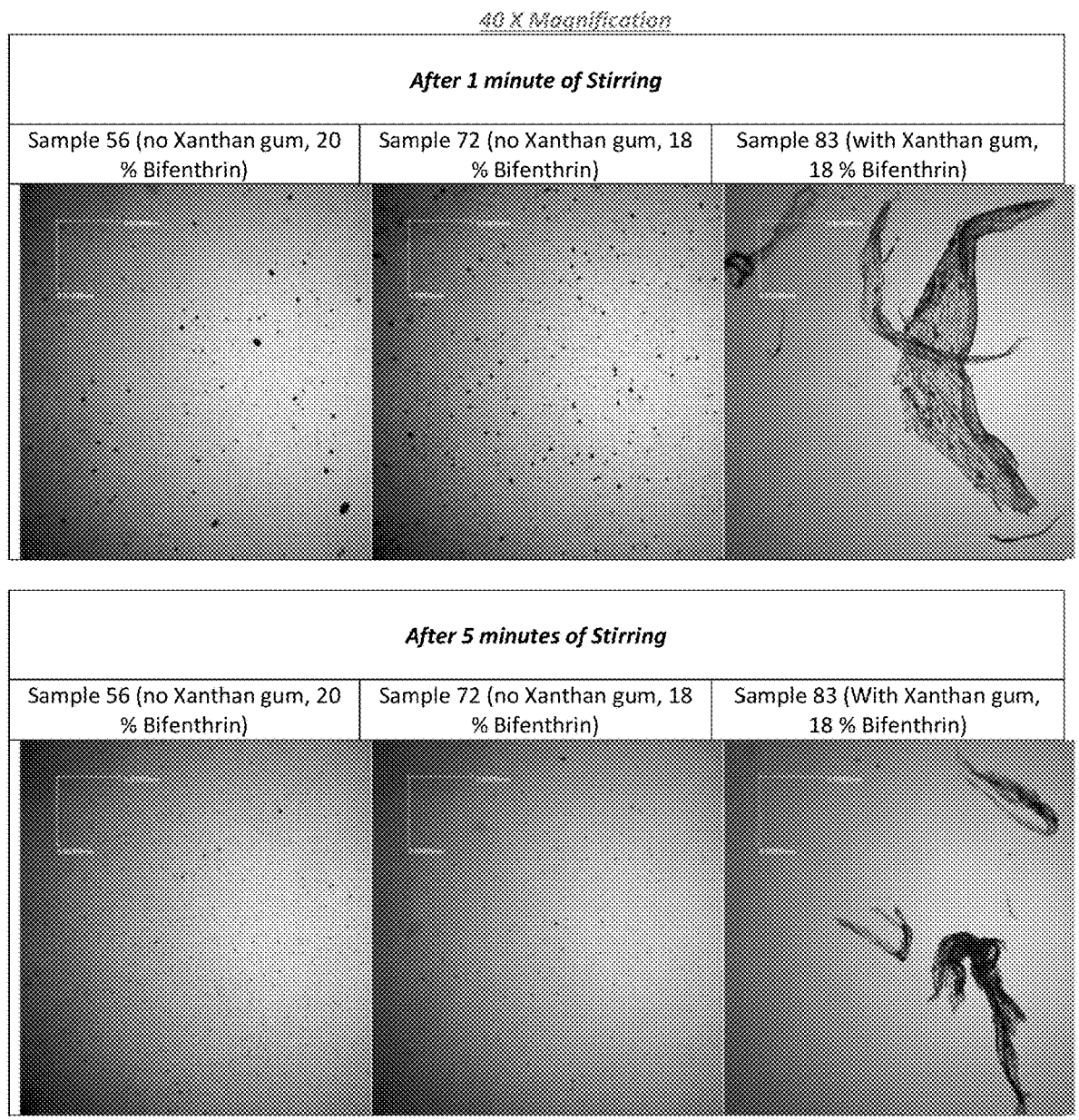
FIGS. 5 and 6 are a series of microscope images (FIG. 5 at 40× magnification.
Figure 6:
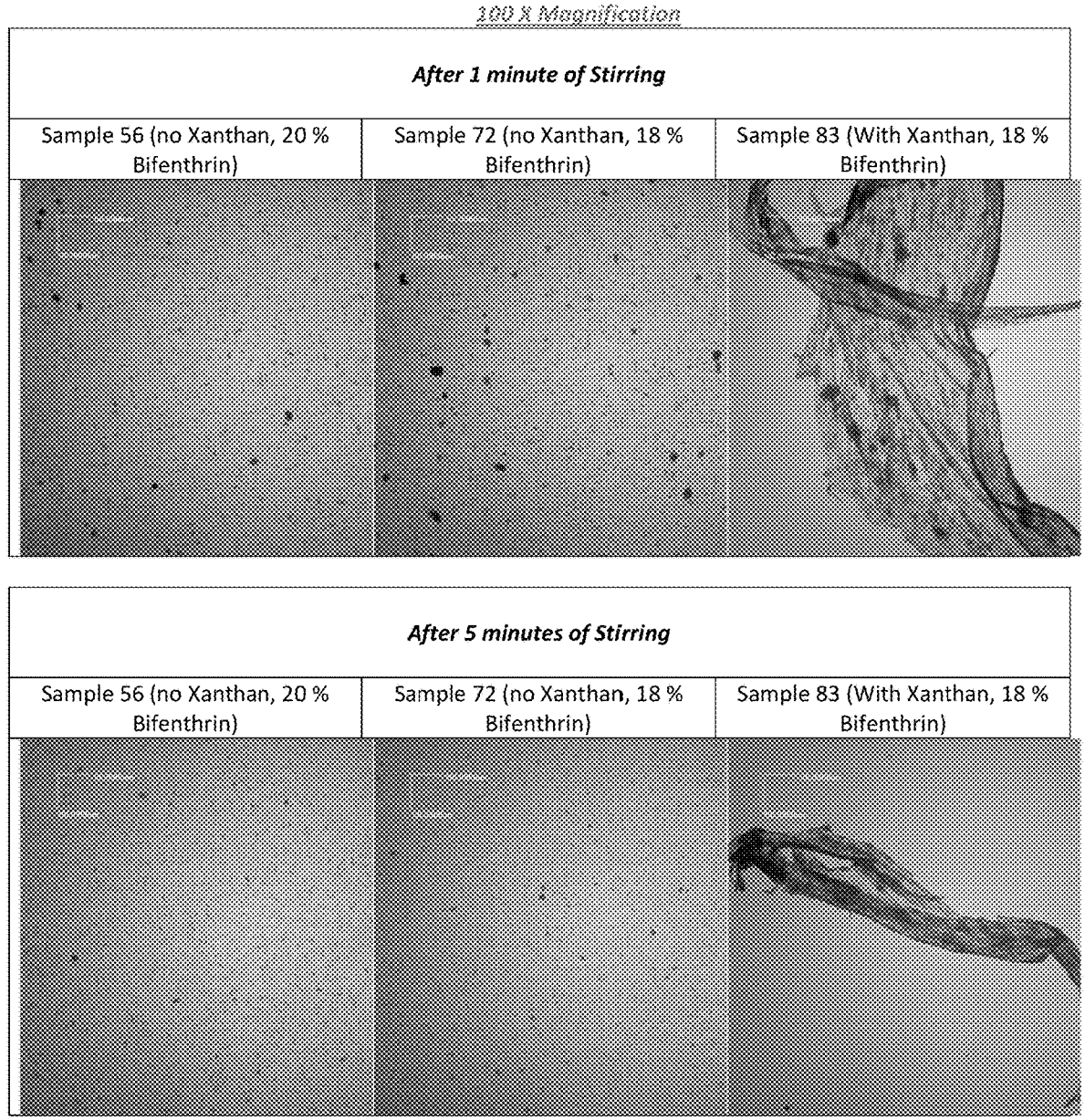
Figure 7:
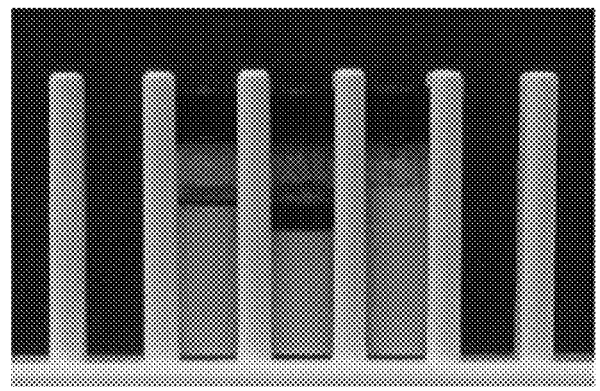
FIG. 7 is a photograph of the three formulations from Figures. 5 and 6 in concentrated form after two weeks of storage.

To test the liquid fertilizer compatibility of each, the following mixing process was used, repeated for each formulation variation: Approximately 10 mL of 10-34-0 liquid fertilizer (Alpine) was added to a 20 mL glass vial. A stir bar was added, and the liquid fertilizer was stirred at 650 rpm. 3 drops (approx. 1 mL each) of the particular formulation variation were added, dropwise, to the surface of the liquid fertilizer. The mixture was stirred for 1 minute, and then imaged on an Omax microscope. After an additional four minutes of stirring, the samples were imaged again. As can be seen from FIGS. 5, 6 and 7, although the addition of the Xanthan gum reduced formulation separation, the compatibility of the formulation with liquid fertilizer is unacceptable. When mixed with liquid fertilizer Sample 83 formed very large aggregates.

Example 3: Balancing Separation & LF Compatibility 586.33 grams of bifenthrin active (98.8% purity, 579 g active compound), 83.1 grams Morwet D425, 14.1 grams of Stepwet DF-90, 30 grams AEROSIL™ 380 were weighed, mixed and wetted with water. The mixture was transferred to a homogenizer. 181.5 grams of propylene glycol (100% purity), 12 grams of Trans 10A solution (0.12% solution in water), 7.77 grams of PROXEL™ BD-20 biocide solution (0.04% solution), and about 20 grams of nanoparticle solution (90:10 MMA-EA copolymer at 4.16% concentration) were added to the homogenizer. The homogenizer was started and ramped to a speed of 7000 rpm. After 30 minutes, the speed is reduced to 500 rpm, 12 grams of the Trans 10A solution are added, with 1 mL of Surfynol 104 (50% solution in water), 118.8 grams of AGNIQUE™ 9116 (50% solution in water) and about 935 grams of nanoparticle solutions (90:10 MMA-EA copolymer at 4.16% concentration in water), the mixture was mixed and allowed to defoam. After which 12 grams of the Trans 10A solution are added, with 2.6 mL of Surfynol 104 (50% solution in water). The mixture was transferred to a Dynomill and milled for 1 hour until the particle size was 500 nm on average via Mastersizer. After milling, 4.8 grams of Surfynol solution and 36 grams of Trans 10A solution were added after the solution was mixed for 30 minutes and mixed for an addition 1 hour at 75 rpm with a U-shaped stirrer.

390.89 grams of bifenthrin active (98.8% purity, 386 g active compound), 26.6 grams Morwet D425, 9.4 grams of Stepwet DF-90, 27.6 grams AEROSIL™ 380 were weighed and wetted with water and added to a homogenizer. 121 grams of propylene glycol (99% purity), 8.0 grams of Trans 10A solution (0.12% solution in water), 5.18 grams of PROXEL™ BD-20 biocide solution (0.04% solution) were added to the homogenizer. The homogenizer was started and ramped to a speed of 6000 rpm. After 50 minutes the speed is reduced to 500 rpm, 8.0 grams of the Trans 10A solution are added, with 1 mL of Surfynol 104 (50% solution in water). The solution was defoamed, then 106.4 grams of AGNIQUE™ 9116 (50% solution in water) and 637 grams of nanoparticle solutions (90:10 MMA-EA copolymer at 4.16% concentration in water) were added. The homogenizer speed was increased to 3000 rpm and maintained for 80 more minutes, then the speed was increased to 4000 rpm for 20 more minutes. The speed is then reduced to zero and the solution allowed to defoam for 2 hours. After which 8.0 grams of the Trans 10A solution are added, with 1.5 mL of Surfynol 104 (50% solution in water). The mixture was transferred to a Dynomill and milled for 1 hour until the particle size was 500 nm on average via Mastersizer. After milling, 1.6 grams of Surfynol 104 solution and 24 grams of Trans 10A solution were added after the solution was mixed for 30 minutes and mixed for an addition 1 hour at 75 rpm with a U-shaped stirrer.

The formulation production took longer than excepted to reduce the particle size in the pre-mix stage. The pre-mix was very hard to defoam, as a result some of the post-mix allocated Surfynol was used in the pre-mix stage (0.10% pre-milling and 0.04% post-milling). Even with this modification the defoaming was very slow. But the formulation milled exactly the same as the other samples.

A sample of this formulation was stored for 8 weeks at 45° C. after this period the formulation demonstrated approximately 16 to 18 percent syneresis. Another sample of this formulation was stored for 4 weeks in a temperature cycling chamber in which the temperature changed from −10° C. to −45° C. After Storage stability testing in the cycling chamber for 4 weeks the formulation sample demonstrated approximately 21 percent syneresis. A third sample was taking for accelerated storage testing. This sample was stored for 2 weeks at 54° C. The sample demonstrated about 6.3% syneresis into two layers: a brown, translucent upper layer or liquid, and lower, off-white, opaque liquid layer. The sample flowed with inversion and the two layers dispersed with shaking.

Another sample of the formulation was stored for 6 months at room temperature (25-27° C. and visual observations were noted each month.

TABLE 3

| Time | Percent Syneresis | Notes on Appearance |
|---|---|---|
| 1 Months | 13% (8 mm of 62 mm height) | No indication of caking; Clear brown upper layer; opaque off-white lower layer. Slight fissuring |
| 3 Months (12 weeks) | ~20% | Reddish/brownish upper, off-white lower |
| 4 Months (16 weeks) | ~21% (13 mm of 62 mm height) | no indication of caking; Clear brown upper layer; opaque off-white lower layer |
| 5 Months (20 weeks) | ~21% (13 mm of 62 mm height) | |

390.89 grams of bifenthrin active (98.8% purity, 386 g active compound), 26.6 grams Morwet D425, 9.4 grams of Stepwet DF-90, 35.4 grams AEROSIL™ 380 and 10 grams AEROSIL™ R972 were weighed, mixed and wetted with water. The wetting process was difficult and had to be stirred by hand. The mixture was transferred to a homogenizer. 121 grams of propylene glycol (99% purity), 8.0 grams of Trans 10A solution (0.12% solution in water), 5.18 grams of PROXEL™ BD-20 biocide solution (0.04% solution) were added to the homogenizer. The homogenizer was started and ramped to a speed of 5500 rpm. After 50 minutes the speed is reduced to 500 rpm, 8.0 grams of the Trans 10A solution are added, with 1 mL of Surfynol 104 (50% solution in water). The solution was defoamed, then 106.4 grams of AGNIQUE™ 9116 (50% solution in water) and 637 grams of nanoparticle solutions (90:10 MMA-EA copolymer at 4.16% concentration in water) were added. The homogenizer speed was increased to 2000 rpm and maintained for 80 more minutes. The speed is then reduced to zero and the solution allowed to defoam for 2 hours. After which 8.0 grams of the Trans 10A solution are added, with 1.5 mL of Surfynol 104 (50% solution in water). The mixture was transferred to a Dynomill and milled for 1 hour until the particle size was 500 nm on average via Mastersizer. After milling, 4 grams of Surfynol 104 solution and 24 grams of Trans 10A solution were added after the solution was mixed for 30 minutes and mixed for an addition 1 hour at 75 rpm with a U-shaped stirrer.

A sample of this formulation was stored for 8 weeks at 45° C. after this period the formulation demonstrated approximately 8 to 10 percent syneresis. Another sample of this formulation was stored for 4 weeks in a temperature cycling chamber in which the temperature changed from −10° C. to −45° C. After Storage stability testing in the cycling chamber for 4 weeks the formulation sample demonstrated approximately 17 to 22 percent syneresis.

A third sample was taking for accelerated storage testing. This sample was stored for 2 weeks at 54° C. The sample demonstrated about 0.68% syneresis into two layers: an off-white solid gel upper layer and a lower, off-white, opaque liquid layer. The sample flowed easily with inversion and the two layers dispersed with shaking.

Another sample of the formulation was stored for 6 months at room temperature (25-27° C. and visual observations were noted each month.

TABLE 4

| Time | Percent Syneresis | Notes on Appearance |
|---|---|---|
| 1 Months | 0.5-3% | |
| 3 Months (12 weeks) | ~10% | Reddish/brownish upper, off-white lower |
| 4 Months (16 weeks) | ~11% (7 mm of 64 mm height) | Clear brown upper layer; opaque off-white lower layer |
| 5 Months (20 weeks) | ~12.5% (8 mm of 64 mm height) | |

390.89 grams of bifenthrin active (98.8% purity, 386 g active compound), 26.6 grams Morwet D425, 9.4 grams of Stepwet DF-90, 27.6 grams AEROSIL™ 380 and 10 grams AEROSIL™ R972 were weighed, mixed and wetted with water then transferred to a homogenizer. 121 grams of propylene glycol (99% purity), 8.0 grams of Trans 10A solution (0.12% solution in water), 5.5 grams of PROXEL™ BD-20 biocide solution (0.04% solution) were added to the homogenizer. The homogenizer was started and ramped to a speed of 6500 rpm, after five minutes the speed is reduced to 5000 rpm for 40 minutes. The speed is reduced and 8.0 grams of the Trans 10A solution are added, with 1 mL of Surfynol 104 (50% solution in water). The solution was defoamed, then 106.4 grams of AGNIQUE™ 9116 (50% solution in water) and 637 grams of nanoparticle solutions (90:10 MMA-EA copolymer at 4.16% concentration in water) were added. The homogenizer speed was increased to 2042 rpm and maintained for 30 more minutes with the addition of one mL of Surfynol 104. The speed is then reduced to zero and the solution allowed to defoam for 20 minutes. After which 8.0 grams of the Trans 10A solution are added, with 1 mL of Surfynol 104 (50% solution in water). The mixture was transferred to a Dynomill and milled for 1 hour until the particle size was 500 nm on average via Mastersizer. After milling, 2.4 grams of Surfynol 104 solution and 24 grams of Trans 10A solution were added after the solution was mixed for 30 minutes and mixed for an addition 1 hour at 80 rpm with a U-shaped stirrer.

The formulation was extremely hard to defoam, requiring a total of 60 minutes to defoam and the average particle size was very slow to drop at the pre-mix stage. It is was discovered that 2 of the screws of the homogenizer head were slightly loose. This might have led to decrease efficiency of homogenizing and entraining more air.

A sample of this formulation was stored for 8 weeks at 45° C. after this period the formulation demonstrated approximately 11 to 13 percent syneresis. Another sample of this formulation was stored for 4 weeks in a temperature cycling chamber in which the temperature changed from −10° C. to −45° C. After Storage stability testing in the cycling chamber for 4 weeks the formulation sample demonstrated approximately 6 to 8 percent syneresis.

A third sample was taking for accelerated storage testing. This sample was stored for 2 weeks at 54° C. The sample demonstrated about 2.9% syneresis into two layers: an upper tan/yellow translucent layer and a lower, off-white, opaque liquid layer. The sample did not flow with inversion and required vigorous shaking to flow and re-disperse the two layers. Once re-dispersed, the formulation did not separate again after overnight storage at room temperature.

Another sample of the formulation was stored for 6 months at room temperature (25-27° C. and visual observations were noted each month.

TABLE 5

| Time | Percent Syneresis | Notes on Appearance |
|---|---|---|
| 1 Months | 6.5% | Syneresis, but no indication of caking; Clear brown upper layer; opaque off-white lower layer. No fissuring |
| 3 Months (12 weeks) | ~15% | Reddish/brownish upper, off-white lower |
| 4 Months (16 weeks) | ~17.5% (11 mm of 63 mm height) | no indication of caking; Clear brown upper layer; opaque off-white lower layer |
| 5 Months (20 weeks) | ~17.5% (11 mm of 63 mm height) | |

TABLE 6

| Sample J | entire sample flowed well with tipping - some coating - not a copious amount - | substantial dissipation of coating some darker spots in base under light - this is likely/could be residual liquid accumulating and flowing-off certain parts of the bottle | looks clean |
|---|---|---|---|
| Sample K | flowed to base with tipping coating - portions of the coating dissipate - visible as areas of clarified container wall | dissipation of material/ coating from vessel walls still some residue in heel and base area of the bottle - could be liquid accumulating and flowing-off certain parts of the bottle | looks clean similar to Sample J, better than Alt I |
| Sample L | entire sample flowed very nicely to the base of the vessel some coating - can see this dissipating with flow/ tipping | substantial dissipation of residual material and coating some darker spots in base - could be liquid as noted above residue/coating is almost gone | very clean |

Figure 8:
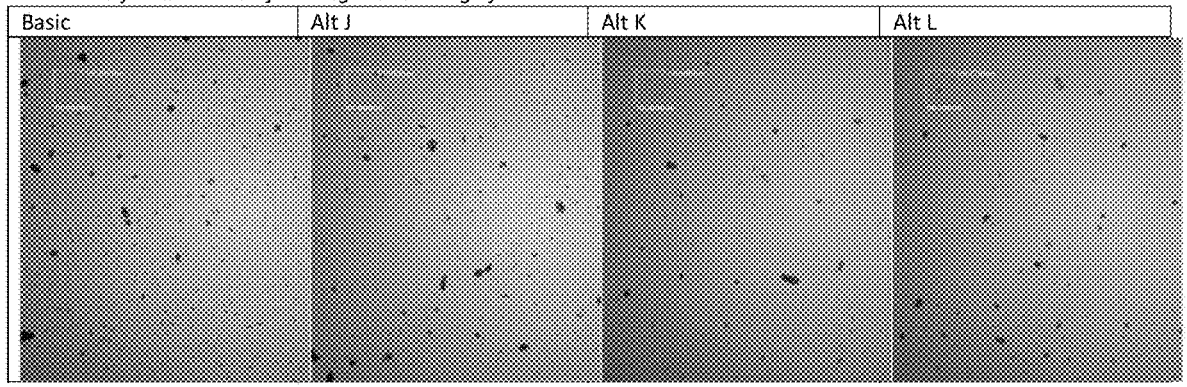
FIGS. 8 and 9 are a series of microscope images (FIG. 8 at 40× magnification.
Figure 8:
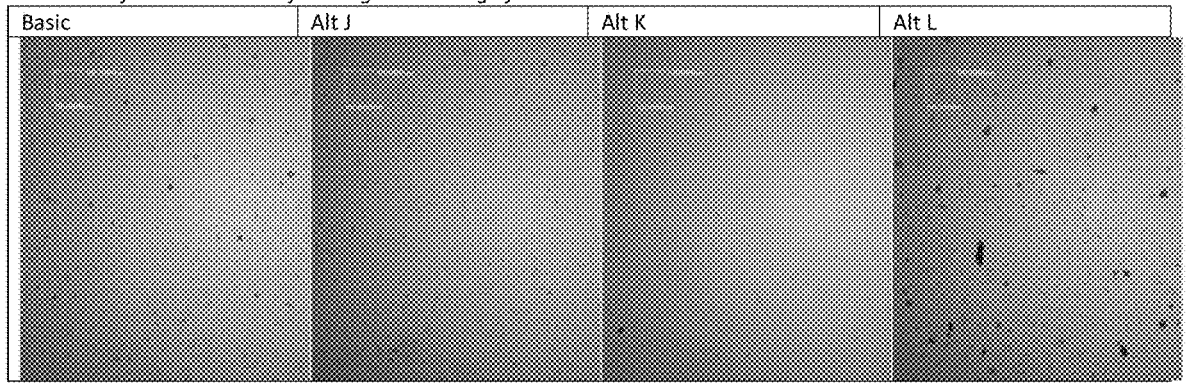
Figure 9:
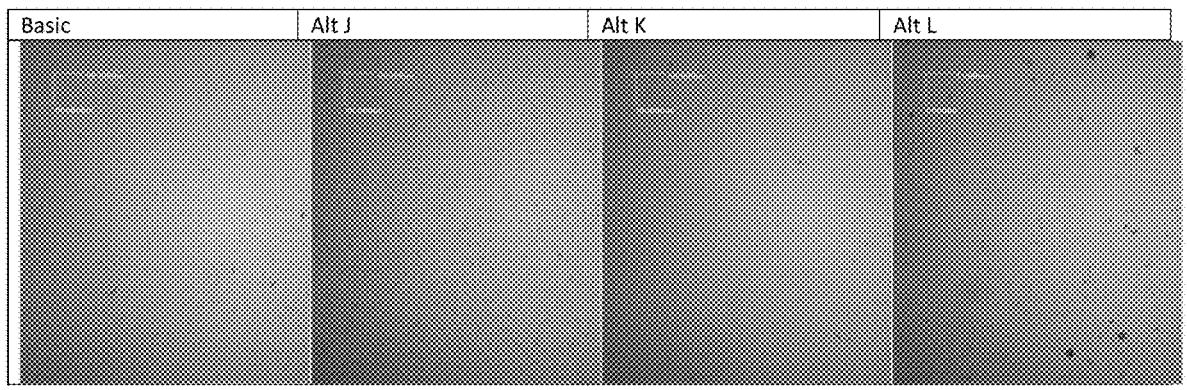
Figure 9:
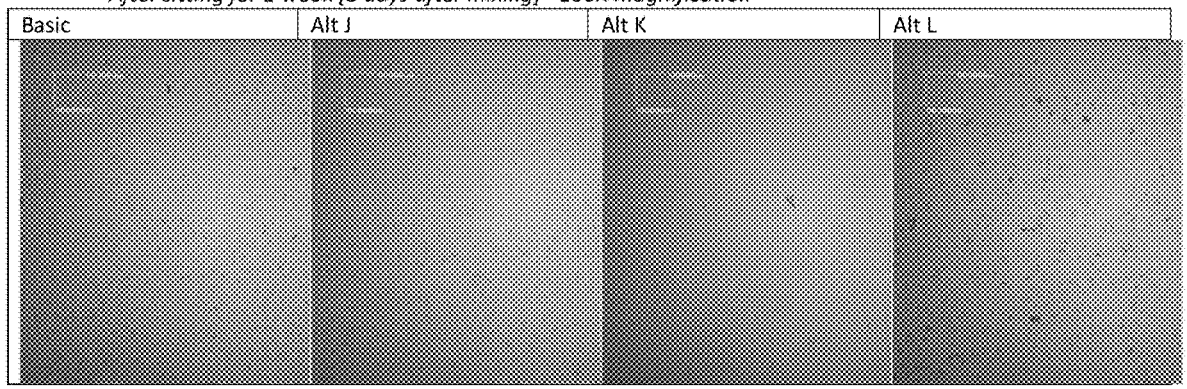

To test the liquid fertilizer compatibility of each, the follow mixing process was used, repeated for each formulation sample prepared as described above: Approximately 13.8 g of 10-34-0 liquid fertilizer (Alpine) was added to a 20 mL glass vial. A stir bar was added, and the liquid fertilizer was stirred at 650 rpm. 3 drops (approx. 1 mL each) of the particular formulation variation were added, dropwise, to the surface of the liquid fertilizer. The mixture was stirred for 1 minute, and then imaged on an Omax microscope. After an additional fourteen minutes of stirring, the samples were imaged again. As can be seen from FIGS. 8 and 9

Example 4: Burette and Column Test

To a 125 mL bottle was added 67.7941 g of 10-34-0 liquid fertilizer (Alpine) followed by 0.6949 g of the bifenthrin formulation prepared as described above. The bottle was shaken. Some particles adhered to the wall of the vessel. The bottle was sealed, secured and shaken on an IKA shaker for 15 minutes at 150 rpm, after which the bottle was removed from the shaker.

An aliquot was removed from the bottle and added to a burette. A leak in the burette was observed. The material was recovered and added to a second burette, and the first periodic sample (0 hour sample) was withdrawn from the burette. Additional periodic samples were withdrawn from the bottom of the burette at regular time intervals. After each withdrawal the spout of the burette was wiped with a Kimwipe™ or dabbed into the sample vial to remove as much residual liquid as possible. Occasionally a wash performed after a withdrawal.

To a 125 mL bottle was added 67.7356 g of 10-34-0 liquid fertilizer (Alpine) followed by 0.7941 g of commercial bifenthrin formulation (Capture LFR, FMC Corp.). The bottle was shaken manually for a few seconds within 20 seconds of the addition of the formulation. Some particles adhered to the wall of the vessel. The bottle was sealed, secured and shaken on an IKA shaker for 15 minutes at 150 rpm, after which the bottle was removed from the shaker. Some larger particles were observed, however, little to no adhesion to the vessel walls was observed. The bottle was secured in the IKA shaker again, this time facing the opposite direction, and shaken for about 10 more minutes.

An aliquot was removed from the bottle and added to a burette, and the first periodic sample (0 hour sample) removed from the bottom of the burette for extraction and analysis. Additional periodic samples withdrawn from the bottom of the burette at regular time intervals (0.5 hour, 1 hour, 2 hours, 3 hours, 24 hours, 4 days). After each withdrawal the spout of the burette was wiped with a Kimwipe™ or dabbed into the sample vial to remove as much residual liquid as possible.

Figure 10:
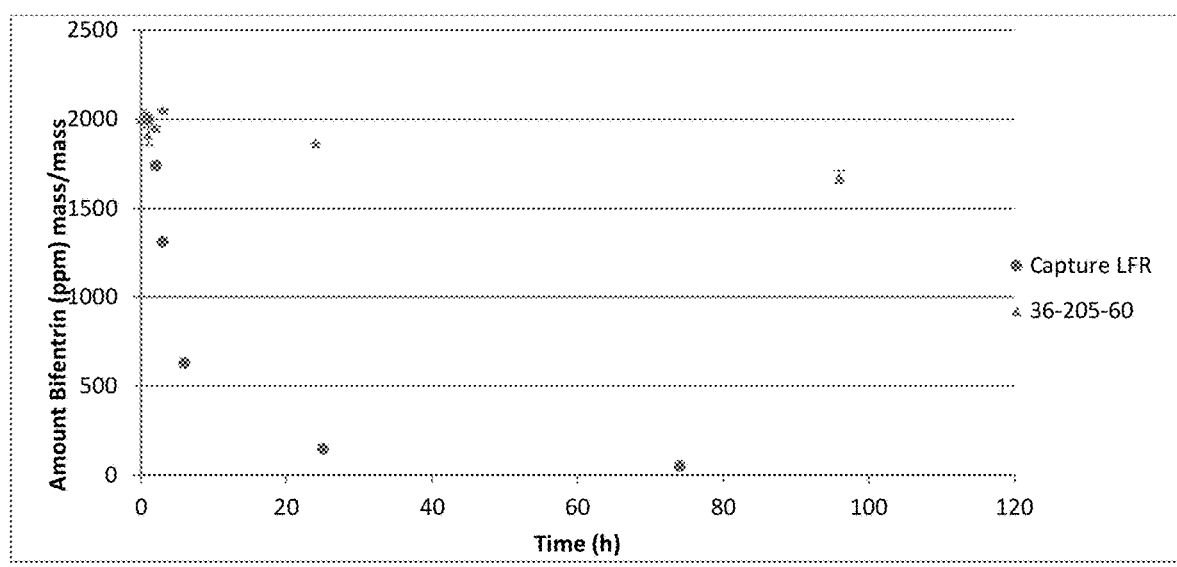
FIG. 10 is a graph showing active compound concentrations over time of two formulations mixed with liquid fertilizer.

Each periodic sample of each formulation was between 1.5-2.5 g in weight. For extraction and HPLC analysis each sample was treated as follows: The sample was added to a 2 dram glass vial. Approximately 0.5 g of the periodic sample was removed and added to a 20 mL vial, followed by 0.5 g of water, 10 mL of hexanes. These samples were sonicated for 10 minutes, redistributed in the sonicator, and sonicated for another 10 minutes. Vial weights were taken before and after sonication to account for losses. A portion of the separated organic phase was transferred to a HPLC vial (recorded by mass), and dried with a stream of air. The samples were re-constituted with acetonitrile (amount recorded by mass) and assayed for active via HPLC. Extractions for a given time point were performed in duplicate. Bifenthrin concentrations are shown in FIG. 10.

Example 5: Two Component Mixture Test

Pesticidal compositions were prepared according to the current disclosure. Specifically the formulation were prepared as follows:

Abamectin Formulation:
The following components were prepared and taken into a tank grinder for mixing.

| | |
|---|---|
| Abamectin Tech (98.1%) | 407.7 |
| Polymer nanoparticles (12% Solution) | 958.3 |
| Agnique 9116 (50% solution) | 97 |
| Morwet D425 | 95 |
| Stepwet DF-90 | 16 |
| propylene glycol | 287.5 |
| Proxel BD-20 (19.3%) | 10.4 |
| Water | 2914.1 |

The mixture was milled for 40 minutes, yielding a particle size of 540 nm. 100 grams of Van Gel B was added as a 10 weight percent solution in water, and the resulting mixture was milled for 10 additional minutes. The mixture was passed through a 100 mesh strainer screen giving a final yield of 96.4%. The following day, 14 grams of Surfynol 104 PG50, and 100 g of Trans 10A were added.

Imidacloprid Formulation:
750 g of polymer nanoparticles were added to 30 grams of Morwet D425, until dissolved in a teeth grinder, then 571.6 g of imidacloprid technical (97.1% purity) were added, with 158 g of water and 197.1 g of propylene glycol. Then 52.5 g of Aerosil 200 in 162 g of water were added and the mixture mixed in the grinder for 30 minutes. 20 g of Trans 10A was added and the mixture was homogenized at 4300 rpm for 30 minutes. Under an overhead stirrer the 42 g Trans 10A were added with 1.6 g of Surfynol 105 PG50. 150 g of Stepwet DF-90 was added along with 6.2 g Proxel BD-20 (19.3% solution), 7.4 g of Surfynol 104 PG50, and the mixture was stirred. The mixture was then milled for 50 minutes, and a final addition of 375 g of polymer nanoparticles (12% solution) was added with 214 g of water, and the mixture stirred. The mixture was passed through a 100 mesh strainer, giving a 93.1% yield.

Metalaxyl Formulation:

All of the following were placed in a tank underneath a teeth grinder: 1596.7 g metalaxyl technical (98%), 75 g Van Gel B granules, 1042 g of polymer nanoparticles (MAA-EA, 12% solution), 150 g Morwet D425, 400 g of water. The mixture was stirred for 30 minutes, then homogenized at 4300 rpm for 60 minutes. After which, 15 g Stepwet, 180 g of Agnique 9116, 10.4 g Proxel BD-20 (19.3% solution), 50 g Trans 10A, and 162.5 g of propylene glycol were added, and the mixture stirred. Then the mixture was milled for 105 minutes, with an addition of 868 g water after 50 minutes of milling. After milling 434 g of polymer nanoparticles (MAA-S, 23% solution) were added.

The bifenthrin and azoxystrobin formulations were commercially available formulations, Bifender®FC and Azteroid®FC available from Vive Crop Protection Inc.

To test the mixing compatibility and LF compatibility the composition were added to 10 ml of 10-34-0 (Alpine) liquid fertilizer and mixed. Each mixture was then evaluated for viscosity difference as compared to commercial formulations, and the formulator provided qualitative evaluation of the mixture in a mixing vial, and after passing the mixture through a 100 mesh screen. LF compatibility was scored on a scale of 1-10 for Examples 5 and 6, and scored 1-5 for Examples 7 and 8, a score of 1 indicating compatibility with LF, and a higher score indicating a lack of compatibility with LF. The formulator also provided a qualitative comparison of the viscosity of each product mixture to the mixture of commercially available products with the same active compounds.

Commercially available formulations containing the same active compounds were added to 10-34-0 LF and mixed in the same way for comparison purposes. The results and conclusions are presented in the tables below:

TABLE 7A

Physical Properties of Product Mixtures

| Sample # | Active Compound | Product | Volume (mL) | Density (g/cm$^3$) | Al % | Active (g) | Viscosity (cP) |
|---|---|---|---|---|---|---|---|
| 1 | Azoxystrobin | Azteroid FC | 10 | 1.08 | 18.40% | 1.9872 | Same |
| | Bifenthrin | Bifender FC | 10 | 1.08 | 19.30% | 2.0844 | |
| 2 | Azoxystrobin | Azteroid FC | 10 | 1.08 | 18.40% | 1.9872 | Less |
| | Imidacloprid | | 10 | 1.13 | 18.50% | 2.0905 | |
| 3 | Azoxystrobin | Azteroid FC | 10 | 1.08 | 18.40% | 1.9872 | Not viscous |
| | Metalaxyl | | 10 | 1.13 | 31.30% | 3.5369 | |
| 4 | Azoxystrobin | Azteroid FC | 10 | 1.08 | 18.40% | 1.9872 | Less |
| | Abamectin | | 10 | 1.05 | 8.00% | 0.84 | |

TABLE 7B

Observations

| Sample # | Active Compound | Observations: LF compatibility (1-10) | Observations: Description of mixture |
|---|---|---|---|
| 1 | Azoxystrobin<br>Bifenthrin | 1: clean | Light pale yellow<br>Opaque |
| 2 | Azoxystrobin<br>Imidacloprid | 1: clean | Light pale yellow<br>Opaque |
| 3 | Azoxystrobin<br>Metalaxyl | 1-2: One small aggregate | Light pale yellow<br>Opaque |
| 4 | Azoxystrobin<br>Abamectin | 1: clean | Light pale yellow<br>Opaque |

LF Compatibility is graded on a scale of 1-10, 1 being most compatible.

TABLE 8A

Comparison with Commercially Available Products

| Mixture No. | Active Compound | Commercial Product | Volume (mL) | Density (g/cm$^3$) | Al % | Active (g) | Viscosity (cP) |
|---|---|---|---|---|---|---|---|
| 1-1 | Azoxystrobin | Quadris | 10 | 1.08 | 22.90% | 2.4732 | Same |
| | Bifenthrin | Capture | 10 | 1.08 | 17.15% | 1.8522 | |
| 2-1 | Azoxystrobin | Quadris | 10 | 1.08 | 22.90% | 2.4732 | More |
| | Imidacloprid | Admire Pro | 10 | 1.13 | 42.80% | 4.8364 | |
| 4-1 | Azoxystrobin | Quadris | 10 | 1.08 | 22.90% | 2.4732 | More |
| | Abamectin | Agri-Mek SC | 10 | 1.05 | 8.00% | 0.84 | |

TABLE 8B

Commercial Product Mixtures - Formulators Observations

| Active Compound | Observations | |
|---|---|---|
| | LF compatibility (1-10) | Description of mixture |
| 1-1 Azoxystrobin Bifenthrin | 10: 100% mesh coverage of small specs | Light pale yellow |
| 2-1 Azoxystrobin Imidacloprid | 9: 95% covered with small specs | Opaque Did not mix easily Light green with hint of blue, opaque |

TABLE 8B-continued

Commercial Product Mixtures - Formulators Observations

| Active Compound | Observations | |
|---|---|---|
| | LF compatibility (1-10) | Description of mixture |
| 4-1 Azoxystrobin Abamectin | 8-9: 80% covered with string-y aggregates | Took longer to mix Light pale yellow, opaque |

Figure 11:
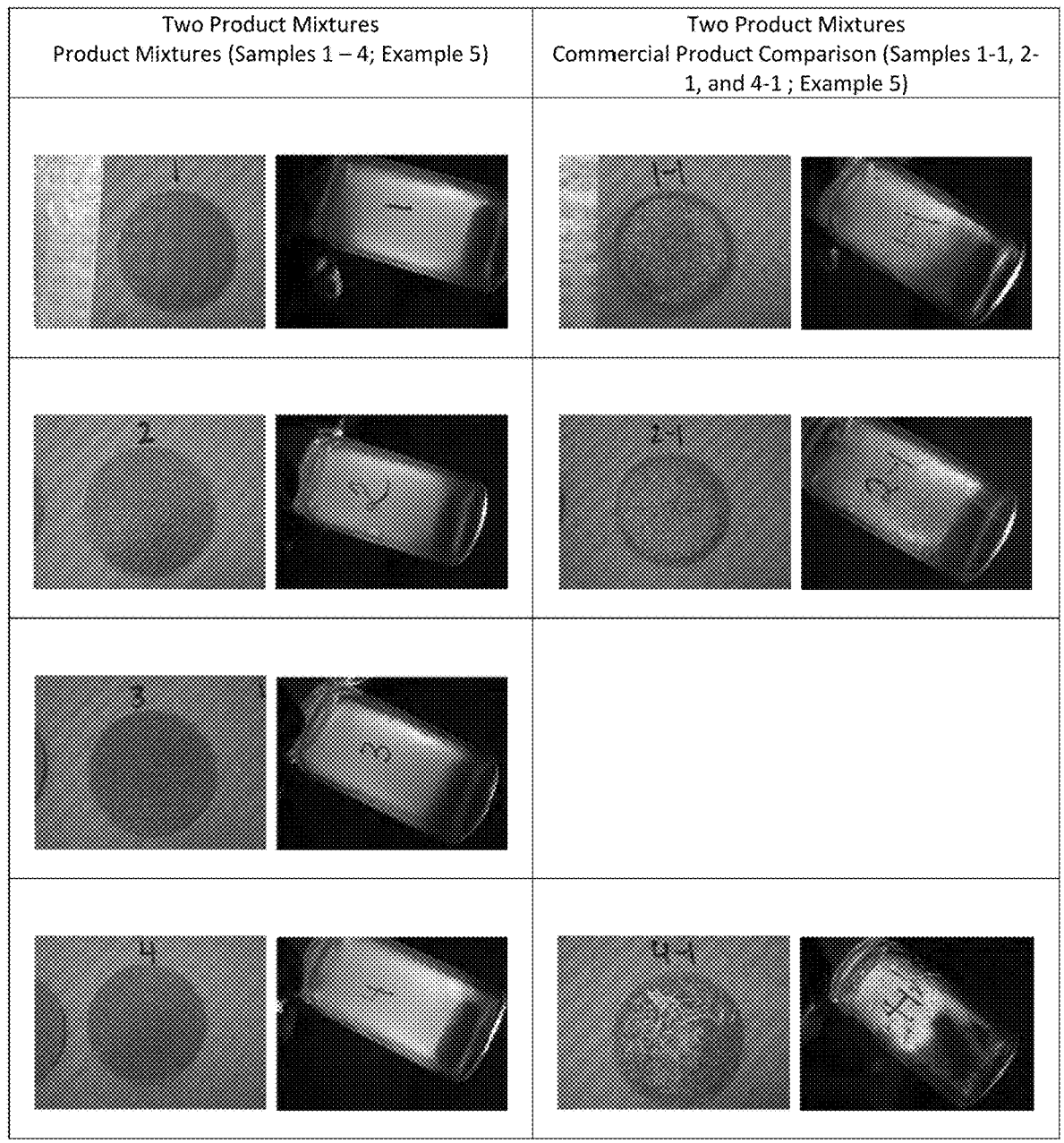
FIG. 11 presents photographs of pesticidal composition mixtures prepared and filtered through a mesh screen according to Example 5.

See FIG. 11.

Example 6: Three Component Mixtures

Three component mixtures were prepared from pesticidal compositions prepared as described above in Example 5. The mixtures were mixed with LF, and compared with similar mixtures of commercially available products, as described in Example 5.

TABLE 9A

| Physical Properties of Product Mixtures | | | | | | | |
|---|---|---|---|---|---|---|---|
| Sample # | Active Compound | Product | Volume (mL) | Density (g/cm$^3$) | AI % | Active (g) | Viscosity (cP) |
| 1 | Azoxystrobin | AZteroid FC | 6 | 1.08 | 18.40% | 1.19232 | Less |
| | Bifenthrin | Bifender FC | 6 | 1.08 | 19.30% | 1.25064 | |
| | Imidacloprid | | 6 | 1.13 | 18.50% | 1.2543 | |
| 2 | Azoxystrobin | AZteroid FC | 6 | 1.08 | 18.40% | 1.19232 | Same |
| | Bifenthrin | Bifender FC | 6 | 1.08 | 19.30% | 1.25064 | |
| | Metalaxyl | | 6 | 1.13 | 31.30% | 2.12214 | |
| 3 | Azoxystrobin | AZteroid FC | 6 | 1.08 | 18.40% | 1.19232 | Not viscous |
| | Bifenthrin | Bifender FC | 6 | 1.08 | 19.30% | 1.25064 | |
| | Abamectin | | 6 | 1.05 | 8.00% | 0.504 | |

TABLE 9B

| Observations | | | |
|---|---|---|---|
| | | Observations | |
| Sample # | Active Compound | LF compatibility (1-10) | Description of mixture |
| 1 | Azoxystrobin Bifenthrin Imidacloprid | 1: clean | Light pale yellow Opaque |
| 2 | Azoxystrobin Bifenthrin Metalaxyl | 1: clean | Light pale yellow Opaque |
| 3 | Azoxystrobin Bifenthrin Abamectin | 1: clean | Light pale yellow Opaque |

TABLE 10A

| Comparison with Commercially Available Products | | | | | | | |
|---|---|---|---|---|---|---|---|
| Sample # | Active Compound | Commercial Product | Volume (mL) | Density (g/cm$^3$) | AI % | Active (g) | Viscosity (cP) |
| 1-1 | Azoxystrobin | Quadris | 6 | 1.08 | 22.90% | 1.48392 | More |
| | Bifenthrin | Capture LFR | 6 | 1.08 | 17.15% | 1.11132 | |
| | Imidacloprid | Admire Pro | 6 | 1.13 | 42.80% | 2.90184 | |
| 2-1 | Azoxystrobin | Quadris | 6 | 1.08 | 22.90% | 1.48392 | Same |
| | Bifenthrin | Capture LFR | 6 | 1.08 | 17.15% | 1.11132 | |
| | Abamectin | Agri-Mek SC | 6 | 1.05 | 8.00% | 0.504 | |

TABLE 10B

| Commercial Product Mixtures - Formulators Observations | | | |
|---|---|---|---|
| Sample # | Active Compound | LF compatibility (1-10) | Description of mixture |
| 1-1 | Azoxystrobin<br>Bifenthrin<br>Imidacloprid | 8: 60% of mesh covered with blue specs | Harder to mix<br>Light green with blue hint<br>Opaque |
| 2-1 | Azoxystrobin<br>Bifenthrin<br>Abamectin | 9: 99% covered with small string-y aggregates | Light pale yellow<br>Opaque |

Figure 12:
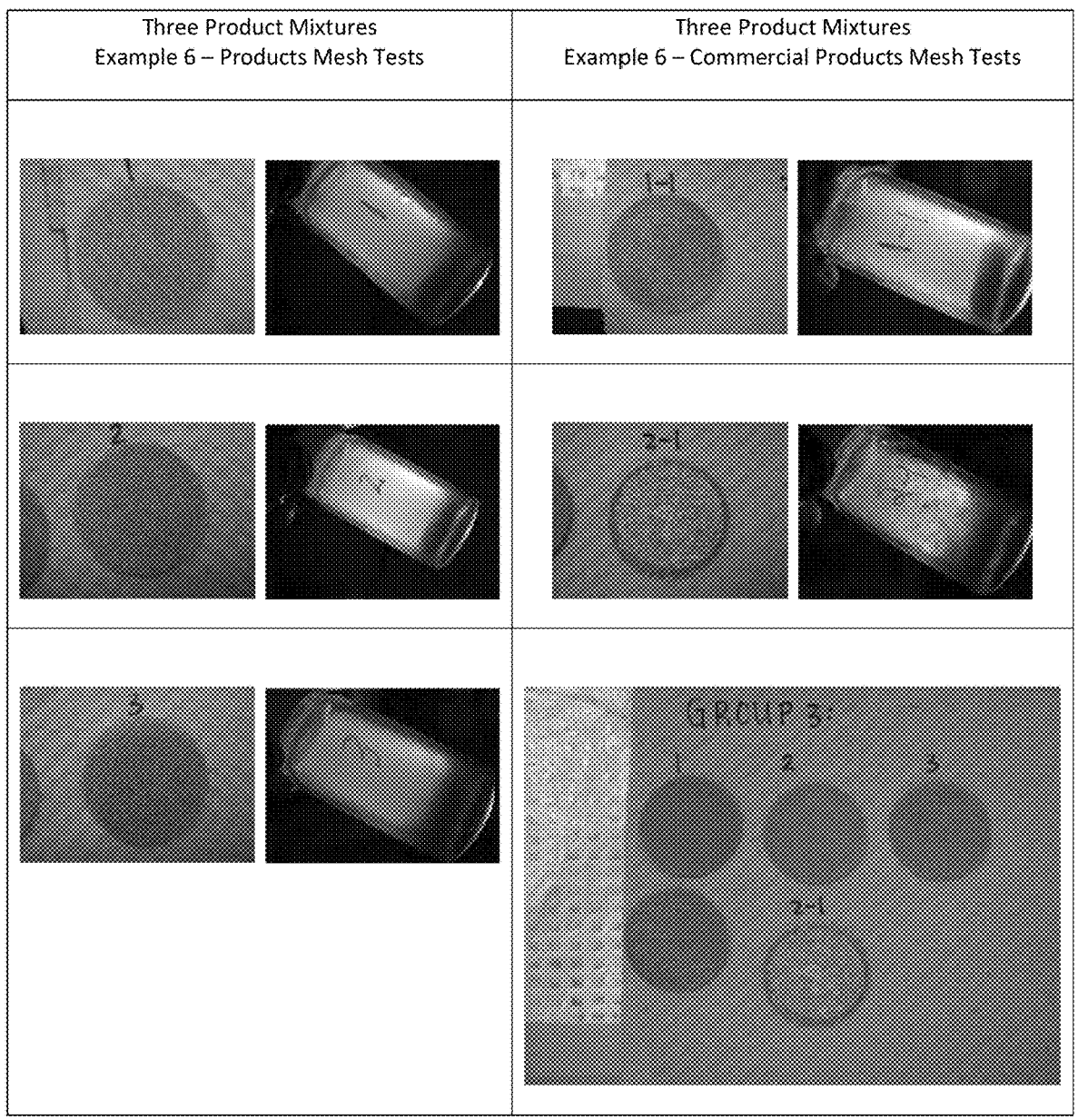
FIG. 12 presents photographs of pesticidal composition mixtures prepared and filtered through a mesh screen according to Example 6.

See FIG. 12 for photographs of mesh screen filtering results.

Example 7: Four Component Mixtures

Four component mixtures were prepared from pesticidal compositions prepared as described above in Example 5. The mixtures were mixed with LF, and compared with similar mixtures of commercially available products, as described in Example 5.

TABLE 11A

| Physical Properties of Product Mixtures | | | | | | | |
|---|---|---|---|---|---|---|---|
| Sample # | Active Compound | Product | Volume (mL) | Density ($g/cm^3$) | Al % | Active (g) | Viscosity (cP) |
| 1 | Azoxystrobin | AZteroid FC | 5 | 1.08 | 18.40% | 0.9936 | Less |
| | Bifenthrin | Bifender FC | 5 | 1.08 | 19.30% | 1.0422 | |
| | Imidacloprid | | 5 | 1.13 | 18.50% | 1.04525 | |
| | Metalaxyl | | 5 | 1.13 | 31.30% | 1.76845 | |
| 2 | Azoxystrobin | AZteroid FC | 5 | 1.08 | 18.40% | 0.9936 | Not viscous |
| | Bifenthrin | Bifender FC | 5 | 1.08 | 19.30% | 1.0422 | |
| | Metalaxyl | | 5 | 1.13 | 31.30% | 1.76845 | |
| | Abamectin | | 5 | 1.05 | 8.00% | 0.42 | |
| 3 | Azoxystrobin | AZteroid FC | 5 | 1.08 | 18.40% | 0.9936 | Not viscous |
| | Bifenthrin | Bifender FC | 5 | 1.08 | 19.30% | 1.0422 | |
| | Abamectin | | 5 | 1.05 | 8.00% | 0.42 | |
| | Imidacloprid | | 5 | 1.13 | 18.50% | 1.04525 | |

TABLE 11B

| Formulators Observations | | |
|---|---|---|
| | Observations | |
| Sample # | LF compatibility (1-5) | Description of mixture |
| 1 | 1-2: One small aggregate | Light pale yellow<br>Opaque |
| 2 | 1: clean | Light pale yellow<br>Opaque |
| 3 | 1: clean | Light pale yellow<br>Opaque |

TABLE 12A

| Comparison with Commercially Available Products | | | | | | | |
|---|---|---|---|---|---|---|---|
| Sample No. | Active Compound | Commercial Product | Volume (mL) | Density ($g/cm^3$) | Al % | Active (g) | Viscosity (cP) |
| 1-1 | Azoxystrobin | Quadris | 5 | 1.08 | 22.90% | 1.2366 | More |
| | Bifenthrin | Capture LFR | 5 | 1.08 | 17.15% | 0.9261 | |
| | Imidacloprid | Admire Pro | 5 | 1.13 | 42.80% | 2.4182 | |
| | Abamectin | Agri-Mek SC | 5 | 1.05 | 8.00% | 0.42 | |

TABLE 12B

| Commercial Product Mixtures - Formulators Observations | |
|---|---|
| LF compatibility (1-5) | Description of mixture |
| 1-1 9: Blue specs cover 95% of the mesh except for one area | Light green with hint of blue Opaque |

Figure 13:
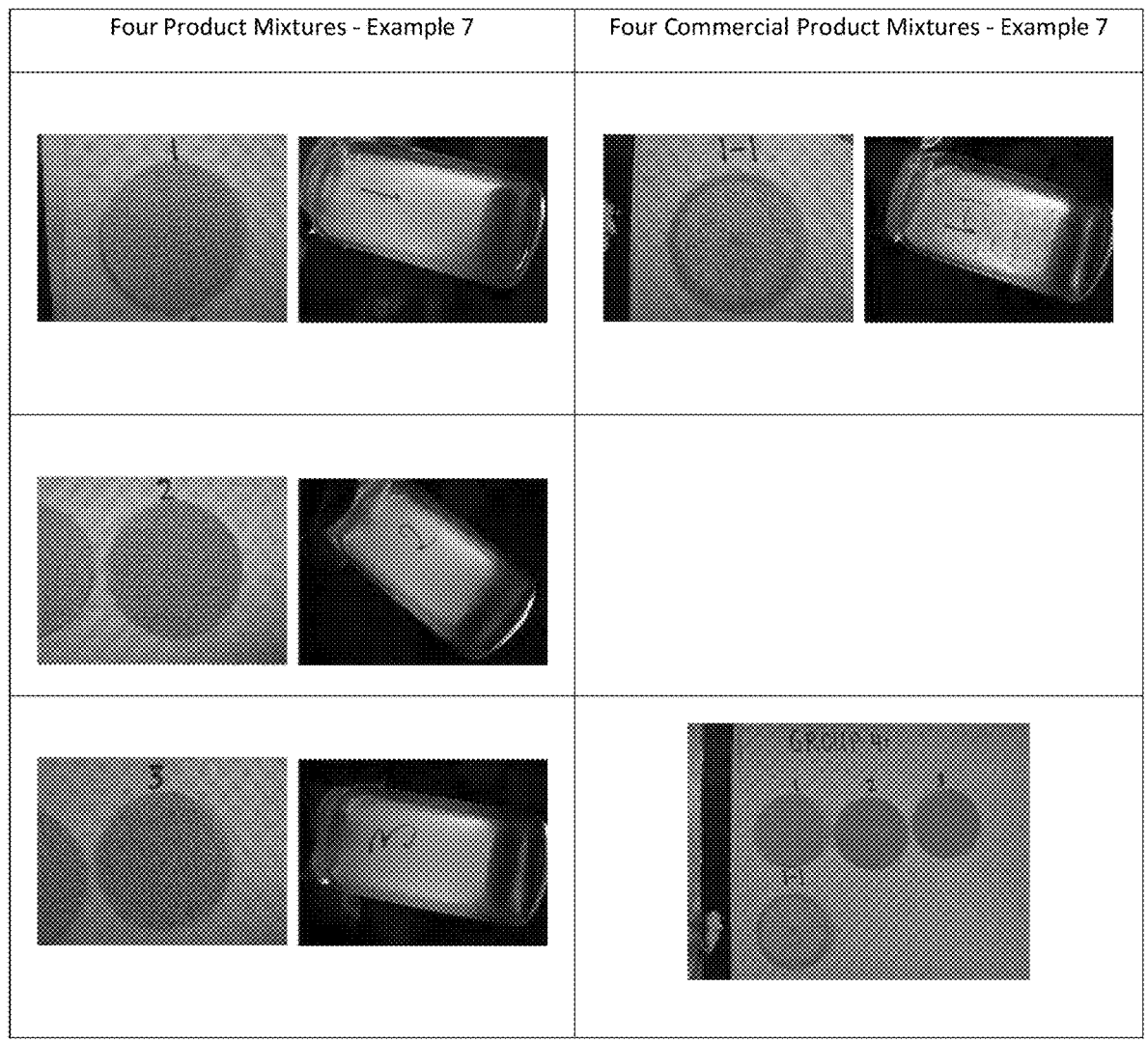
FIG. 13 presents photographs of pesticidal composition mixtures prepared and filtered through a mesh screen according to Example 7.

See FIG. 13 for photographic comparisons.

Example 8: Five Part Mixture

Five component mixtures were prepared from pesticidal compositions prepared as described above in Example 5. The mixtures were mixed with LF, as described in Example 5.

TABLE 13A

| Physical Properties of Product Mixtures | | | | | | |
|---|---|---|---|---|---|---|
| Sample # | Active Compound | Vive | Volume (mL) | Density (g/cm³) | AI % | Active (g) | Viscosity (cP) |
| 1 | Azoxystrobin | AZteroid FC | 4 | 1.08 | 18.40% | 0.79488 | Not viscous |
|   | Bifenthrin | Bifender FC | 4 | 1.08 | 19.30% | 0.83376 |   |
|   | Imidacloprid | Midac FC | 4 | 1.13 | 18.50% | 0.8362 |   |
|   | Metalaxyl | Talax FC | 4 | 1.13 | 31.30% | 1.41476 |   |
|   | Abamectin | Averland FC | 4 | 1.05 | 8.00% | 0.336 |   |

TABLE 13B

| Formulators Observations | | |
|---|---|---|
| Sample No. | LF compatibility (1-5) | Description of mixture |
| 1 | 1: clean | Light pale yellow Opaque |

Figure 14:
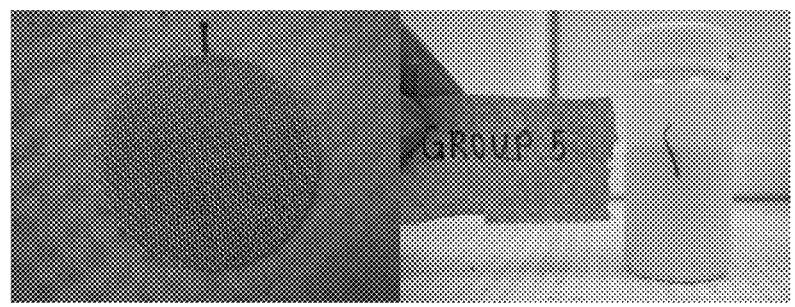
FIG. 14 presents photographs of pesticidal composition mixtures prepared and filtered through a mesh screen according to Example 8.

See FIG. 14.

We claim:

1. A liquid-applied pesticidal composition made by a process comprising mixing a liquid fertilizer with
    an active compound composition comprising: at least three of the five following active compounds:
    a strobilurin fungicide,
    a pyrethroid insecticide,
    a neonicotinoid insecticide,
    a phenylamide fungicide,
    a mectin,
    and additionally comprising
    a dispersant,
    polymer nanoparticles, and
    water,
    wherein the liquid-applied pesticidal composition has a viscosity of less than about 1500 cP and
    a density that is less than about 1.4 g/cm³ at 60° F., for application directly to soil, and
    wherein the liquid fertilizer is compatible with the active compound composition, and
    wherein the active compound composition comprises the strobilurin fungicide and the pyrethroid insecticide.

2. The liquid-applied pesticidal composition of claim 1, wherein an average size of the polymer nanoparticles is less than about 0.5 μm.

3. The liquid-applied pesticidal composition of claim 1, wherein:
    the strobilurin fungicide is azoxystrobin,
    the pyrethroid insecticide is bifenthrin,
    the neonicotinoid insecticide is imidacloprid,
    the phenylamide fungicide is metalaxyl, and
    the mectin is abamectin.

4. The liquid-applied pesticidal composition of claim 1, wherein the liquid-applied pesticidal composition does not include any organic thickeners.

5. The liquid-applied pesticidal composition of claim 1, wherein the density of the liquid-applied pesticidal composition is between about 1.01 g/cm³ and about 1.4 g/cm³.

6. The liquid-applied pesticidal composition of claim 1, wherein the polymer nanoparticles are comprised of randomly arranged hydrophilic monomers and hydrophobic monomers.

7. The liquid-applied pesticidal composition of claim 1, wherein one or more of the active compounds are associated with the polymer nanoparticles and an average size of aggregates of nanoparticles comprising polymer-associated active compounds is between about 10 nm and about 5,000 nm.

8. The liquid-applied pesticidal composition of claim 7, wherein the average size of aggregates of nanoparticles comprising polymer-associated active compounds is between about 10 nm and about 500 nm.

9. The liquid-applied pesticidal composition of claim 7, wherein the average size of aggregates of nanoparticles comprising polymer-associated active compounds is between about 50 nm and about 200 nm.

10. The liquid-applied pesticidal composition of claim 7, wherein the average size of aggregates of nanoparticles comprising polymer-associated active compounds is between about 100 nm and about 200 nm.

11. The liquid-applied pesticidal composition of claim 1, wherein the strobilurin fungicide, the pyrethroid insecticide, and the neonicotinoid insecticide are present and associated with the polymer nanoparticles.

12. The liquid-applied pesticidal composition of claim 11 further comprising the phenylamide fungicide.

13. The liquid-applied pesticidal composition of claim 12, further comprising the mectin compound.

14. The liquid-applied pesticidal composition of claim 1, wherein the active compound composition has a total active compound concentration from about 10 percent by weight percent to about 60 percent by weight.

15. The liquid-applied pesticidal composition of claim 1, wherein the active compound composition has a total active compound concentration from about 10 percent by weight to about 30 percent by weight.

16. The liquid-applied pesticidal composition of claim 1, wherein the active compound composition has an individual active compound concentration between about 0.25 percent by weight and about 30 percent by weight.

17. The liquid-applied pesticidal composition of claim 1, wherein the strobilurin fungicide, the pyrethroid insecticide, or the neonicotinoid insecticide are present in the active compound composition at a concentration between about 5 percent by weight and about 50 percent by weight.

18. The liquid-applied pesticidal composition of claim 1, wherein the strobilurin fungicide or the pyrethroid insecticide are present in the active compound composition at a concentration between about 15 percent by weight and about 40 percent by weight.

19. The liquid-applied pesticidal composition of claim 1, wherein the neonicotinoid insecticide is present in the active compound composition at a concentration between about 10 percent by weight and about 40 percent by weight.

20. The liquid-applied pesticidal composition of claim 1, wherein the mectin compound is present in the active compound composition at a concentration between about 1 percent by weight and about 30 percent by weight.

21. The liquid-applied pesticidal composition of claim 1, wherein the mectin compound is present in the active compound composition at a concentration between about 1 percent by weight and about 20 percent by weight.

22. The liquid-applied pesticidal composition of claim 1, wherein the strobilurin fungicide, the pyrethroid insecticide, the neonicotinoid insecticide, and the phenylamide fungicide are each individually present at a concentration between about 100 ppm and about 1 weight percent of the liquid-applied pesticidal composition.

23. A method of protecting a plant, plant propagation material, seed from phytopathogenic fungi and/or insects or controlling phytopathogenic fungi or insects, comprising the step of:
    applying a liquid-applied pesticidal composition of claim 1 to the plant, soil adjacent to a plant, plant propagation material, or soil adjacent to plant propagation material.

24. The method of claim 23, wherein the soil adjacent to the plant or the soil adjacent to the plant propagation material to which the liquid-applied pesticidal composition is to be applied is an open furrow.

25. The method of claim 24, further comprising the step of closing the open furrow.

26. The method of claim 25, further comprising placing the plant, or the plant propagation material in the open furrow.

* * * * *